(12) United States Patent
Nakamura et al.

(10) Patent No.: US 6,724,545 B2
(45) Date of Patent: Apr. 20, 2004

(54) IMAGE PICKUP LENS AND DESIGN METHOD THEREOF

(75) Inventors: Masato Nakamura, Kawaguchi (JP); Takayuki Arai, Kawaguchi (JP); Isamu Kaneko, Kawaguchi (JP)

(73) Assignee: Enplas Corporation, Saitama (JP)

(*) Notice: Subject to any disclaimer, the term of this patent is extended or adjusted under 35 U.S.C. 154(b) by 0 days.

(21) Appl. No.: 10/242,077

(22) Filed: Sep. 12, 2002

(65) Prior Publication Data

US 2003/0117709 A1 Jun. 26, 2003

(30) Foreign Application Priority Data

Sep. 14, 2001 (JP) ........................................ 2001-279634
Sep. 19, 2001 (JP) ........................................ 2001-284876

(51) Int. Cl.[7] ............................. G02B 3/02; G02B 3/08
(52) U.S. Cl. ........................ 359/719; 359/742; 359/718
(58) Field of Search ............................... 359/718, 719, 359/742

(56) References Cited

U.S. PATENT DOCUMENTS

| | | | | |
|---|---|---|---|---|
| 4,787,722 A | * | 11/1988 | Claytor | ................. 359/742 |
| 4,904,069 A | * | 2/1990 | Nakata | ................. 359/710 |
| 5,151,826 A | * | 9/1992 | Pasco | ................. 359/742 |
| 6,297,915 B1 | * | 10/2001 | Kaneko et al. | ............. 359/718 |
| 6,560,037 B2 | * | 5/2003 | Dou | ................. 359/719 |
| 2002/0054438 A1 | * | 5/2002 | Kaneko | ................. 359/719 |
| 2003/0117709 A1 | * | 6/2003 | Nakamura et al. | .......... 359/565 |

* cited by examiner

Primary Examiner—Georgia Epps
Assistant Examiner—David N. Spector
(74) Attorney, Agent, or Firm—Koda & Androlia

(57) ABSTRACT

Provided in the present invention are an image pickup lens and a design method thereof which can achieve miniaturization of the system and capable of remarkably improving the optical characteristic with a simple structure. By forming a second face on the image pickup surface side of a lens body into a Fresnel face and unifying a diffraction element with at least a first face on the object face side or the second face on the image pickup surface side of the lens body, it becomes possible to correct the Petzval sum and reduce the curvature of the field so that an excellent image plane can be obtained. Also, due to the color dispersion characteristic of the diffraction element, chromatic aberration can be well corrected. Thereby, the optical characteristic of the image pickup lens can be remarkably improved.

17 Claims, 59 Drawing Sheets

OPTICAL AXIS

Fig. 2
PRIOR ART
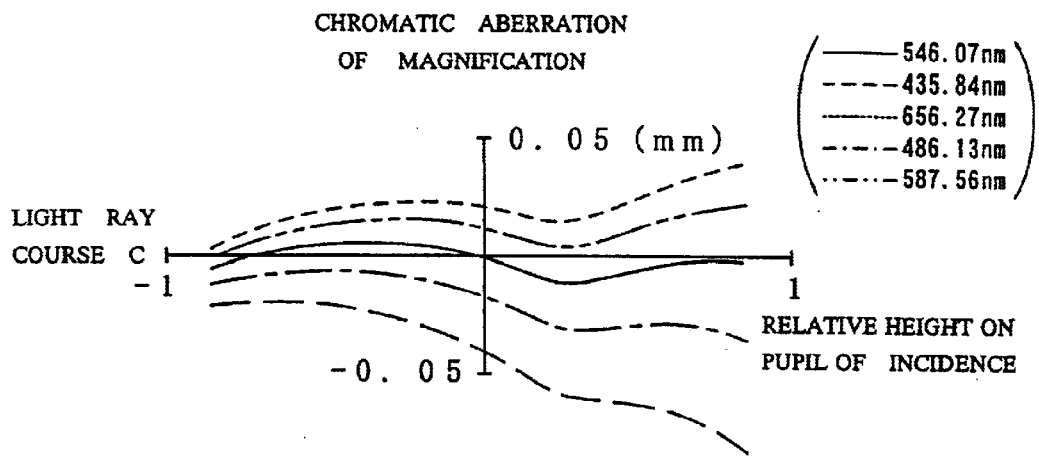
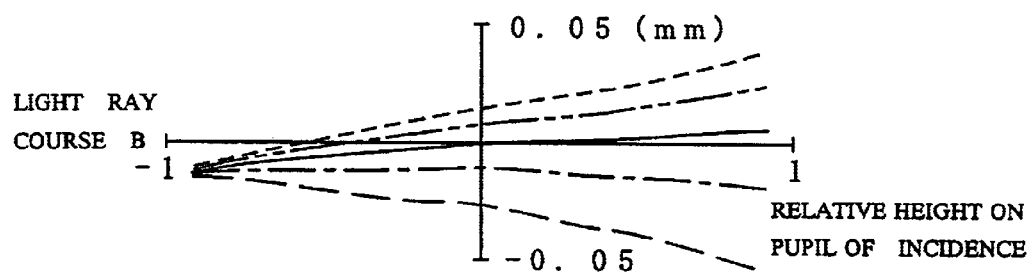
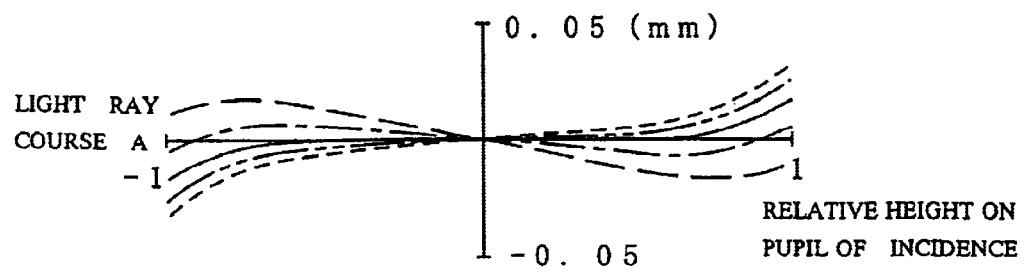

Fig. 28
CHROMATIC ABERRATION
OF MAGNIFICATION
$\begin{pmatrix} \text{———} 546.07\text{nm} \\ \text{– – –} 435.84\text{nm} \\ \text{········} 656.27\text{nm} \\ \text{–··–} 486.13\text{nm} \\ \text{··—··} 587.56\text{nm} \end{pmatrix}$
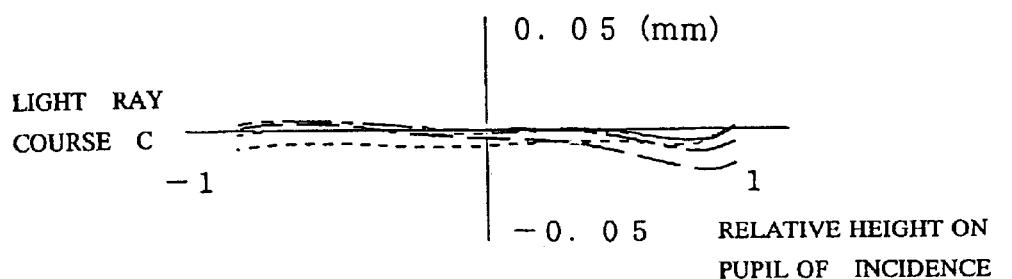
LIGHT RAY COURSE C
0.05 (mm)
−0.05  RELATIVE HEIGHT ON PUPIL OF INCIDENCE
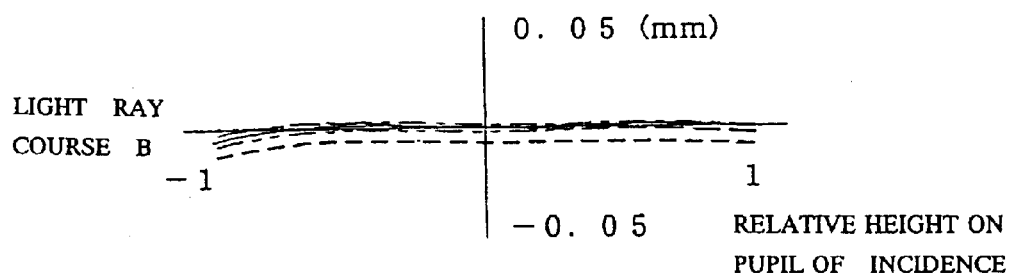
LIGHT RAY COURSE B
0.05 (mm)
−0.05  RELATIVE HEIGHT ON PUPIL OF INCIDENCE
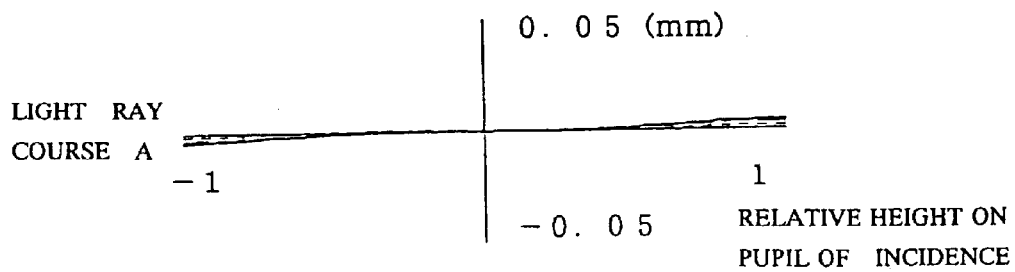
LIGHT RAY COURSE A
0.05 (mm)
−0.05  RELATIVE HEIGHT ON PUPIL OF INCIDENCE Fig. 34
CHROMATIC ABERRATION
OF MAGNIFICATION
(—— 546.07nm
---- 435.84nm
······ 656.27nm
-·-·- 486.13nm
··-··- 587.56nm)
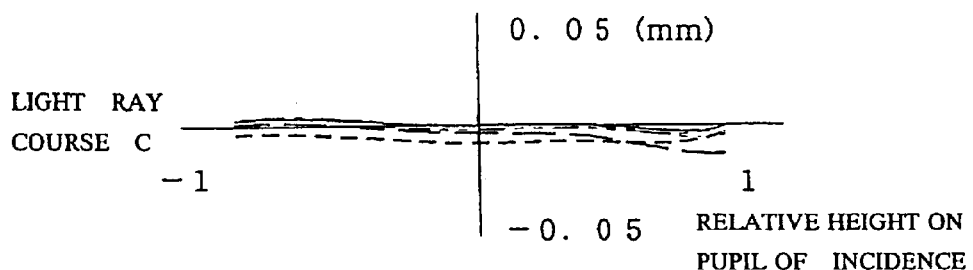
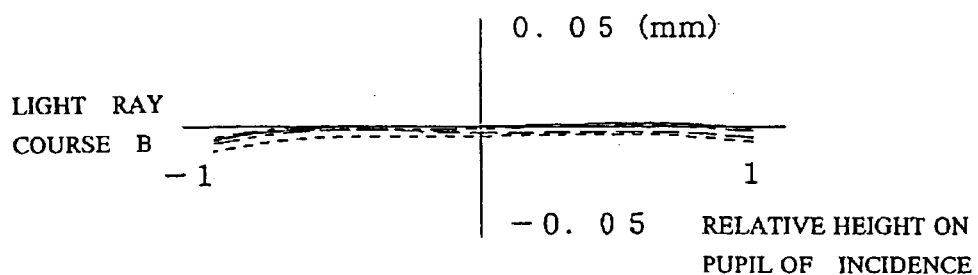
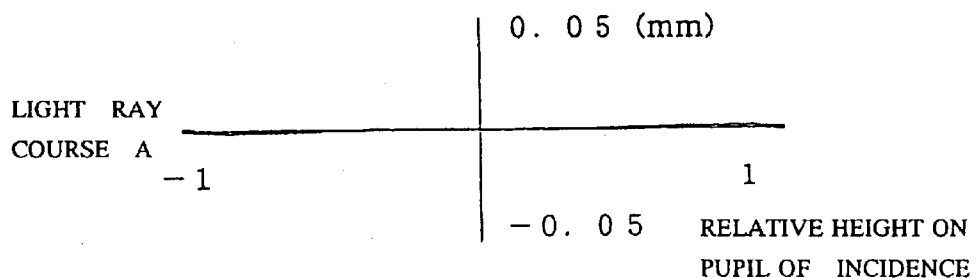

IMAGE PICKUP LENS AND DESIGN METHOD THEREOF

BACKGROUND OF THE INVENTION

1. Field of the Invention

The present invention relates to an image pickup lens and a design method thereof and particularly, to an image pickup lens comprising one lens which can be reduced in size and weight while achieving a wider angle of view to be used for an image pickup device (e.g., a CCD camera) utilizing an image pickup element such as a CCD, a CMOS or the like to be mounted on a portable computer, a visual telephone, a cellular phone and the like, and a design method thereof.

2. Description of the Related Art

Recently, there is a remarkable development in the multimedia industry. For example, there has been an increasing demand for a camera (e.g., a CCD camera) utilizing an image pickup element such as a CCD, a CMOS or the like to be mounted on a portable computer, a visual telephone, a cellular phone and the like. Such CCD camera needs to be mounted on a limited space. Thus, it is desirable that the camera be small in size and light in weight.

Accordingly, an image pickup lens used for such CCD camera is also required to be small and lightweight as well.

Conventionally, the so-called one-lens system using a single lens is used as such image pickup lens.

FIG. 1 shows a conventional image pickup lens with a one-lens system. The one-lens system comprises a lens body 10 having a positive power and a diaphragm 11 is disposed on an object side of the lens body 10. Further, on the image plane side of the lens body 10, a first cover glass 12, a second cover glass 13 and an image pickup surface 14 as a light receiving surface for an image pickup element such as a CCD, a CMOS or the like are disposed in order. Each lens face of the lens body is referred to be the first face and the second face, respectively, in order from the object side.

The image pickup lens is set under the following condition:

$$f=4.10 \text{ mm}, F \text{ No}=2.2, 2\omega=60.0° \text{ Petzval sum}=0.681$$

where, f denotes the focal length (mm) of the whole system, F No denotes F number, and $2\omega$ denotes the maximum angle of view. Also, r denotes the radius of curvature (mm) of the lens and the like, d denotes the distance (mm) between each optical face, nd denotes the refractive index of an optical material (medium) present between with the next optical face, and vd denotes the Abbe constant.

Provided the optical axis direction is taken as a Z-axis, the direction perpendicular to the optical axis is taken as an X-axis, and the traveling direction of light is defined to be positive, the shape of the aspherical face of the lens is expressed by a following expression (Eq1):

$$Z = \frac{\frac{x^2}{r}}{1 + \sqrt{1 - (k+1)\frac{x^2}{r^2}}} + a_4 x^4 + a_6 x^6$$

where, each of k, $a_4$, $a_6$ is an aspherical factor.

| Face | Radius r of Curvature | Distance d | Refractive Index nd | Abbe constant vd |
|---|---|---|---|---|
| (1) Diaphragm | 0.000 | 0.629 | | |
| (2) First face of lens body | 49.774 | 2.871 | 1.584 | 31.0 |
| (3) Second face of lens body | −2.477 | 1.000 | | |
| (4) First face of first cover glass | 0.000 | 0.750 | 1.517 | 64.0 |
| (5) Second face of first cover glass | 0.000 | 0.250 | | |
| (6) First face of second cover glass | 0.000 | 1.200 | 1.517 | 64.0 |
| (7) Second face of second cover glass | 0.000 | 1.518 | | |
| (8) Image pickup surface | 0.000 | | | |

| | Aspherical Factor | | |
|---|---|---|---|
| Face | k | $a_4$ | $a_6$ |
| 2 | 1.468005e+003 | −1.312730e−002 | −7.674194e−003 |
| 3 | −1.315709e+000 | −4.263500e−002 | −1.495094e−003 |

However, in the one-lens image pickup lens of the related art, the Petzval sum and the curvature of field are large so that an excellent image plane cannot be obtained. Also, each aberration such as the longitudinal chromatic aberration, the chromatic aberration of magnification, the spherical aberration, the astigmatism is large so that each aberration cannot be corrected appropriately. Therefore, it is not possible to obtain an excellent optical characteristic.

FIG. 2 shows the chromatic aberration of magnification of ray paths A, B, and C in regards to the image pickup lens shown in FIG. 1. It shows that the chromatic aberration of magnification is large in the related art and it becomes large especially in the vicinity of the image pickup lens, thereby resulting in deterioration of the lens property. FIG. 3 shows the spherical aberration, the astigmatism, and the distortion aberration of the image pickup lens. It shows that each of the spherical aberration, the astigmatism, and the distortion aberration is large and, particularly, the spherical aberration and the stigmatism are large. Thus, it is clear that a sufficient optical characteristic cannot be obtained.

In view of this respect, there is a technique of the related art as disclosed in Japanese Patent Application Laid-open No. 10-73760 in which a diffraction element is unified with a refractive lens so as to correct the chromatic aberration of the image pickup lens by the diffraction element.

However, with this lens, the Petzval sum cannot be corrected thereby causing a large curvature of field. The reason is that there is no contribution by the diffraction element imposed onto the Petzval sum so that it is determined only by the property of a refractive lens.

SUMMARY OF THE INVENTION

The invention has been designed to overcome the foregoing problems. It is an object of the present invention to provide an image pickup lens and a design method thereof, which can achieve minimization of the system and a remarkable improvement in the optical characteristic with a simple structure.

In order to achieve the aforementioned objects, an image pickup lens of the present invention comprises a lens body having a second face on an image pickup surface side of the lens body being formed into a Fresnel face and a diffraction element being unified with at least either a first face of on an object side or the second face on the image pickup surface side of the lens body.

In the invention constituted as described, the second face on the image pickup surface side of the lens body is formed into a Fresnel face. Thus, it becomes possible to correct the Petzval sum and reduce the curvature of the field so that an excellent image plane can be obtained. Also, the diffraction element is unified at least with either the first face on the object side or the second face on the image pickup surface side of the lens body. Therefore, due to a color dispersion characteristic of the diffraction element, the chromatic aberration can be well corrected. Thereby, the optical characteristic of the image pickup lens can be remarkably improved.

Also, the diffraction element may be unified with the second face of the lens body.

By unifying the diffraction element with the second face of the lens body, chromatic aberration can be well corrected and the optical characteristic of the image pickup lens can be remarkably improved due to a color dispersion characteristic of the diffraction element.

Further, the first face of the lens body may be formed into an aspheric face and the second face of the lens body may be formed into an aspheric Fresnel face.

By forming the first face of the lens body into an aspheric face and the second face of the lens body may into an aspheric Fresnel face, each aberration such as the spherical aberration and the like can be appropriately corrected. Thereby, the optical characteristic of the image pickup lens can be remarkably improved.

Furthermore, in the image pickup lens of the present invention, the lens body may be formed to satisfy a condition represented by a following expression:

$$1.25 < d/f < 1.45 \qquad (1)$$

where, d: thickness in the center of the lens body; and f: focal length of the lens body.

By satisfying the expression (1), the distortion aberration amount can be corrected with a comfortable visual sense while well maintaining each aberration except for the distortion aberration. In the expression (1), if the d/f value is larger than 1.45, the distortion aberration becomes large in the positive direction so that the back focus becomes short. If the d/f value is smaller than 1.25, the distortion aberration in the negative direction becomes large so that, even though the distortion aberration can be suppressed, the curvature of field, the longitudinal chromatic aberration, the lateral aberration, the spherical aberration and the like cannot be well corrected.

Also, in the image pickup lens of the present invention, the lens body may be formed to satisfy a condition represented by a following expression:

$$0.6 < |r_2/r_1| < 0.75 \qquad (2)$$

where, $r_1$: radius of curvature in the center of the first face of the lens body; and $r_2$: radius of curvature in the center of the second face of the lens body.

By satisfying the expression (2), an ideal lens shape in which each aberration is well balanced can be achieved. In the expression (2), if the $|r_2/r_1|$ value is larger than 0.75 or smaller than 0.6, mainly the spherical aberration becomes worsen resulting in deterioration of resolution.

Further, in the image pickup lens of the present invention, a diaphragm may be positioned on the object side of the lens body and the lens body may be formed to satisfy a condition represented by a following expression:

$$0 \leq ds/f \leq 0.4 \qquad (3)$$

where, ds: distance between the center of diaphragm and the first face of the lens body; and f: focal length of the lens body.

By satisfying the expression (3), the coma aberration can be corrected while achieving an excellent balance of coma aberration and the distortion aberration. In the expression (3), if the ds/f value is larger than 0.4, the coma aberration cannot be sufficiently corrected and if it is smaller than 0, the diaphragm is to be in the lens body. Thus, it is not desirable since it becomes difficult to manufacture.

A design method of an image pickup lens according to the present invention is for determining the thickness and the radius of curvature in the center of a lens body having a second face on an image pickup surface side of the lens body being formed into a Fresnel face and a diffraction element being unified with at least either a first face on the object side or the second face on the image pickup surface side of the lens body. The design method comprises the steps of: under the condition that each aberration is maintained to be excellent except for distortion aberration, performing ray tracing simulation beforehand on a lens body group with a different combination of the d/f value (where, d denotes the thickness in the center of a lens body and f denotes the focal length of a lens body) and the $|r_2/r_1|$ value (where, $r_1$ denotes the radius of curvature in the center of the first face of the lens body and $r_2$ denotes the radius of curvature in the center of the second face of the lens body); calculating the distortion aberration of the lens bodies so as to obtain dependency of the distortion aberration on the d/f value and the $|r_2/r_1|$ value; selecting, according to the correlation, the combination of the d/f value and the $|r_2/r_1|$ value to be a desired distortion aberration; and determining the thickness and the radius of curvature of the lens body on the basis of the d/f value and the $|r_2/r_1|$ value.

In the method of the present invention as described, the thickness in the center of the lens body and the radius of the curvature in the center are determined based on the d/f value and $|r_2/r_1|$ value obtained beforehand. Therefore, it becomes possible to design a lens body in which distortion aberration is appropriately corrected.

Further, in the image pickup lens of the present invention comprises a lens body having at least one face being formed into an aspherical face and at least either the first face on the object side of or the second face on the image pickup surface side of the lens body being formed into a Fresnel face, and the lens body may be formed to satisfy a condition represented by a following expression:

$$1.17 < d/f < 1.4 \qquad (4)$$

where, d: thickness in the center of the lens body; and f: focal length of the lens body.

By forming at least one face of the lens body into an aspherical face and at least either the first face on the object side or the second face on the image pickup surface side of the lens body into a Fresnel face, it becomes possible to correct the Petzval sum and reduce the curvature of the field so that an excellent image plane can be obtained. Also, each aberration such as spherical aberration and the like can be well corrected. Thereby, the optical characteristic of the image pickup lens can be remarkably improved.

Also, by satisfying the expression (4), the distortion aberration amount with a comfortable visual sense can be achieved while well maintaining the aberration except for the distortion aberration. In the expression (4), if the d/f value is larger than 1.4, the distortion aberration becomes large in the positive direction so that the back focus becomes short. If the d/f value is smaller than 1.17, the distortion aberration in the negative direction becomes large so that, even though the distortion aberration can be suppressed, the curvature of field, the longitudinal chromatic aberration, the lateral aberration, the spherical aberration and the like cannot be well corrected.

Further, in the image pickup lens of the present invention, the lens body may be formed to satisfy a condition represented by a following expression:

$$0.58<|r_2/r_1|<0.73 \qquad (5)$$

where, $r_1$: radius of curvature in the center of the first face of the lens body; and $r_2$: radius of curvature in the center of the second face of the lens body.

By satisfying the expression (5), an ideal lens shape can be achieved in which each aberration is well balanced. In the expression (5), if the $|r_2/r_1|$ value is larger than 0.73 or smaller than 0.58, mainly the spherical aberration becomes worsen resulting in deterioration of resolution.

Furthermore, in the image pickup lens of the present invention, a diaphragm may be positioned on the object side of the lens body and the lens body may be formed to satisfy a condition represented by a following expression:

$$0 \leq ds/f \leq 0.4 \qquad (6)$$

where, ds: distance between the center of diaphragm and the first face of the lens body; and f: focal length of the lens body.

By satisfying the expression (6), the coma aberration can be corrected while achieving an excellent balance of coma aberration and the distortion aberration. In the expression (6), if the ds/f value is larger than 0.4, the coma aberration cannot be sufficiently corrected and if it is smaller than 0, the diaphragm is to be in the lens body. Thus, it is not desirable since it becomes difficult to manufacture.

Furthermore, a design method of an image pickup lens according to the present invention is for determining the thickness and the radius of curvature in the center of a lens body having at least the first face on the object side or the second face on the image pickup surface side of the lens body being formed into a Fresnel face. The design method comprises the steps of: under the condition that each aberration is maintained to be excellent except for the distortion aberration, performing ray tracing simulation beforehand on a lens body group with a different combination of d/f value (where, d denotes the thickness in the center of a lens body and f denotes the focal length of a lens body) and $|r_2/r_1|$ value (where, $r_1$ denotes the radius of curvature in the center of the first face of said lens body and $r_2$ denotes the radius of curvature in the center of the second face of the lens body); calculating the distortion aberration of the lens bodies so as to obtain dependency of the distortion aberration on the d/f value and the $|r_2/r_1|$ value; selecting, according to the correlation, the combination of the d/f value and the $|r_2/r_1|$ value to be a desired distortion aberration; and determining the thickness and the radius of curvature of the lens body on the basis of the d/f value and the $|r_2/r_1|$ value.

In the method of the present invention as described, the thickness in the center of the lens body and the radius of the curvature in the center are determined based on the d/f value and $|r_2/r_1|$ value obtained beforehand. Therefore, it becomes possible to design a lens body in which distortion aberration is appropriately corrected.

BRIEF DESCRIPTION OF THE DRAWINGS

FIG. 2 is an explanatory illustration showing the chromatic aberration of magnification of the image pickup lens shown in FIG. 1;

FIG. 28 is an explanatory illustration showing the chromatic aberration of magnification of the image pickup lens shown in FIG. 27;

FIG. 34 is an explanatory illustration showing the chromatic aberration of magnification of the image pickup lens shown in FIG. 33;

DESCRIPTION OF THE PREFERRED EMBODIMENTS

Now, one of a basic embodiment according to the present invention will be described by referring to FIG. 4 to FIG. 8.

Figure 1:
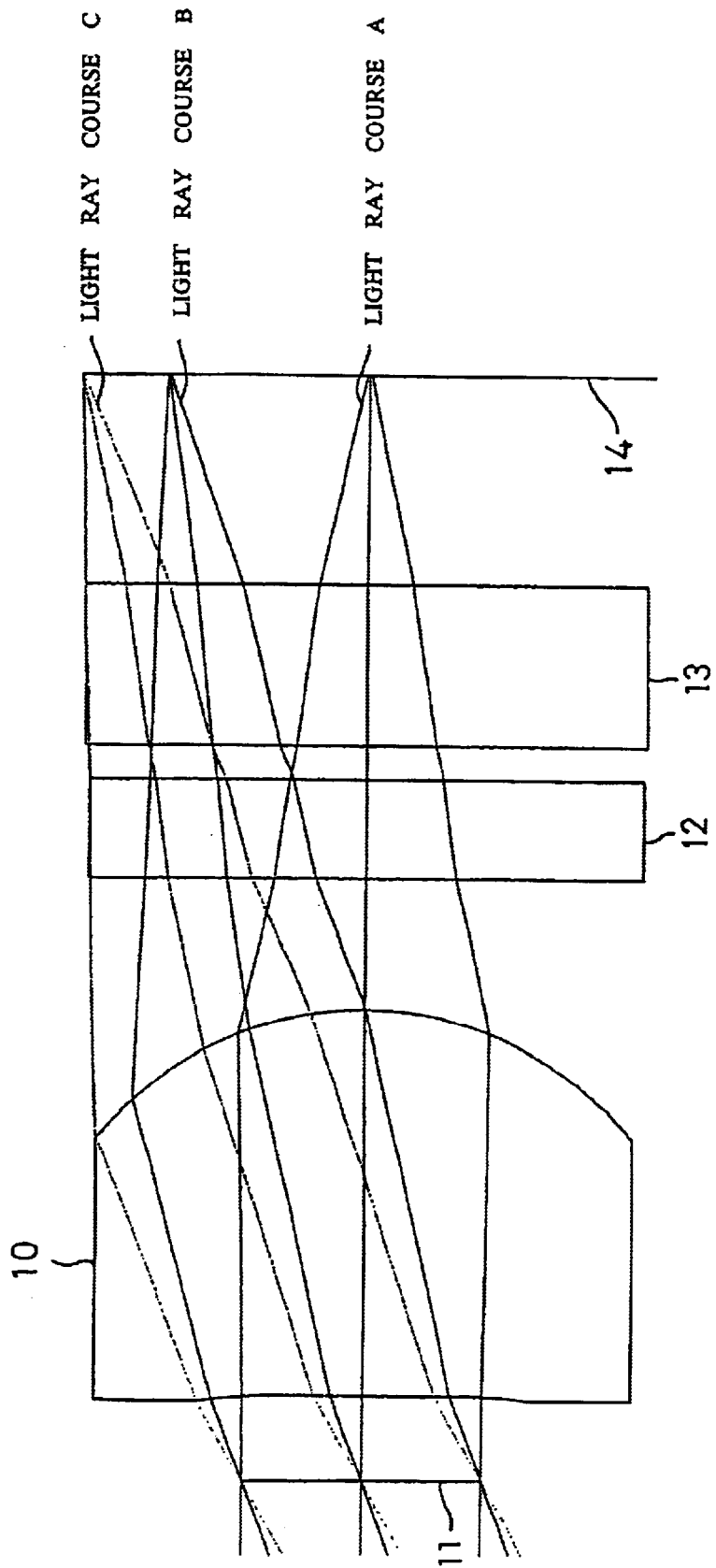
FIG. 1 is a schematic illustration showing an image pickup lens of the related art.
Figure 3:
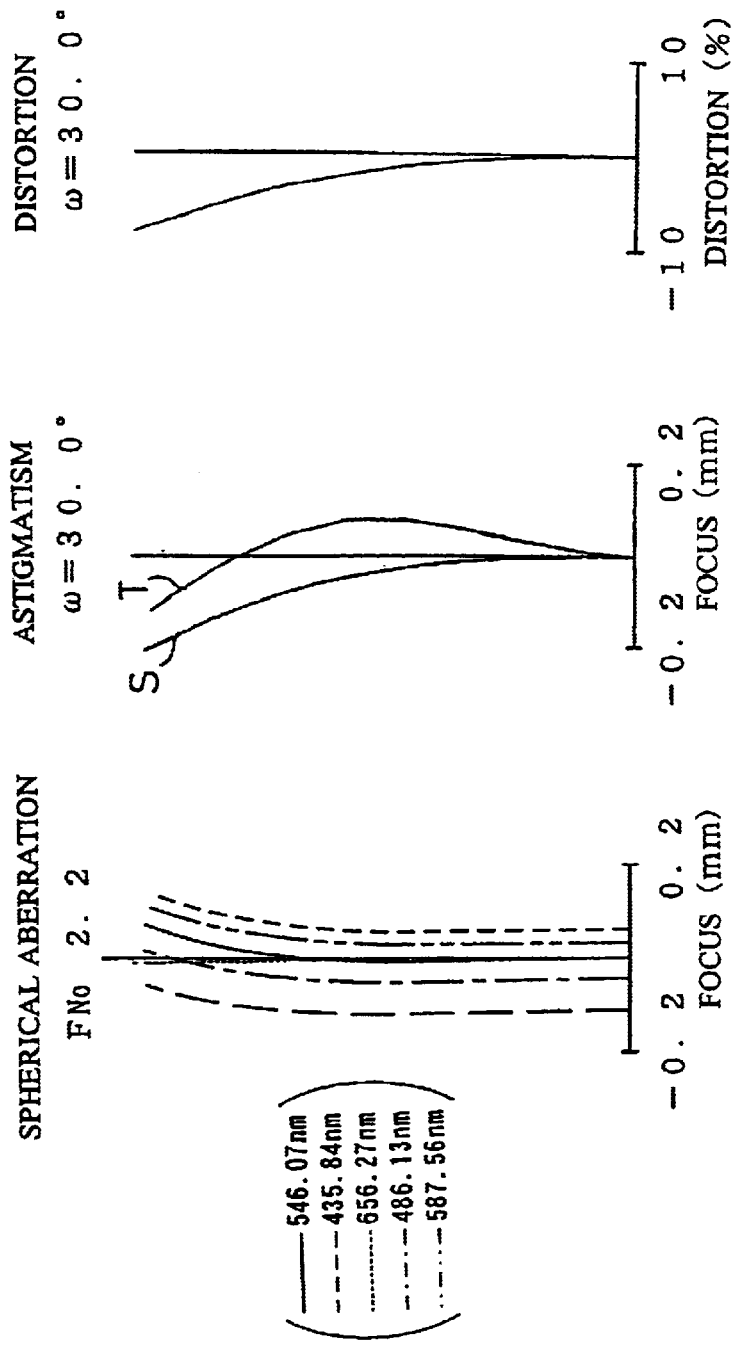
FIG. 3 is an explanatory illustration showing the spherical aberration, the astigmatism, and the distortion aberration of the image pickup lens shown in FIG. 1.
Figure 4:
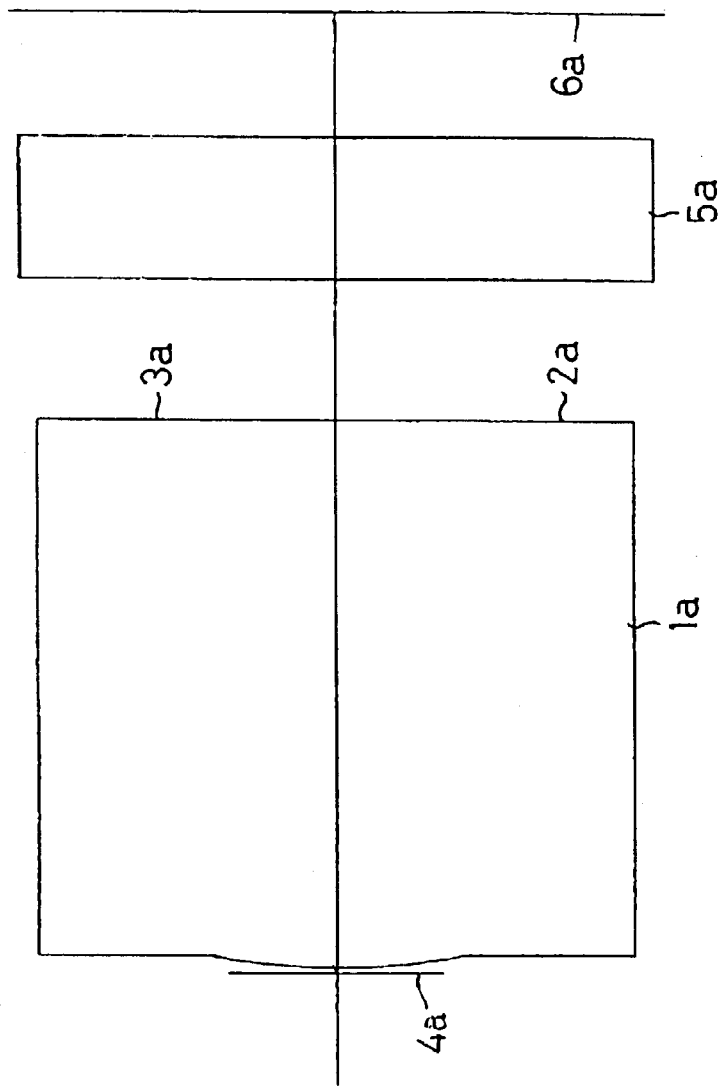
FIG. 4 is a schematic illustration showing an embodiment of the image pickup lens according to the present invention.
Figure 5:
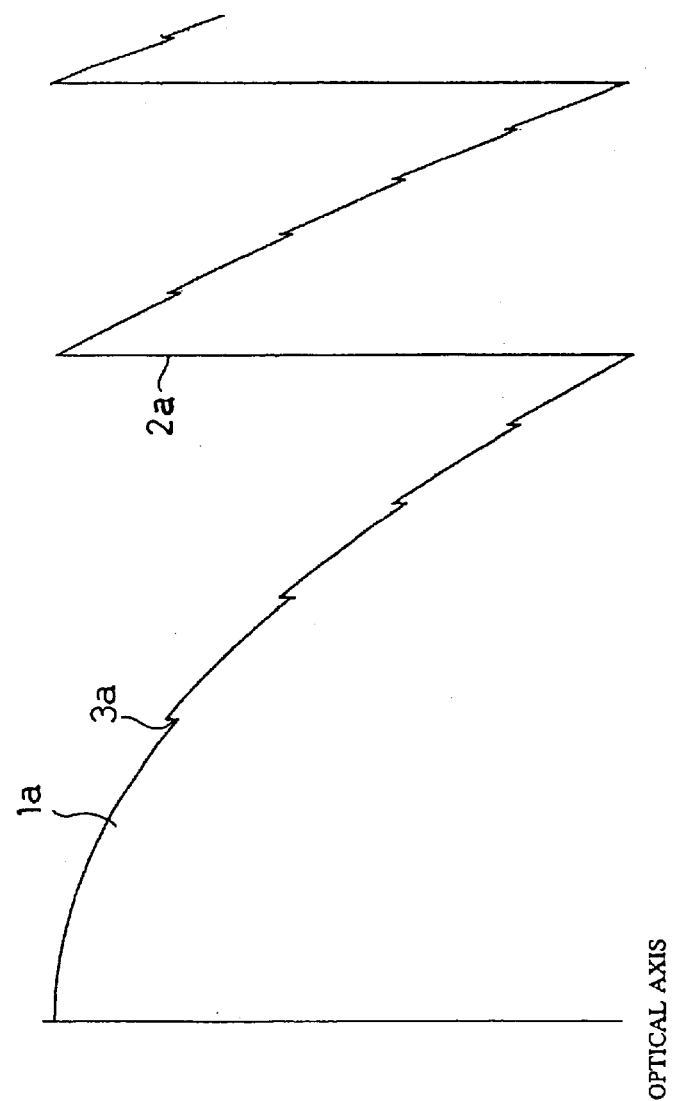
FIG. 5 is an enlarged view of a second face of the image pickup lens shown in FIG. 4.

FIG. 4 shows a basic structure of an image pickup lens according to the present invention. The image pickup lens comprises a lens body 1a made of a resin such as amorphous polyolefin or the like. In this basic embodiment, as shown in FIG. 5, a second face on the image pickup surface side of the lens body 1a is formed into an aspherical Fresnel face 2a and, at the same time, diffraction grooves are formed on the second face and a diffraction element 3a is unified therewith. Further, a first face of the lens body 1a is formed into a spherical face.

The diffraction element 3a may be formed on the first face on an object side of the lens body 1a or on both the first and second faces of the lens body 1a.

A diaphragm 4a is disposed on the object side of the lens body 1a. Also, a cover glass 5a and an image pickup surface 6a as a light receiving surface of an image pickup element such as a CCD, a CMOS or the like are disposed, respectively, on the second face side of the lens body 1a.

In the embodiment, the second face on the image pickup surface 6a side of the lens body 1a is formed into the Fresnel face 2a so that Petzval sum can be corrected. Thus, the curvature of field can be reduced and an excellent image plane can be obtained. Also, the diffraction element 3a is unified with at least either the first or the second face of the lens body 1a so that, due to the color dispersion characteristic of the diffraction element 3a, chromatic aberration can be well corrected. Thereby, the optical characteristic of the image pickup lens can be remarkably improved.

Figure 6:
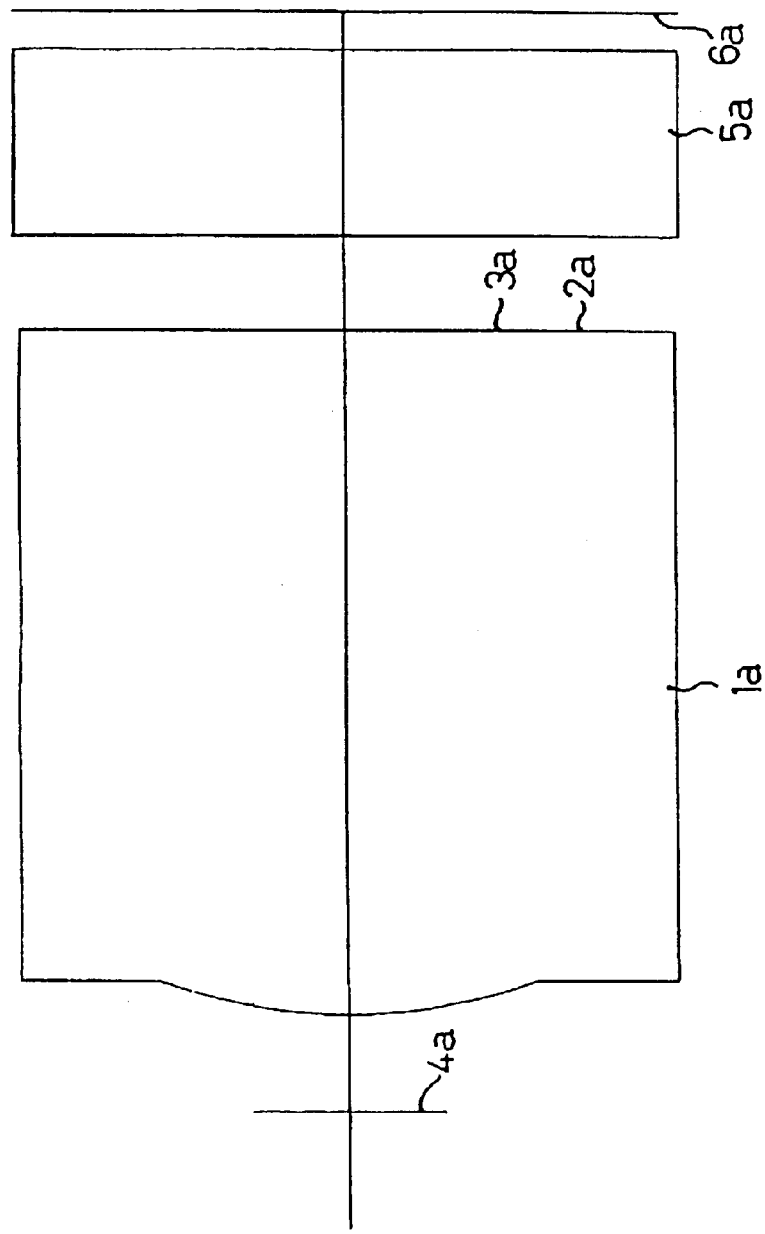
FIG. 6 is a schematic illustration showing another embodiment of the image pickup lens according to the present invention.

FIG. 6 shows another basic embodiment of the present invention. In this embodiment, as in the same manner as the above-described embodiment, the image pickup lens comprises a lens body 1a and a second face on the image pickup surface side of the lens body 1a is formed into an aspherical Fresnel face 2a. At the same time, diffraction grooves are formed on the second face and a diffraction element 3a is unified therewith. Further, a first face of the lens body 1a is formed into a spherical face.

A diaphragm 4a is disposed on the object side of the lens body 1a. Also, a cover glass 6a and an image pickup surface 6a as a light receiving surface of an image pickup element such as a CCD, a CMOS or the like are disposed, respectively, on the second face side of the lens body 1a.

Further, in the embodiment, the lens body 1a is to satisfy the condition represented by the following expressions:

$$1.25 < d/f < 1.45 \quad (1)$$

$$0.6 < |r_2/r_1| < 0.75 \quad (2)$$

$$0 \leq ds/f \leq 0.4 \quad (3)$$

where, d denotes the thickness in the center of the lens body, f denotes the focal length of the lens body, $r_1$ denotes the radius of curvature in the center of the first face of the lens body, $r_2$ denotes the radius of curvature in the center of the second face of the lens body, and ds denotes the distance between the center of the diaphragm and the first face of the lens body.

In the present embodiment, when determining the above-described expression (1) at the time of designing the lens body, first, ray tracing simulation is performed beforehand on a group of lens bodies with different d/f values under the condition where each aberration except for the distortion aberration is maintained to be excellent. Then, dependency of the distortion aberration on the d/f value is obtained by calculating the distortion aberration of the lens bodies. The d/f value as a desired distortion aberration is selected on the basis of the correlation obtained thereby so as to determine the thickness in the center of the lens body based on the selected d/f value.

Figure 7:
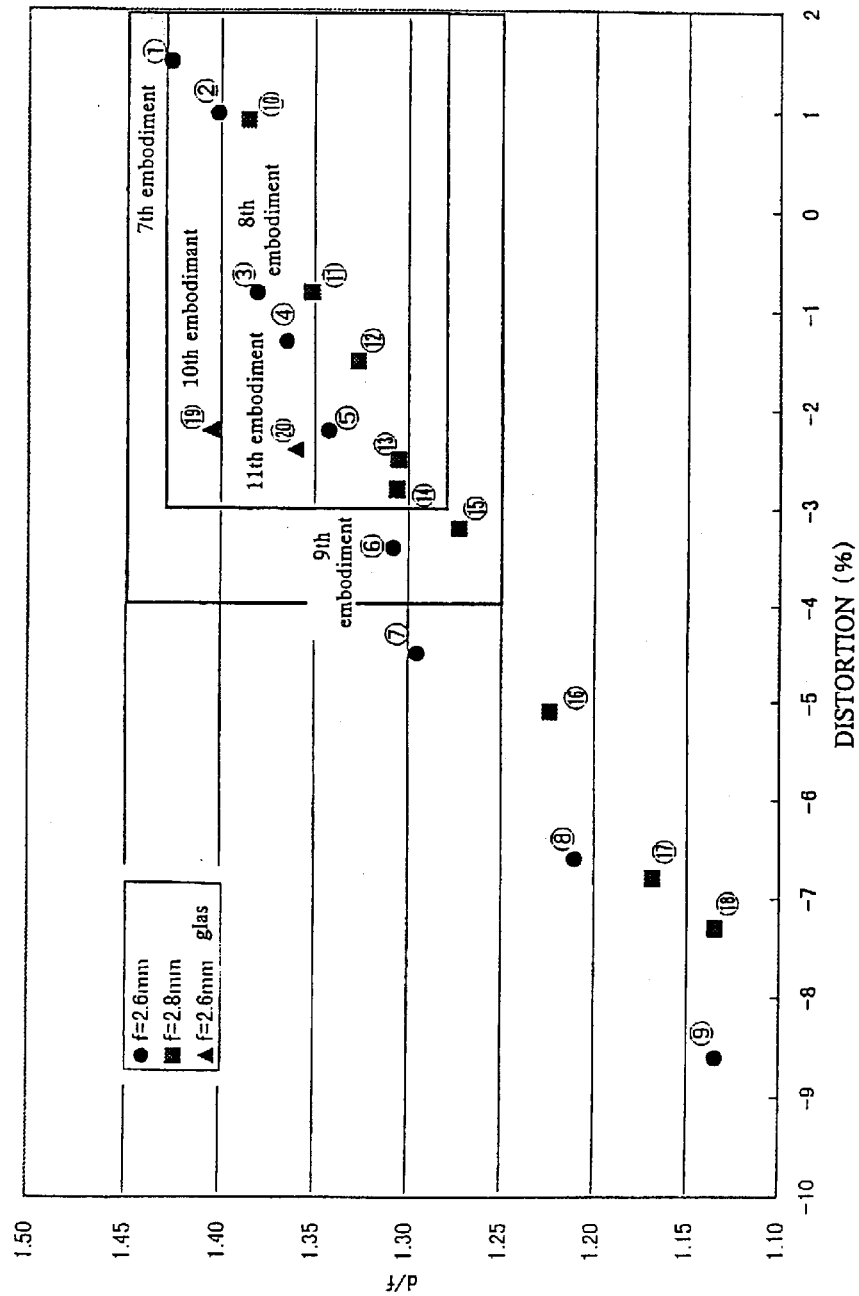
FIG. 7 is a graph showing the correlation between the distortion aberration and the d/f value in the image pickup lens according to the present invention.

FIG. 7 shows the dependency of the distortion aberration on the d/f value. In general, the amount of distortion aberration which is visually comfortable is about −4% to 2% in the field of the present invention. Thus, as shown in FIG. 7, the appropriate d/f value within the range of appropriate distortion aberration amount is set within the large frame shown in the figure. The thickness in the center of the lens body is to be determined on the basis of the d/f value within the range.

More preferably, the distortion aberration amount may fall within the range of −3% to 2%. Under the condition, the appropriate d/f value within the range of the appropriate distortion aberration amount is set within the small frame shown in FIG. 7. This can be represented by a following expression:

$$1.28 < d/f < 1.43 \quad (3a)$$

Also, in the same manner, when determining the expression (2), ray tracing simulation is performed beforehand on a group of lens bodies with different $|r_2/r_1|$ values under the condition where each aberration except for the distortion aberration is maintained to be excellent. Then, dependency of the distortion aberration on the $|r_2/r_1|$ value is obtained by calculating the distortion aberration of the lens bodies. The $|r_2/r_1|$ value as a desired distortion aberration is selected on the basis of the correlation obtained thereby so as to determine the radius of curvature in the center of the lens body based on the selected $|r_2/r_1|$ value.

Figure 8:
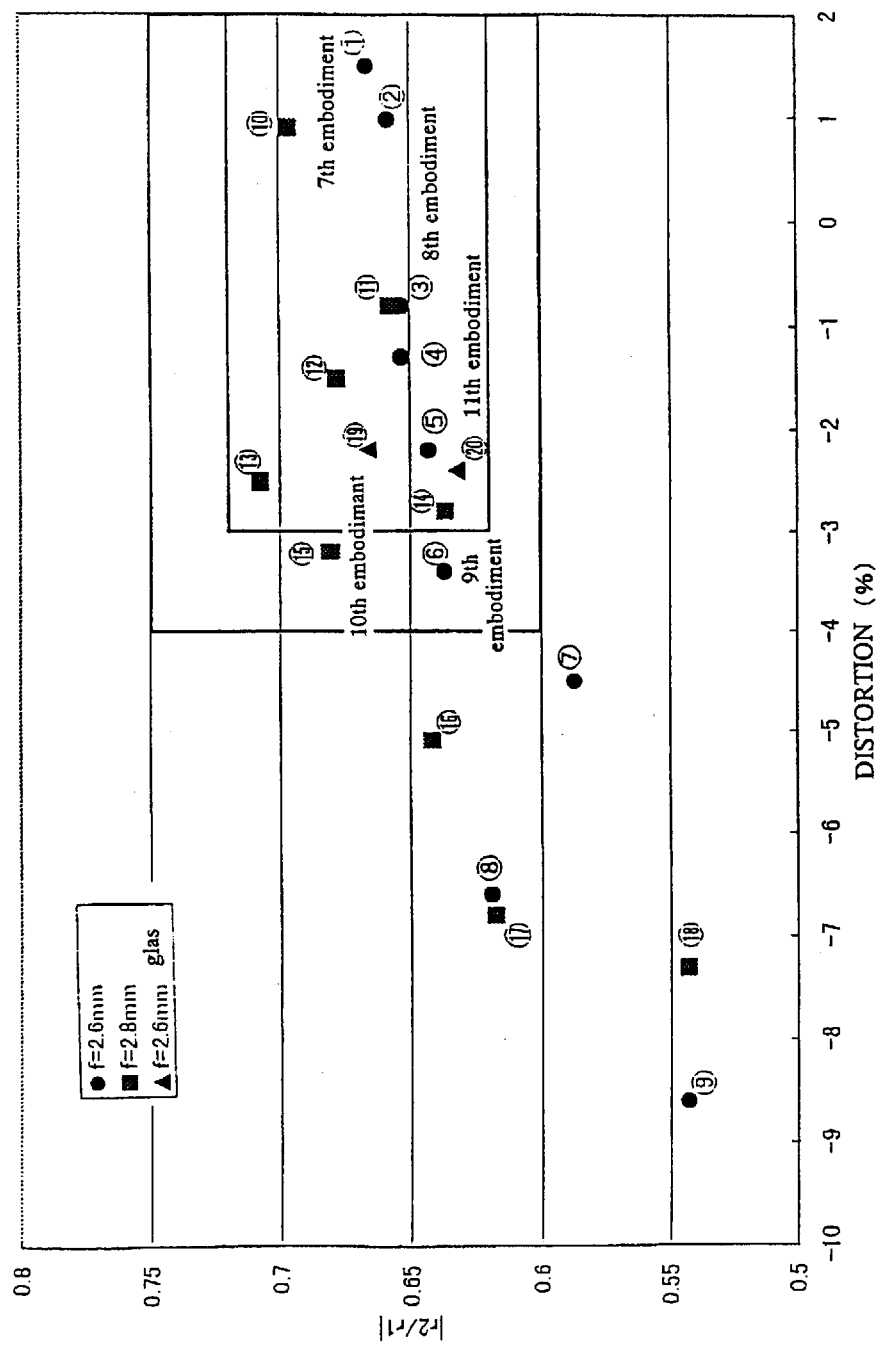
FIG. 8 is a graph showing the correlation between the distortion aberration and the $|r_2/r_1|$ value in the image pickup lens according to the present invention.

FIG. 8 shows the dependency of the distortion aberration on the $|r_2/r_1|$ value. The appropriate $|r_2/r_1|$ value within the range of appropriate distortion aberration amount for achieving −4% to 2% distortion aberration falls within the large frame show in FIG. 8. The radius of curvature in the center of the lens body is to be determined on the basis of the $|r_2/r_1|$ value within the range.

More preferably, the distortion aberration amount may fall within the range of −3% to 2%. Under the condition, the appropriate $|r_2/r_1|$ value within the range of appropriate distortion aberration amount is set within the small frame shown in FIG. 8. This can be represented by a following expression:

$$0.62 < |r_2/r_1| < 0.72 \quad (3b)$$

The expression (1) is a condition for correcting the distortion aberration amount with a comfortable visual sense while well maintaining the aberration except for the distortion aberration. In the expression (1), if the d/f value is larger than 1.45, the distortion aberration becomes large in the positive direction so that the back focus becomes short. If the d/f value is smaller than 1.25, the distortion aberration in the negative direction becomes large. Thus, even though the distortion aberration can be suppressed, the curvature of field, the longitudinal chromatic aberration, the lateral aberration, the spherical aberration and the like cannot be well corrected.

Further, the expression (2) is a condition for achieving an ideal lens shape in which each aberration is well balanced. In the expression (2), if the $|r_2/r_1|$ value is larger than 0.75 or smaller than 0.6, mainly the spherical aberration becomes worsen resulting in deterioration of resolution.

Furthermore, the expression (3) is a condition for correcting the coma aberration while achieving an excellent balance of coma aberration and the distortion aberration. In the expression (3), if the ds/f value is larger than 0.4, the coma aberration cannot be sufficiently corrected and if it is smaller than 0, the diaphragm is to be in the lens body. Thus, it is not desirable since it becomes difficult to manufacture.

In the present embodiment, by satisfying the expressions (1) to (3), the distortion aberration can be well corrected compared to the case of the previously described embodiment shown in FIG. 4.

EXAMPLES

Now, Examples of the present invention will be described by referring to FIG. 9 to FIG. 41.

In the Examples, f denotes the focal length (mm) of the whole system, F No denotes F number, and 2ω denotes the maximum angle of view. Further, r denotes the radius of curvature (mm) in the center of the optical surface, d denotes the distance (mm) between each optical surface on the optical axis, nd denotes the refractive index of an optical material (medium) present between with the next optical surface, and σd denotes the Abbe constant.

Provided the optical axis direction is taken as a Z-axis, the direction perpendicular to the optical axis is taken as an X-axis, and the traveling direction of light is defined to be positive, the shape of the aspheric face of the lens is represented by a following expression (Eq 2):

$$Z = \frac{\frac{x^2}{r}}{1 + \sqrt{1 - (k+1)\frac{x^2}{r^2}}} + a_4 x^4 + a_6 x^6 + a_8 x^8 + a_{10} x^{10}$$

where, each of k, $a_4$, $a_6$, $a_8$ and $a_{10}$ is an aspherical factor.

Furthermore, in the present basic embodiment, optical design of the diffraction element is achieved using high diffractive index method according to a monograph "Mathematical equivalence between a holographic optical element and an ultra-high index lens (Optical Society of America, Vol. 69, No. 3, March 1979)" by William C. Sweatt. The diffraction element is approximately provided by a high refractive index thin film with the refractive index nd of a d line (587.56 nm)=894.498 and the Abbe constant σd=−3.45, thereby to design an achromatic lens using a primary diffraction light.

Example 1

Figure 9:
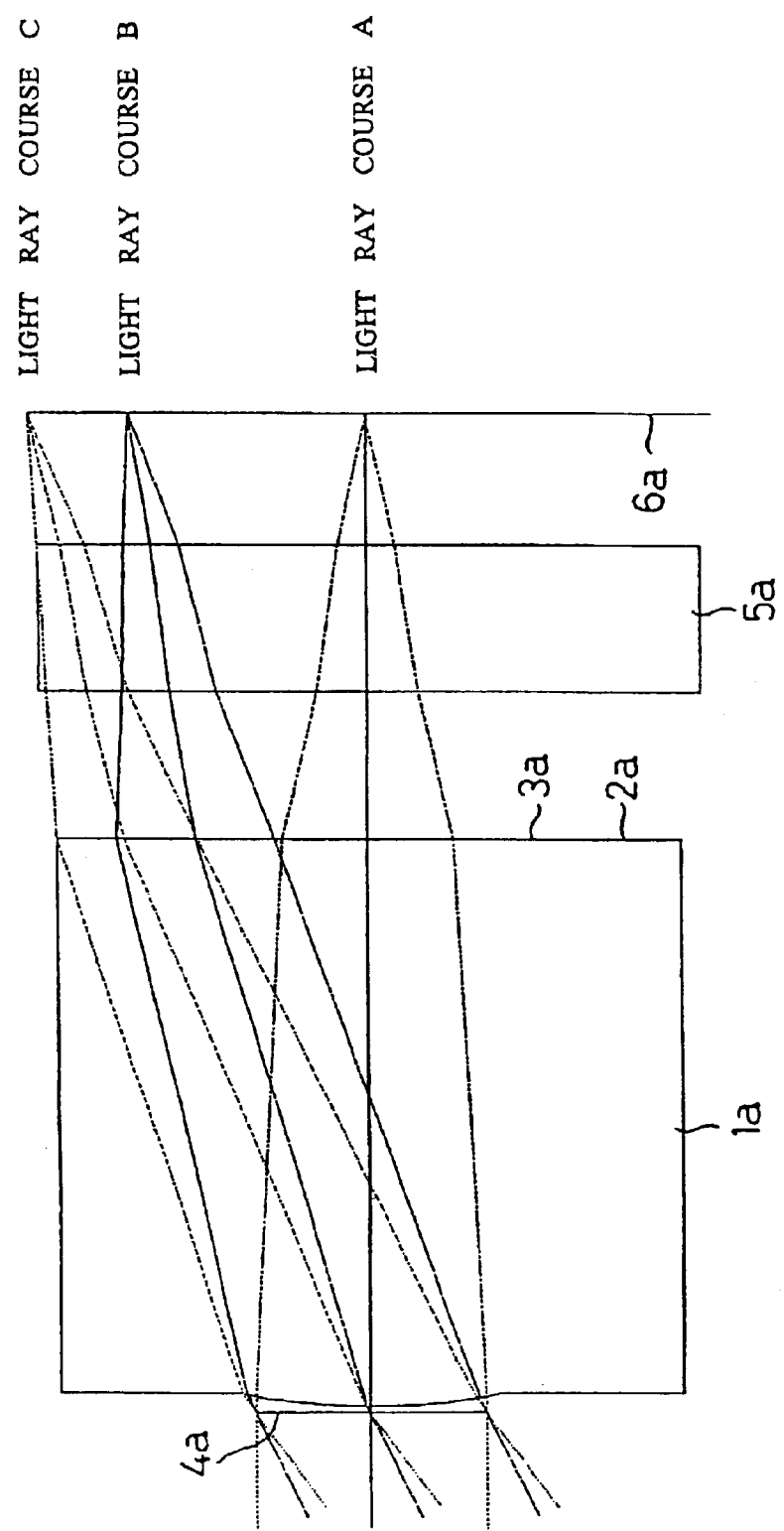
FIG. 9 is a schematic illustration showing Example 1 of the image pickup lens according to the present invention.

FIG. 9 shows Example 1 of the present invention. In Example 1, the second face of the lens body 1a was formed into the Fresnel face 2a while being unified with the diffraction element 3a as in the same manner as that of the first embodiment shown in FIG. 4.

The image pickup lens of Example 1 was set under the following condition:

| f = 3.5 mm, F No = 2.2, 2ω = 71.9, Petzval sum = 0.33 | | | | |
|---|---|---|---|---|
| Face | Radius r of Curvature | Distance d | Refractive Index nd | Abbe constant vd |
| (1) Diaphragm | 0.000 | 0.0433 | | |
| (2) First face of lens body | 4.704 | 3.8538 | 1.518 | 56.0 |
| (3) Second face of lens body | −2.359 | 0.0000 | 894.498 | −3.45 |
| (4) High refractive index layer | −2.359 | 1.0000 | | |
| (5) First face of cover glass | 0.000 | 1.0000 | 1.5163 | 64.0 |
| (6) Second face of cover glass | 0.000 | 0.8602 | | |
| (7) Image pickup surface | 0.000 | | | |

| Aspherical Factor | | | |
|---|---|---|---|
| Face | k | $a_4$ | $a_6$ |
| 2 | 2.156864e+01 | −4.111183e−02 | 2.443172e−02 |
| 3 | −9.965983e−01 | 8.726602e−04 | 2.241136e−04 |
| 4 | −9.947408e−01 | 8.902002e−04 | 2.238210e−04 |
| Face | $a_8$ | | $a_{10}$ |
| 2 | −5.527421e−02 | | 7.460217e−04 |
| 3 | 1.966780e−06 | | 2.448387e−07 |
| 4 | 2.033151e−06 | | 2.443486e−07 |

Figure 10:
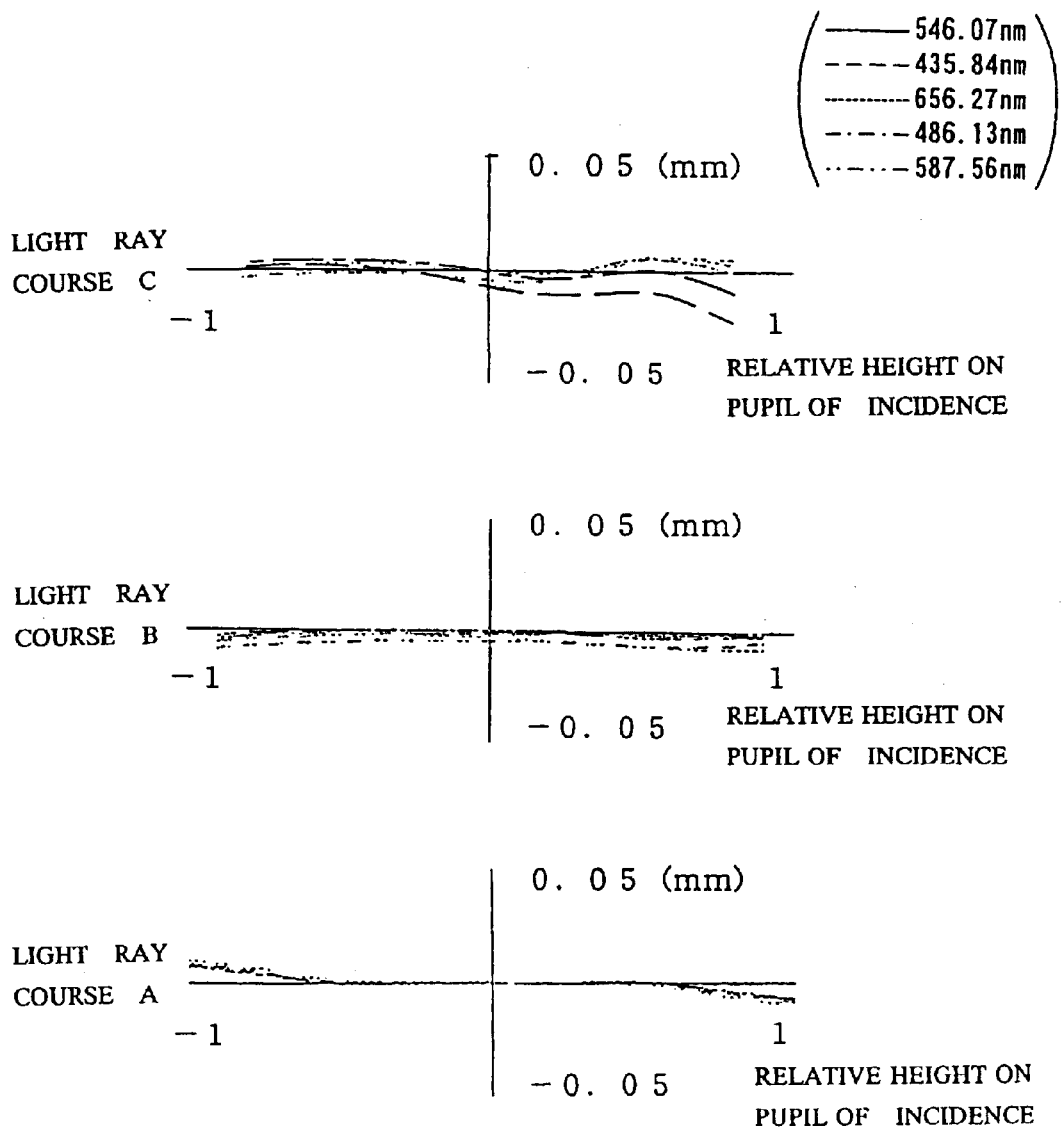
FIG. 10 is an explanatory illustration showing the chromatic aberration of magnification of the image pickup lens shown in FIG. 9.

FIG. 10 shows the chromatic aberration of magnification of ray paths A, B, and C, respectively, in regards to the image pickup lens of Example 1 under such condition. According to the figure, it is clear that the chromatic aberration of magnification in each ray path is decreased.

Figure 11:
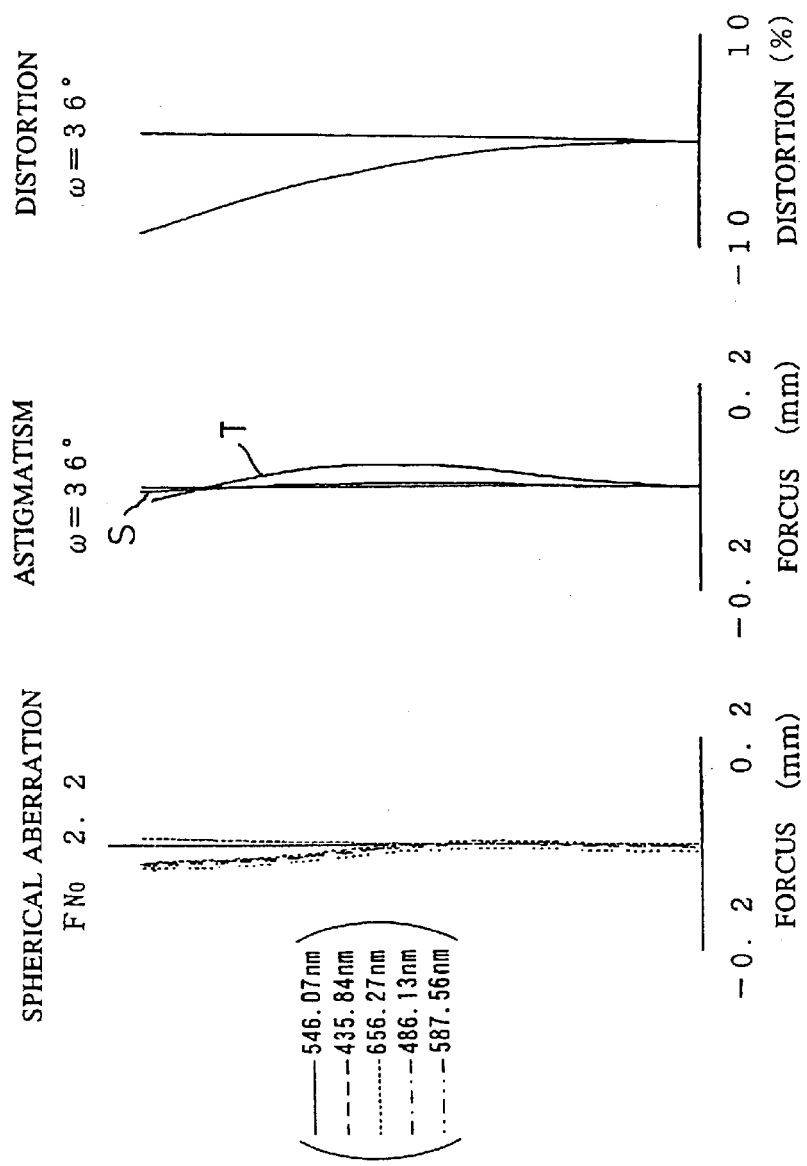
FIG. 11 is an explanatory illustration showing the spherical aberration, the astigmatism, and the distortion aberration of the image pickup lens shown in FIG. 9.

Further, FIG. 11 shows the spherical aberration, the astigmatism, and the distortion aberration in the image pickup lens of Example 1. According to the figure, it is clear that each value of the spherical aberration, the astigmatism and the distortion aberration is almost satisfactory so that a sufficient optical characteristic can be obtained.

Example 2

Figure 12:
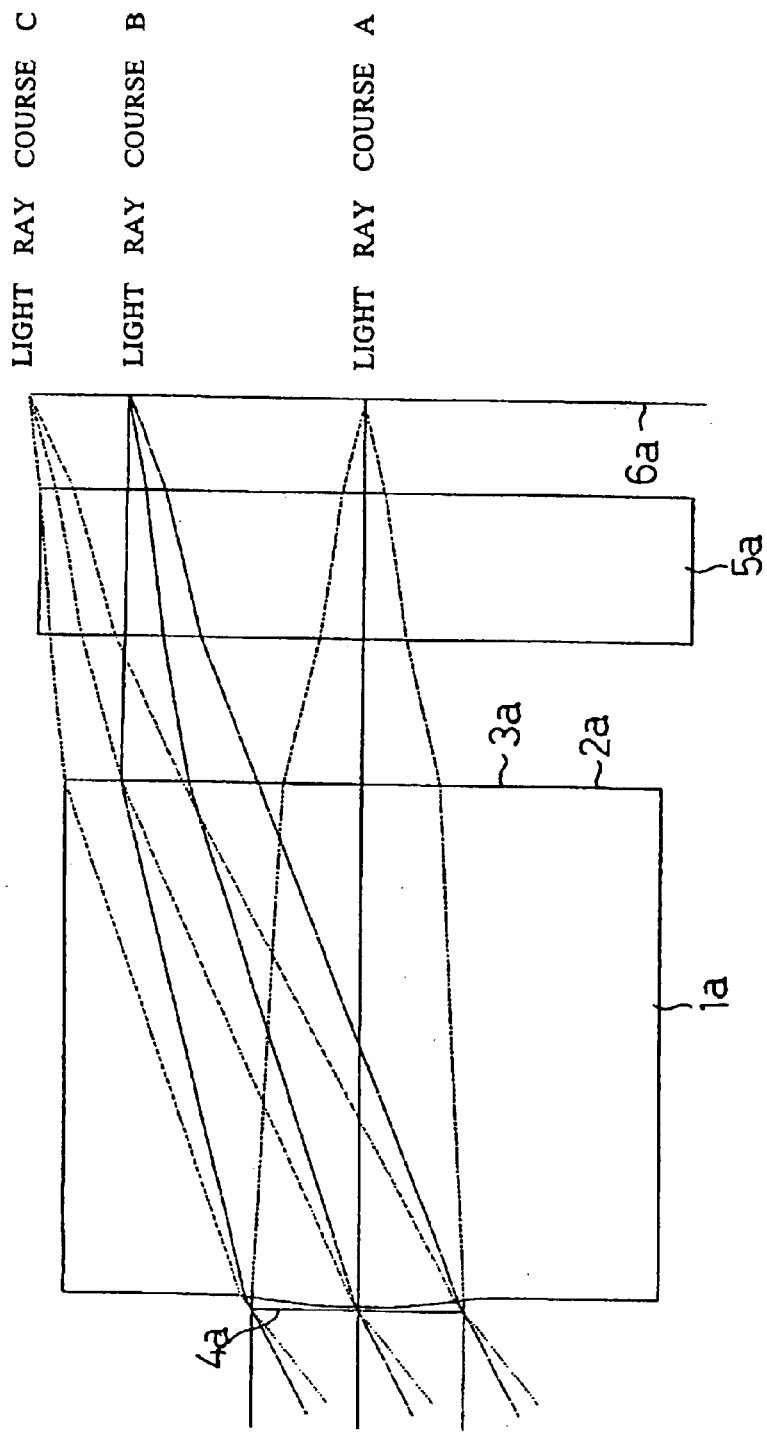
FIG. 12 is a schematic illustration showing Example 2 of the image pickup lens according to the present invention.

FIG. 12 shows Example 2 of the present invention. In Example 2, the second face of the lens body 1a was formed into the Fresnel face 2a while being unified with the diffraction element 3a as in the same manner as that of the first basic embodiment shown in FIG. 4. Further, it was a wide-angle lens in which the focal length was shortened and the angle of view was widened.

The image pickup lens of Example 2 was set under the following condition:

| f = 3.2 mm, F No = 2.2, 2ω = 77.8, Petzval sum = 0.36 | | | | |
|---|---|---|---|---|
| Face | Radius r of Curvature | Distance d | Refractive | Abbe constant vd |
| (1) Diaphragm | 0.000 | 0.0248 | | |
| (2) First face of lens body | 4.324 | 3.5629 | 1.518 | 56.0 |
| (3) Second face of lens body | −2.181 | 0.0000 | 894.498 | −3.45 |
| (4) High refractive index layer | −2.181 | 1.0000 | | |
| (5) First face of cover glass | 0.000 | 1.0000 | 1.5163 | 64.0 |
| (6) Second face of cover glass | 0.000 | 0.6392 | | |
| (7) Image pickup surface | 0.000 | | | |

| Aspherical Factor | | | |
|---|---|---|---|
| Face | k | $a_4$ | $a_6$ |
| 2 | 2.286029e+01 | −4.923784e−02 | 8.434293e−03 |
| 3 | −9.991159e−01 | 8.548763e−04 | 2.344517e−04 |
| 4 | −9.971921e−01 | 8.783094e−04 | 2.339980e−04 |
| Face | $a_8$ | | $a_{10}$ |
| 2 | −3.738623e−02 | | −6.523998e−02 |
| 3 | 4.159776e−06 | | 5.691857e−07 |
| 4 | 4.274579e−06 | | 5.700872e−07 |

Figure 13:
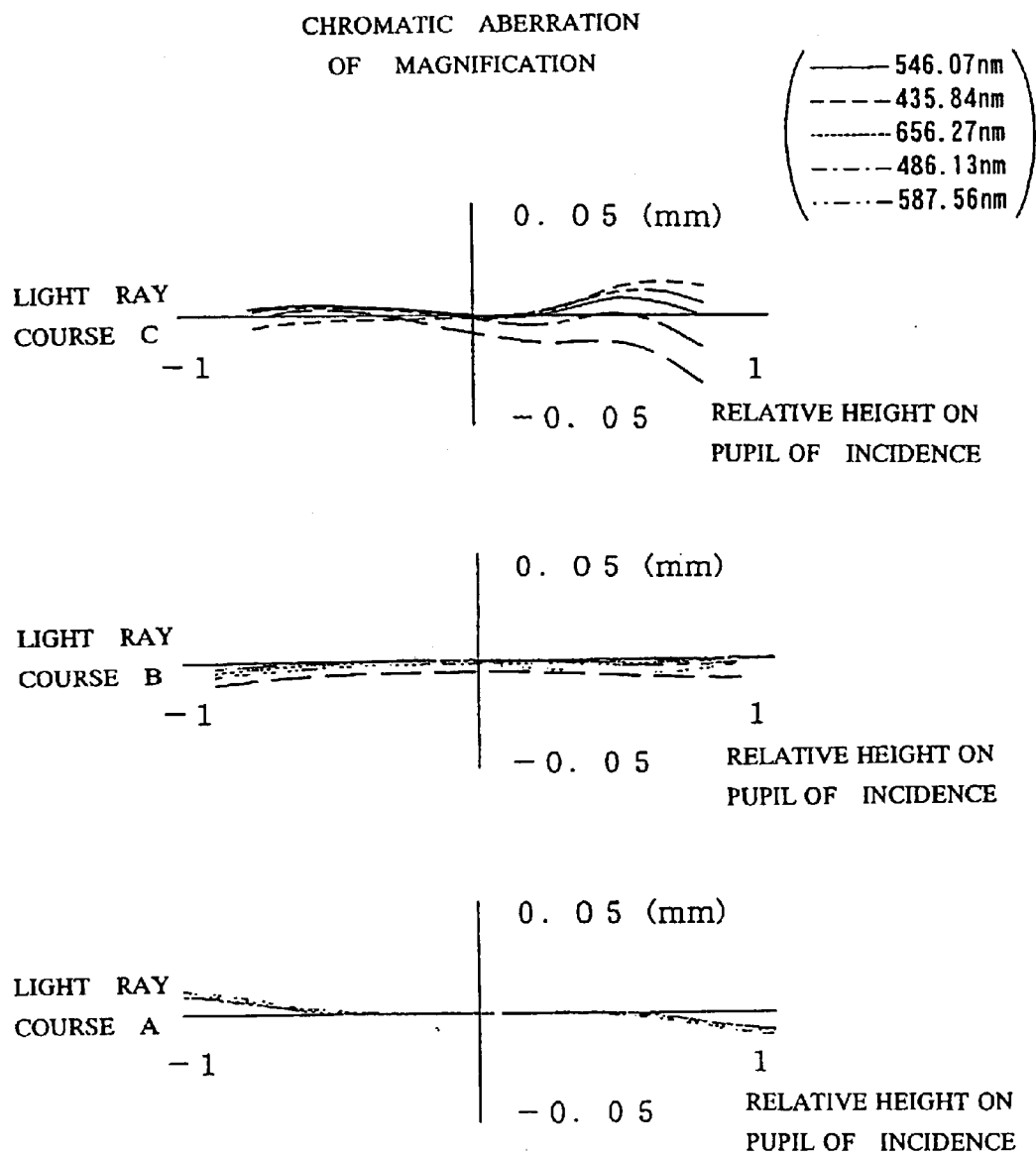
FIG. 13 is an explanatory illustration showing the chromatic aberration of magnification of the image pickup lens shown in FIG. 12.

FIG. 13 shows the chromatic aberration of magnification of ray paths A, B, and C, respectively, in regards to the image pickup lens of Example 2 under such condition. According to the figure, it is clear that the chromatic aberration of magnification in each ray path is decreased.

Figure 14:
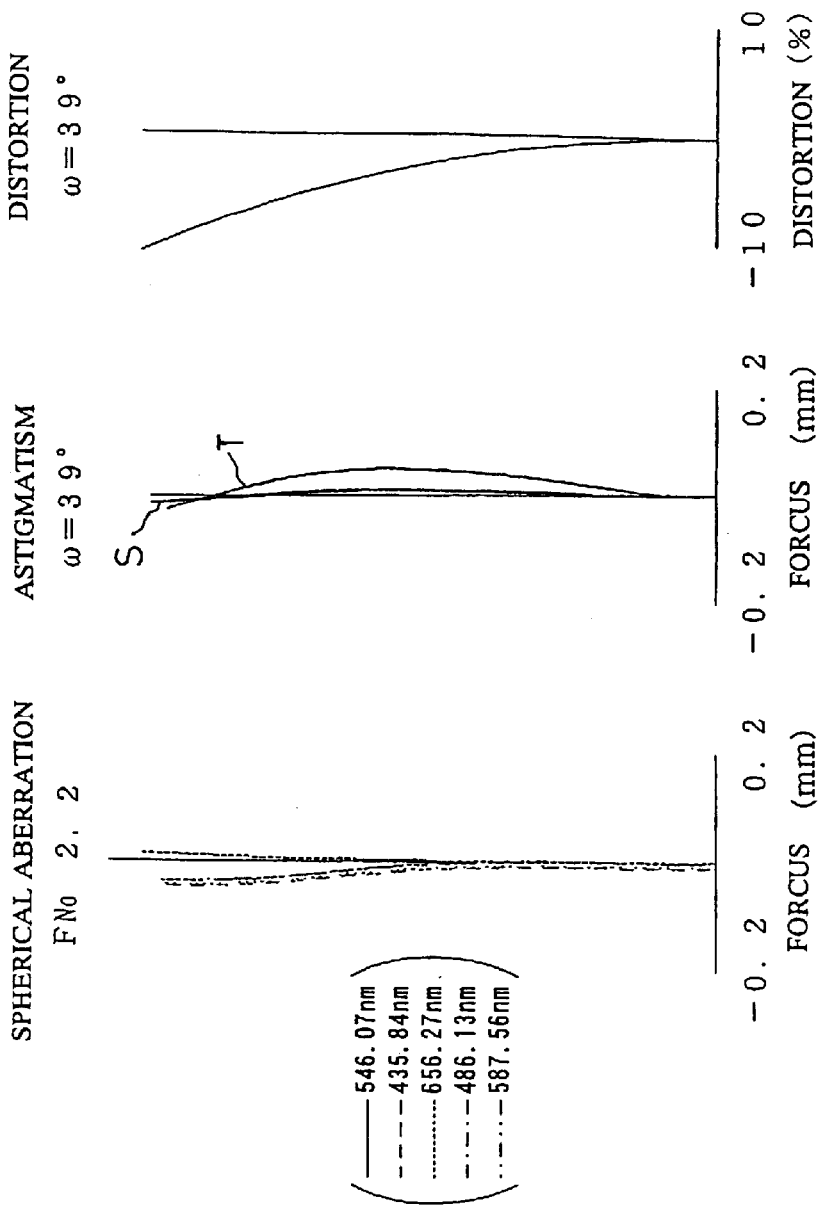
FIG. 14 is an explanatory illustration showing the spherical aberration, the astigmatism, and the distortion aberration of the image pickup lens shown in FIG. 12.

Further, FIG. 14 shows the spherical aberration, the astigmatism, and the distortion aberration in the image pickup lens of Example 2. According to the figure, it is clear that each value of the spherical aberration, the astigmatism and the distortion aberration is almost satisfactory so that a sufficient optical characteristic can be obtained.

Example 3

Figure 15:
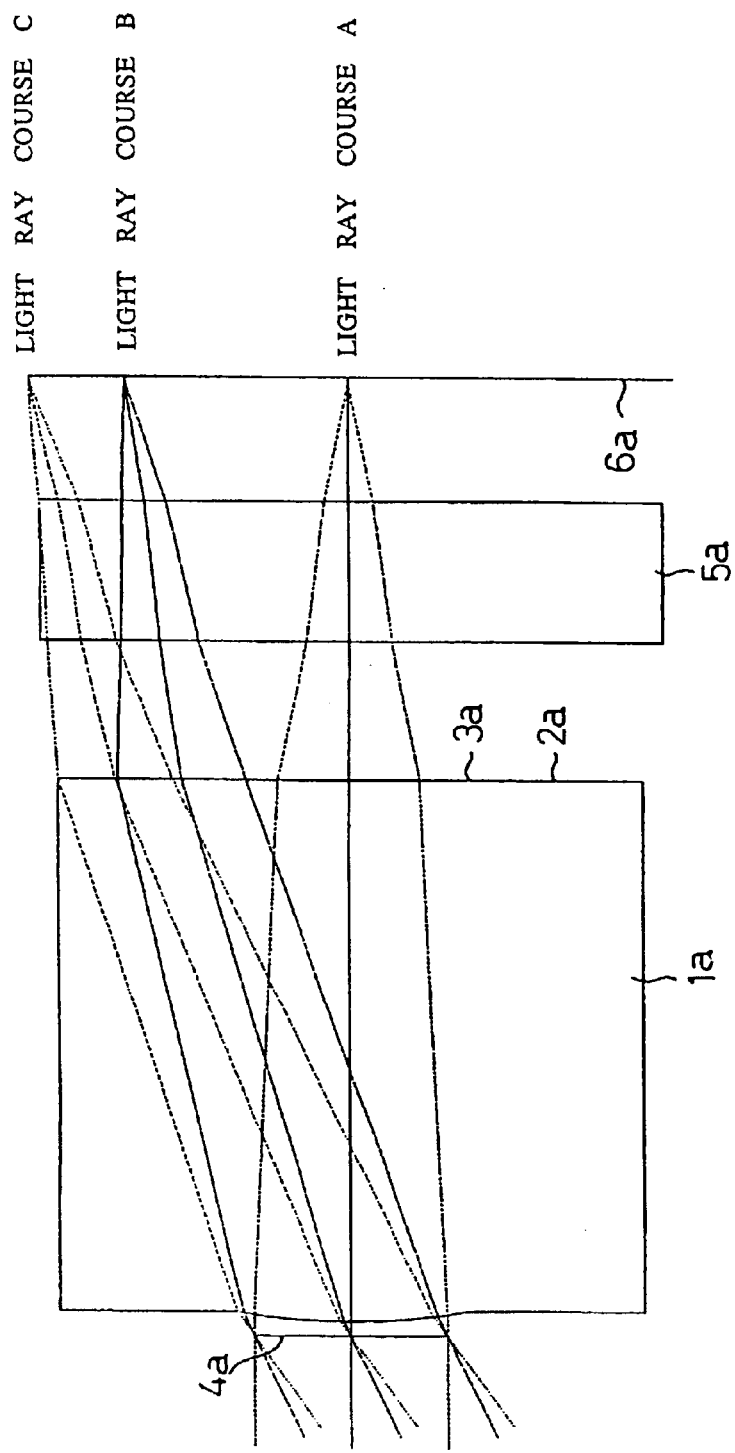
FIG. 15 is a schematic illustration showing Example 3 of the image pickup lens according to the present invention.

FIG. 15 shows Example 3 of the present invention. In Example 3, the second face of the lens body 1a was formed into the Fresnel face 2a while being unified with the diffraction element 3a as in the same manner as that of the first basic embodiment shown in FIG. 4. Further, it was a lens in which the F number was set to be little darker so as to improve the image quality.

The image pickup lens of Example 3 was set under the following condition:

| f = 3.5 mm, F No = 2.5, 2ω = 71.8, Petzval sum = 0.33 | | | | |
|---|---|---|---|---|
| Face | Radius r of Curvature | Distance d | Refractive Index nd | Abbe constant vd |
| (1) Diaphragm | 0.000 | 0.1000 | | |
| (2) First face of lens body | 4.771 | 3.9000 | 1.518 | 56.0 |
| (3) Second face of lens body | −2.341 | 0.0000 | 894.498 | −3.45 |
| (4) High refractive index layer | −2.341 | 1.0000 | | |
| (5) First face of cover glass | 0.000 | 1.0000 | 1.5163 | 64.0 |
| (6) Second face of cover glass | 0.000 | 0.8622 | | |
| (7) Image pickup surface | 0.000 | | | |

| Aspherical Factor | | | |
|---|---|---|---|
| Face | k | $a_4$ | $a_6$ |
| 2 | 2.043376e+01 | −3.957181e−02 | 5.313152e−02 |
| 3 | −9.948575e−01 | 8.813805e−04 | 2.175968e−04 |
| 4 | −9.939222e−01 | 8.903731e−04 | 2.172255e−04 |
| Face | | $a_8$ | $a_{10}$ |
| 2 | | −1.398622e−01 | 8.238725e−02 |
| 3 | | 6.522519e−07 | 6.956115e−08 |
| 4 | | 7.494107e−07 | 6.502132e−08 |

Figure 16:
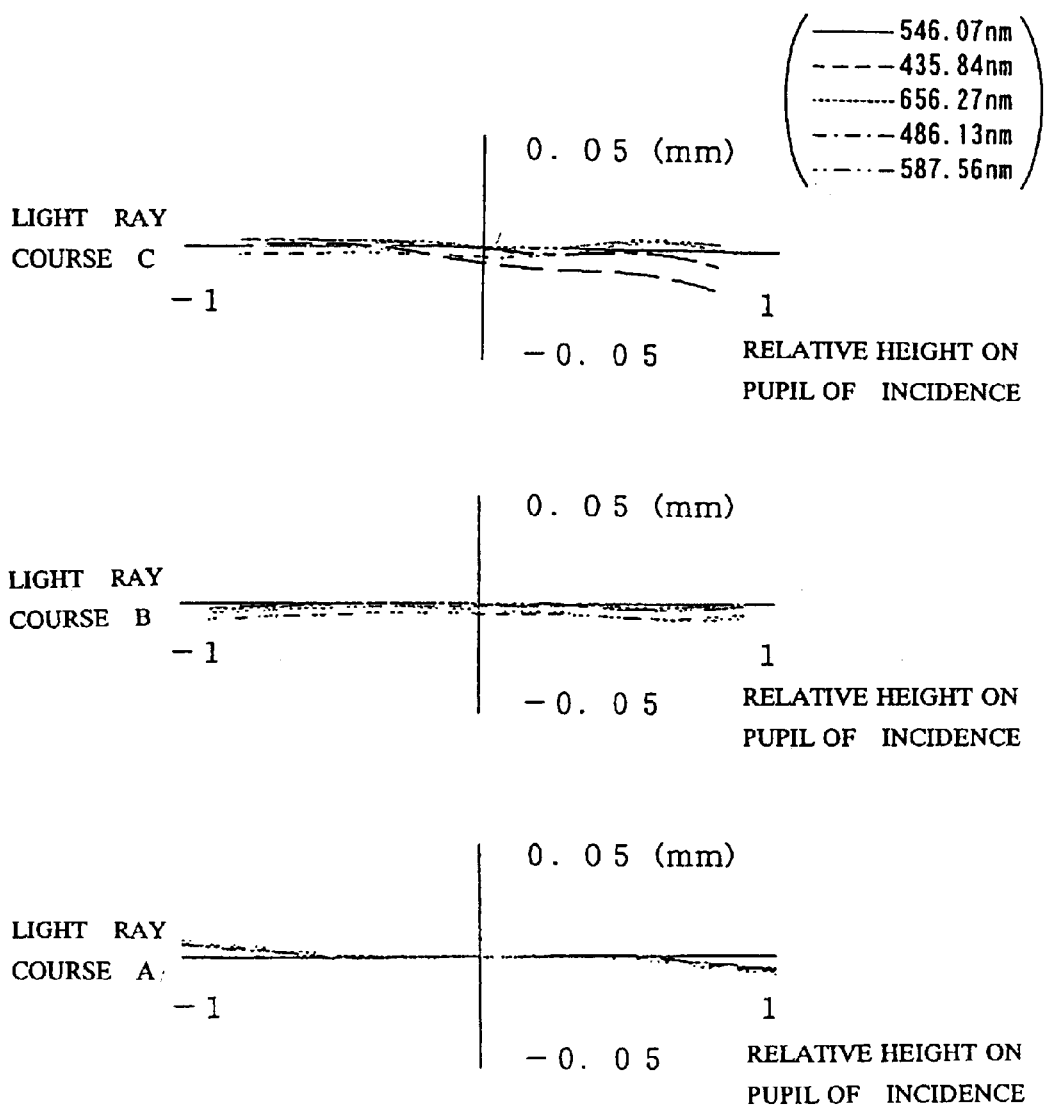
FIG. 16 is an explanatory illustration showing the chromatic aberration of magnification of the image pickup lens shown in FIG. 15.

FIG. 16 shows the chromatic aberration of magnification of ray paths A, B, and C, respectively, in regards to the image pickup lens of Example 3 under such condition. According to the figure, it is clear that the chromatic aberration of magnification in each ray path is decreased.

Figure 17:
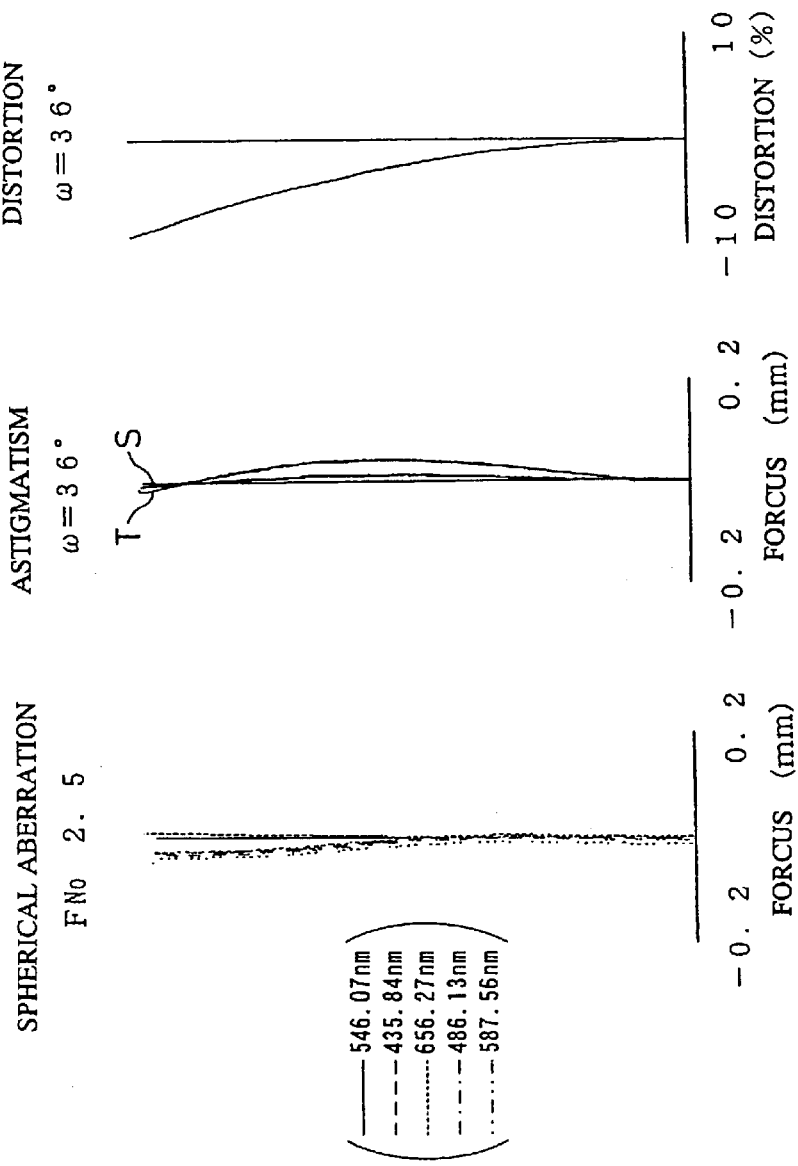
FIG. 17 is an explanatory illustration showing the spherical aberration, the astigmatism, and the distortion aberration of the image pickup lens shown in FIG. 15.

Further, FIG. 17 shows the spherical aberration, the astigmatism, and the distortion aberration in the image pickup lens of Example 3. According to the figure, it is clear that each value of the spherical aberration, the astigmatism and the distortion aberration is almost satisfactory so that a sufficient optical characteristic can be obtained.

Example 4

Figure 18:
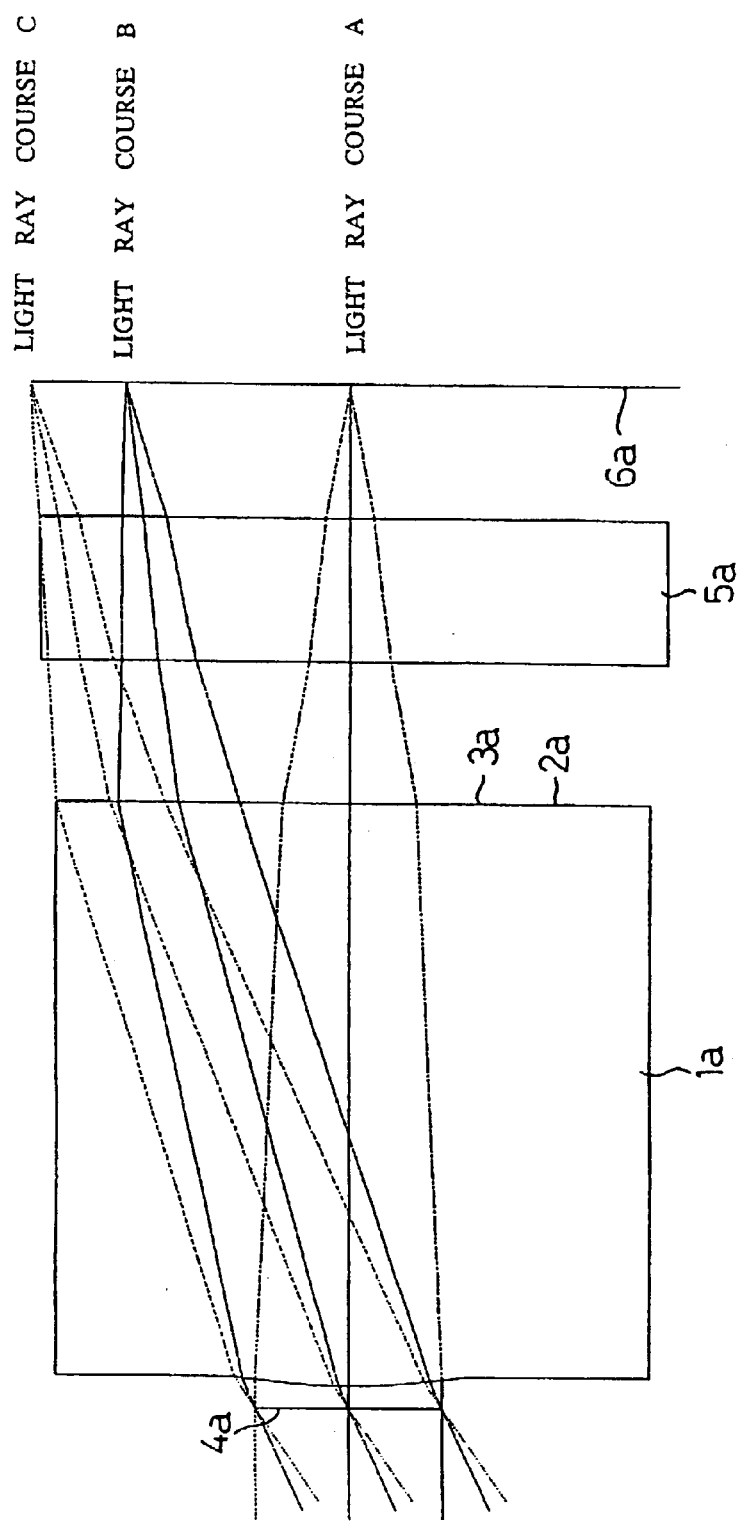
FIG. 18 is a schematic illustration showing Example 4 of the image pickup lens according to the present invention.

FIG. 18 shows Example 4 of the present invention. In Example 4, the second face of the lens body 1a was formed into the Fresnel face 2a while being unified with the diffraction element 3a as in the same manner as that of the first basic embodiment shown in FIG. 4. Further, it was a lens in which the F number was set to be little darker and the angle of view was narrowed so as to improve the image quality.

The image pickup lens of Example 4 was set under the following condition:

| f = 3.7 mm, F No = 2.8, 2ω = 68.0, Petzval sum = 0.32 | | | | |
|---|---|---|---|---|
| Face | Radius r of Curvature | Distance d | Refractive Index nd | Abbe constant vd |
| (1) Diaphragm | 0.000 | 0.1548 | | |
| (2) First face of lens body | 4.852 | 4.1736 | 1.518 | 56.0 |
| (3) Second face of lens body | −2.483 | 0.0000 | 894.498 | −3.45 |
| (4) High refractive index layer | −2.483 | 1.0000 | | |
| (5) First face of cover glass | 0.000 | 1.0000 | 1.5163 | 64.0 |
| (6) Second face of cover glass | 0.000 | 0.9523 | | |
| (7) Image pickup surface | 0.000 | | | |

| Aspherical Factor | | | |
|---|---|---|---|
| Face | k | $a_4$ | $a_6$ |
| 2 | 1.431475e+01 | −2.907101e−02 | 5.371395e−02 |
| 3 | −9.932373e−01 | 9.049265e−04 | 2.272390e−04 |
| 4 | −9.925322e−01 | 9.105759e−04 | 2.269840e−04 |
| Face | | $a_8$ | $a_{10}$ |
| 2 | | −1.329815e−01 | 9.279416e−02 |
| 3 | | 2.835733e−06 | 3.444509e−07 |
| 4 | | 2.891540e−06 | 3.426274e−07 |

Figure 19:
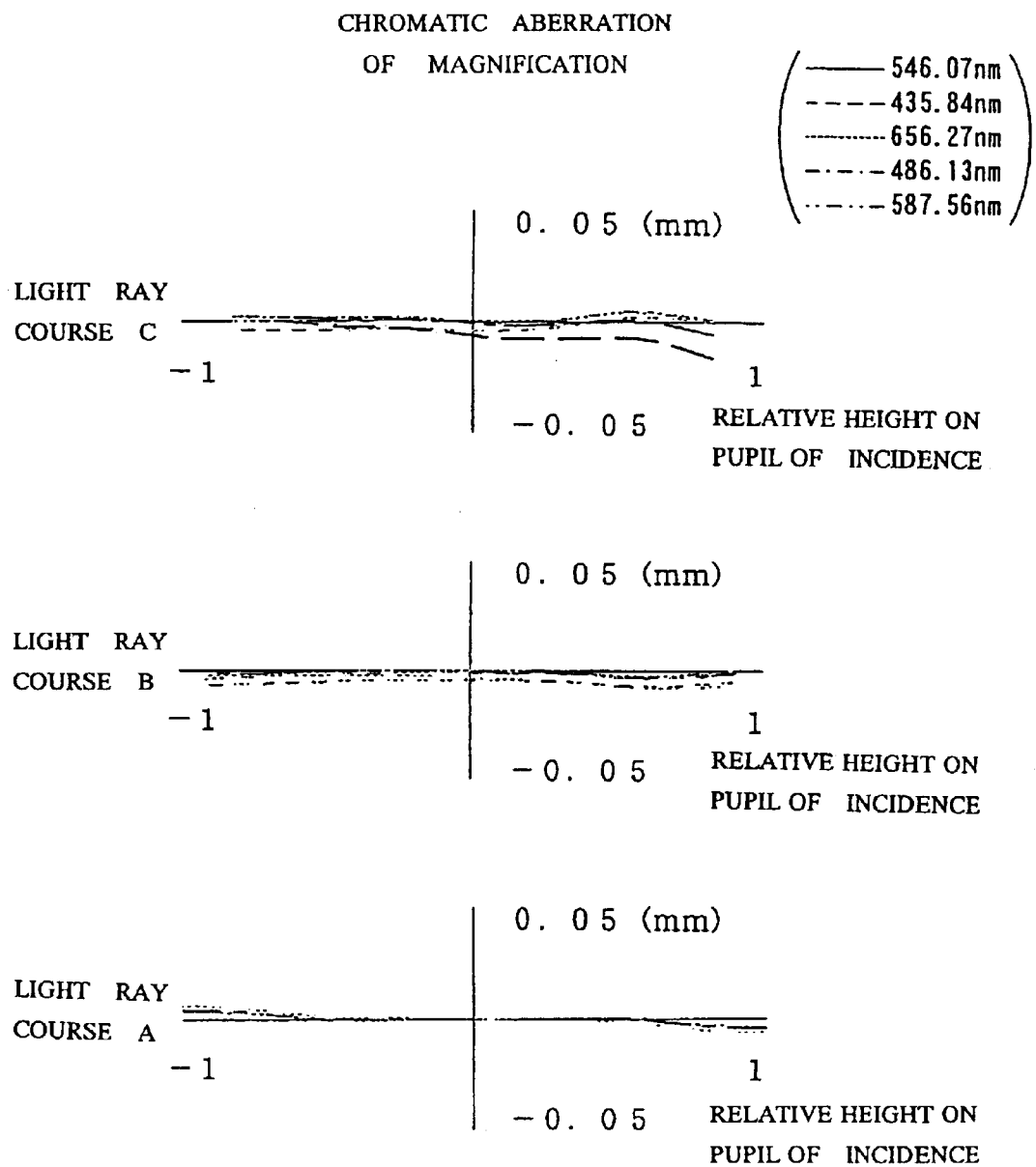
FIG. 19 is an explanatory illustration showing the chromatic aberration of magnification of the image pickup lens shown in FIG. 18.

FIG. 19 shows the chromatic aberration of magnification of ray paths A, B, and C, respectively, in regards to the image pickup lens of Example 4 under such condition. According to the figure, it is clear that the chromatic aberration of magnification in each ray path is decreased.

Figure 20:
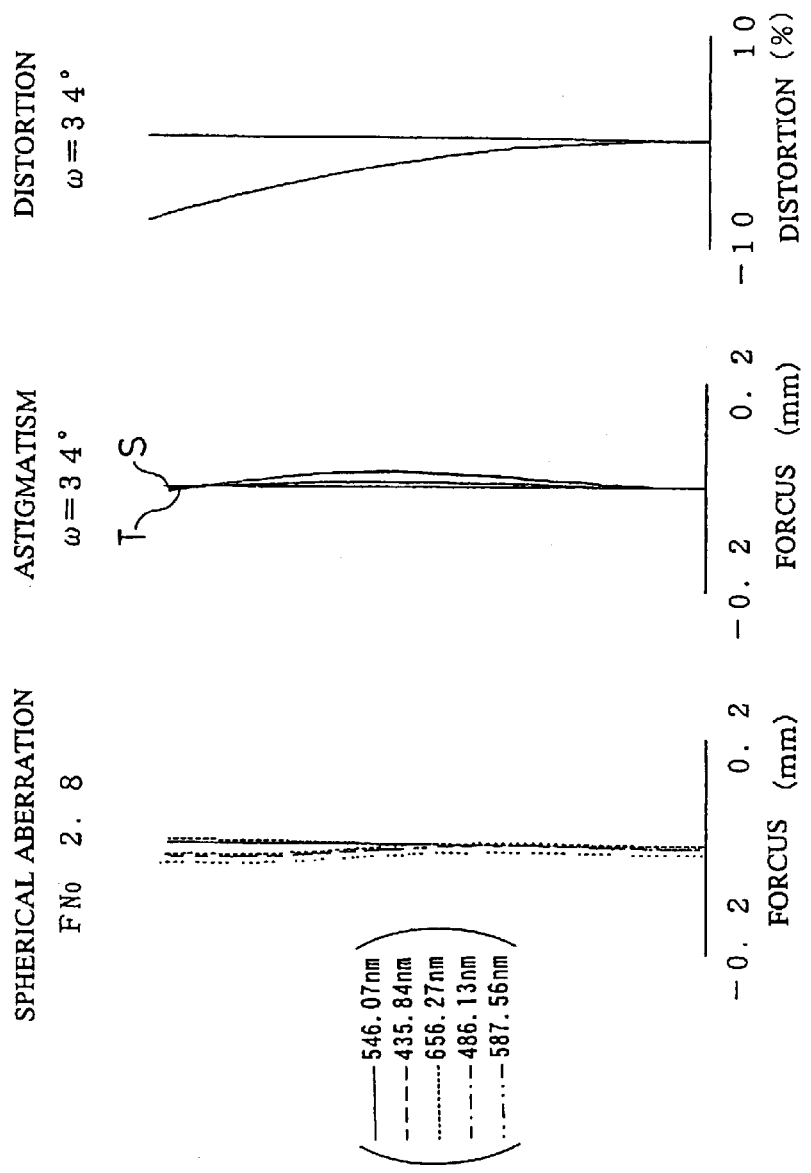
FIG. 20 is an explanatory illustration showing the spherical aberration, the astigmatism, and the distortion aberration of the image pickup lens shown in FIG. 18.

Further, FIG. 20 shows the spherical aberration, the astigmatism, and the distortion aberration in the image pickup lens of Example 4. According to the figure, it is clear that each value of the spherical aberration, the astigmatism and the distortion aberration is almost satisfactory so that a sufficient optical characteristic can be obtained.

Example 5

Figure 21:
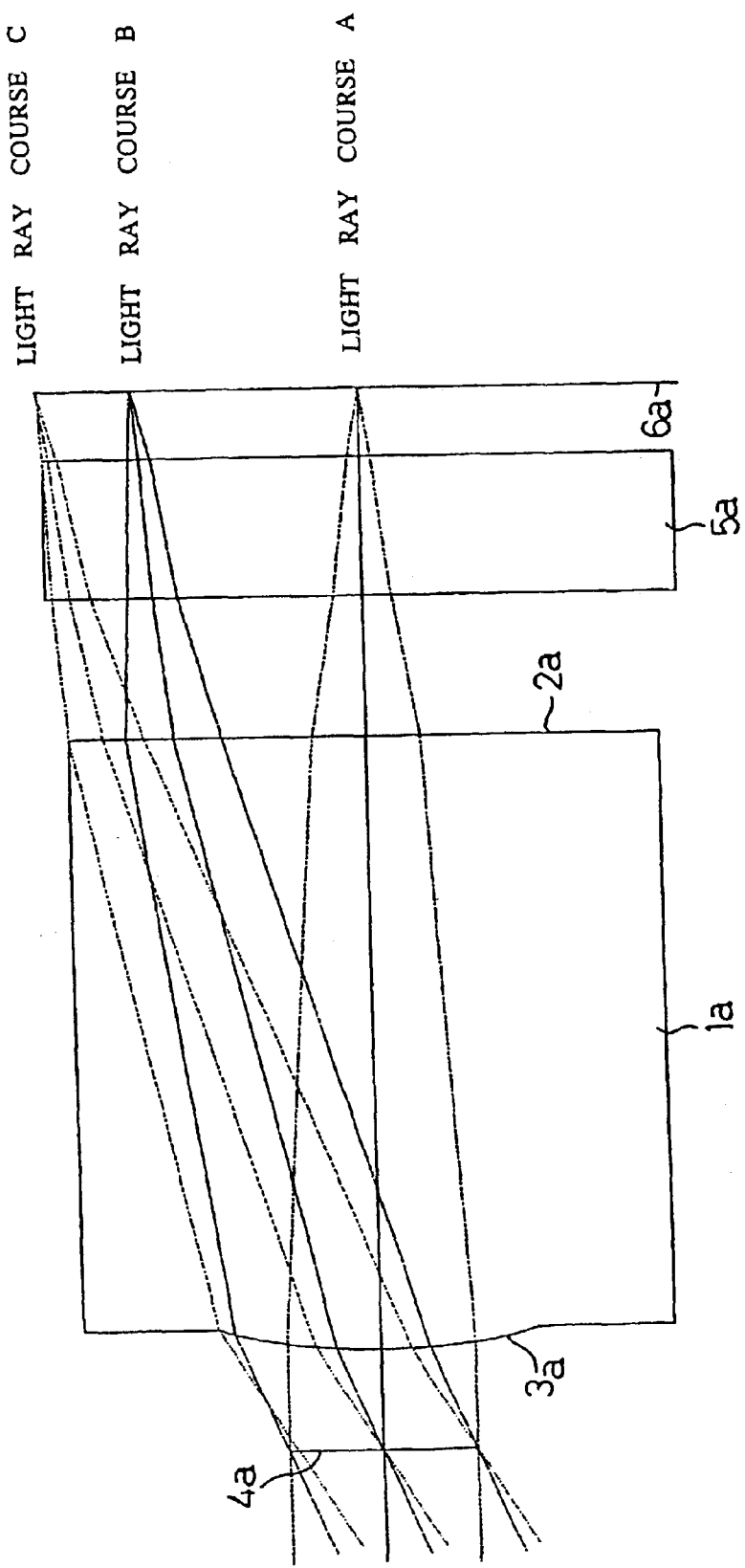
FIG. 21 is a schematic illustration showing Example 5 of the image pickup lens according to the present invention.

FIG. 21 shows Example 5 of the present invention. In Example 5, the second of the lens body 1a was formed into the Fresnel face 2a while unifying the diffraction element 3a with the first face of the lens body 1a as in the same manner as that of the first basic embodiment shown in FIG. 4.

The image pickup lens of Example 5 was set under the following condition:

| f = 3.75 mm, F No = 2.8, 2ω = 65.0, Petzval sum = 0.34 | | | | |
|---|---|---|---|---|
| Face | Radius r of Curvature | Distance d | Refractive Index nd | Abbe constant vd |
| (1) Diaphragm | 0.000 | 0.7055 | | |
| (2) High refractive index layer | 4.592 | 0.0000 | 894.498 | −3.45 |
| (3) First face of lens body | 4.593 | 4.3933 | 1.518 | 56.0 |
| (4) Second face of lens body | −2.522 | 1.0000 | | |
| (5) First face of cover glass | 0.000 | 1.0000 | 1.5163 | 64.0 |
| (6) Second face of cover glass | 0.000 | 0.4706 | | |
| (7) Image pickup surface | 0.000 | | | |

| Aspherical Factor | | | |
|---|---|---|---|
| Face | k | $a_4$ | $a_6$ |
| 2 | 7.122991e+00 | −2.320030e−02 | 1.075459e−02 |
| 3 | 7.130459e+00 | −2.320976e−02 | 1.075869e−02 |
| 4 | −6.780241e−01 | 5.885833e−03 | 9.060170e−04 |

-continued

| Face | $a_8$ | $a_{10}$ |
|---|---|---|
| 2 | 0.000000e+00 | 0.000000e+00 |
| 3 | 0.000000e+00 | 0.000000e+00 |
| 4 | 0.000000e+00 | 0.000000e+00 |

Figure 22:
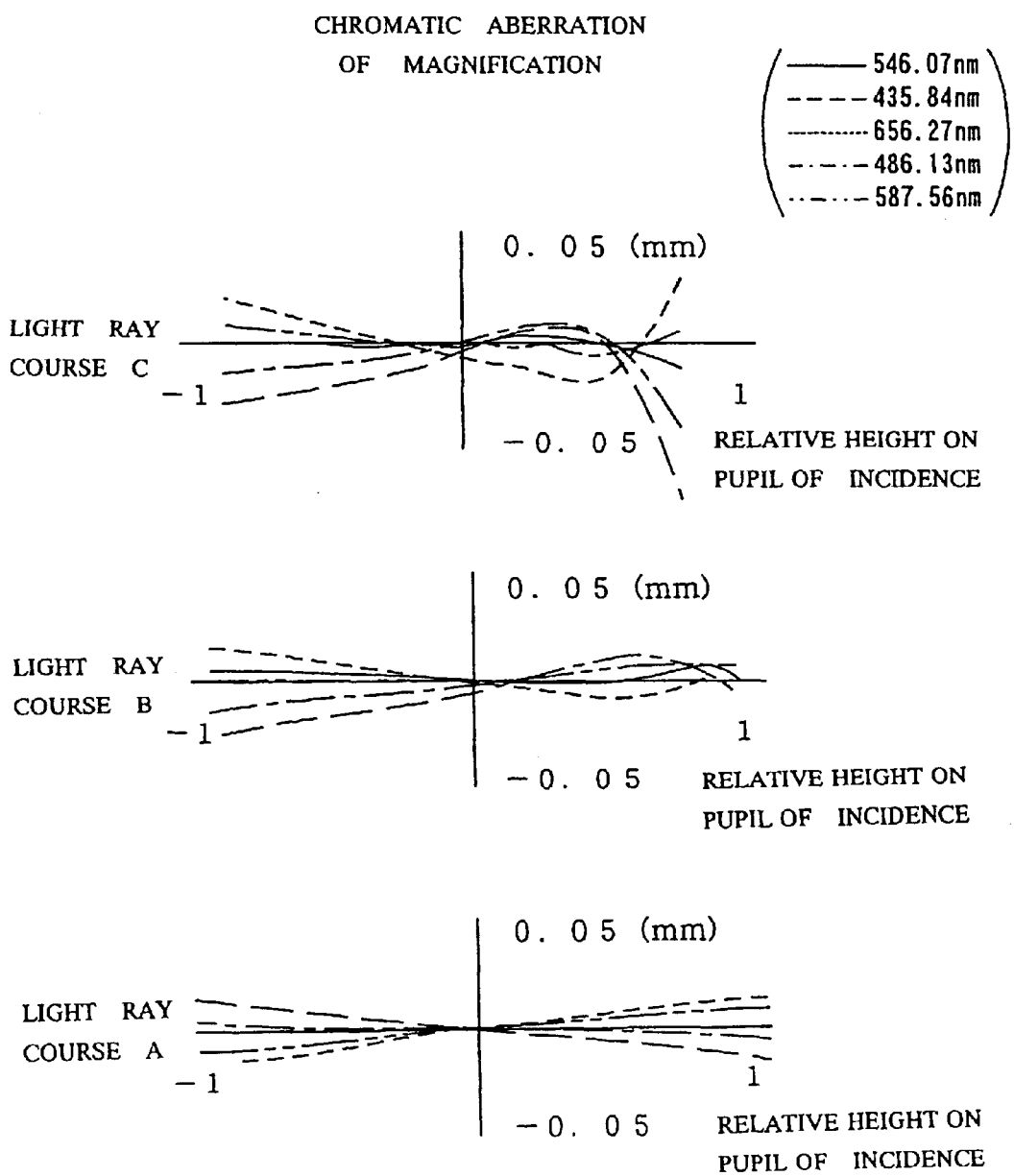
FIG. 22 is an explanatory illustration showing the chromatic aberration of magnification of the image pickup lens shown in FIG. 21.

FIG. 22 shows the chromatic aberration of magnification of ray paths A, B, and C, respectively, in regards to the image pickup lens of Example 5 under such condition. According to the figure, it is clear that the chromatic aberration of magnification in each ray path is decreased.

Figure 23:
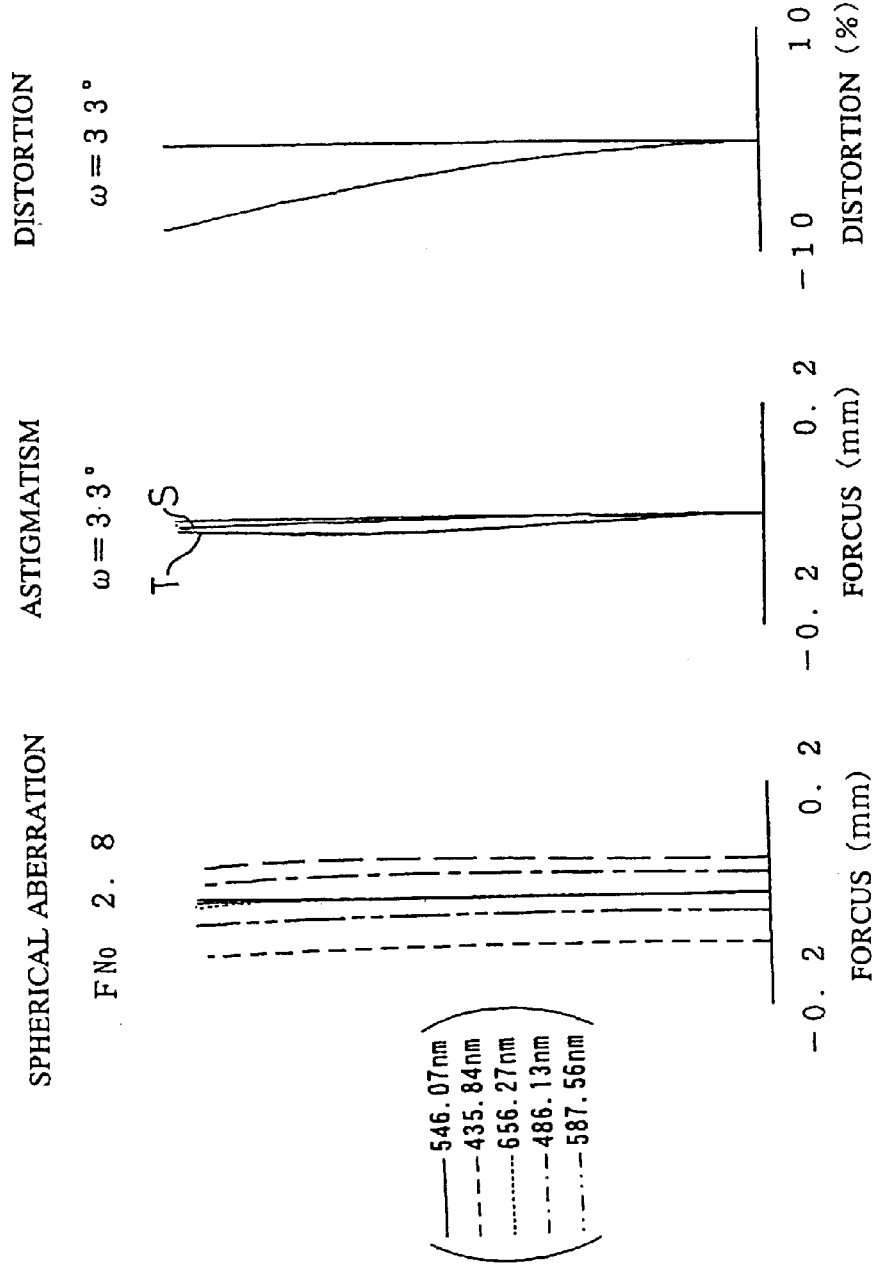
FIG. 23 is an explanatory illustration showing the spherical aberration, the astigmatism, and the distortion aberration of the image pickup lens shown in FIG. 21.

Further, FIG. 23 shows the spherical aberration, the astigmatism, and the distortion aberration in the image pickup lens of Example 5. According to the figure, it is clear that each value of the spherical aberration, the astigmatism and the distortion aberration is almost satisfactory so that a sufficient optical characteristic can be obtained.

Example 6

Figure 24:
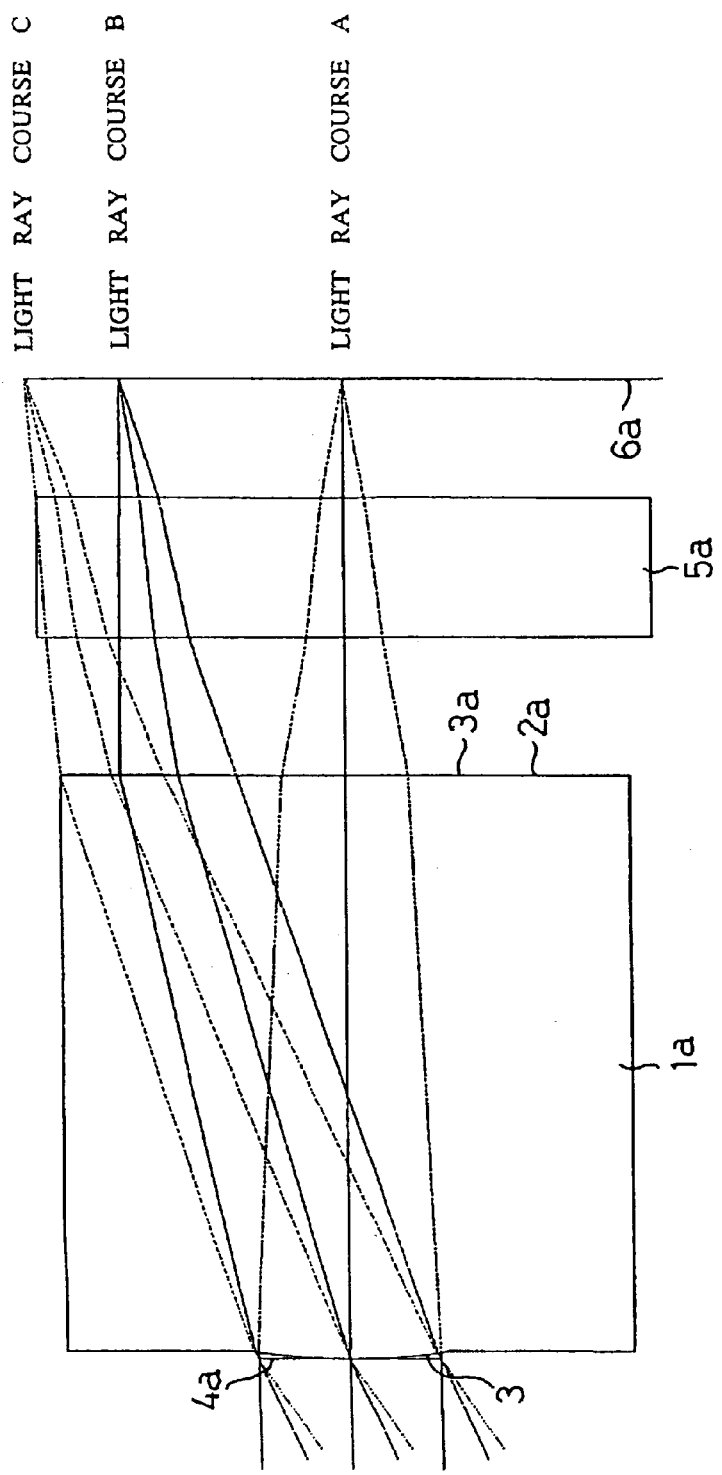
FIG. 24 is a schematic illustration showing Example 6 of the image pickup lens according to the present invention.

FIG. 24 shows Example 6 of the present invention. In Example 6, the second face of the lens body 1a was formed into the Fresnel face 2a while being unified with the diffraction element 3a as in the same manner as that of the first basic embodiment shown in FIG. 4. Further, the diffraction element 3 is also unified with the first face of the lens body 1a.

The image pickup lens of Example 6 was set under the following condition:

| | f = 3.7 mm, F No = 2.8, 2ω = 67.6, Petzval sum = 0.34 | | | |
|---|---|---|---|---|
| Face | Radius r of Curvature | Distance d | Refractive Index nd | Abbe constant vd |
| (1) Diaphragm | 0.000 | 0.0000 | | |
| (2) High refractive index layer | 4.657 | 0.0000 | 894.498 | −3.45 |
| (3) First face of lens body | 4.657 | 4.2714 | 1.518 | 56.0 |
| (4) Second face of lens body | −2.516 | 0.0000 | 894.498 | −3.45 |
| (5) High refractive index layer | −2.516 | 1.0000 | | |
| (6) First face of cover glass | 0.000 | 1.0000 | 1.5163 | 64.0 |
| (7) Second face of cover glass | 0.000 | 0.8485 | | |
| (8) Image pickup surface | 0.000 | | | |

| | Aspherical Factor | | |
|---|---|---|---|
| Face | k | $a_4$ | $a_6$ |
| 2 | 1.160906e+01 | −3.077417e−02 | 4.610394e−02 |
| 3 | 1.176908e+01 | −3.098202e−02 | 4.608045e−02 |
| 4 | −1.235293e+00 | −5.178718e−04 | 7.573794e−05 |
| 5 | −1.238337e+00 | −5.420760e−04 | 7.619796e−05 |

| Face | $a_8$ | $a_{10}$ |
|---|---|---|
| 2 | −6.527001e−03 | −6.823957e−03 |
| 3 | −6.820853e−03 | −6.630086e−03 |
| 4 | 2.286737e−05 | 3.135998e−06 |
| 5 | 2.300038e−05 | 3.119125e−06 |

Figure 25:
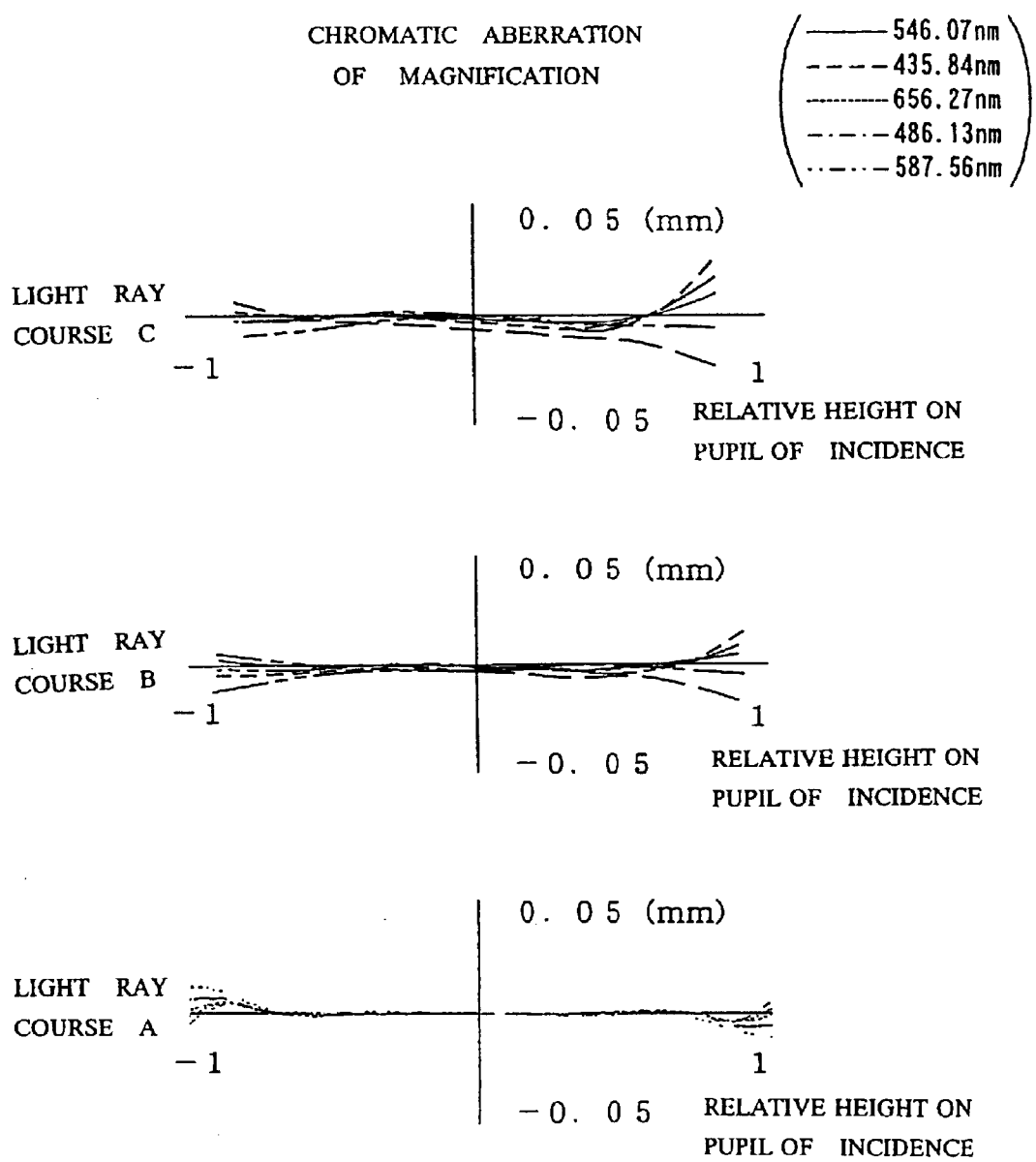
FIG. 25 is an explanatory illustration showing the chromatic aberration of magnification of the image pickup lens shown in FIG. 24.

FIG. 25 shows the chromatic aberration of magnification of ray paths A, B, and C, respectively, in regards to the image pickup lens of Example 6 under such condition. According to the figure, it is clear that the chromatic aberration of magnification in each ray path is decreased.

Figure 26:
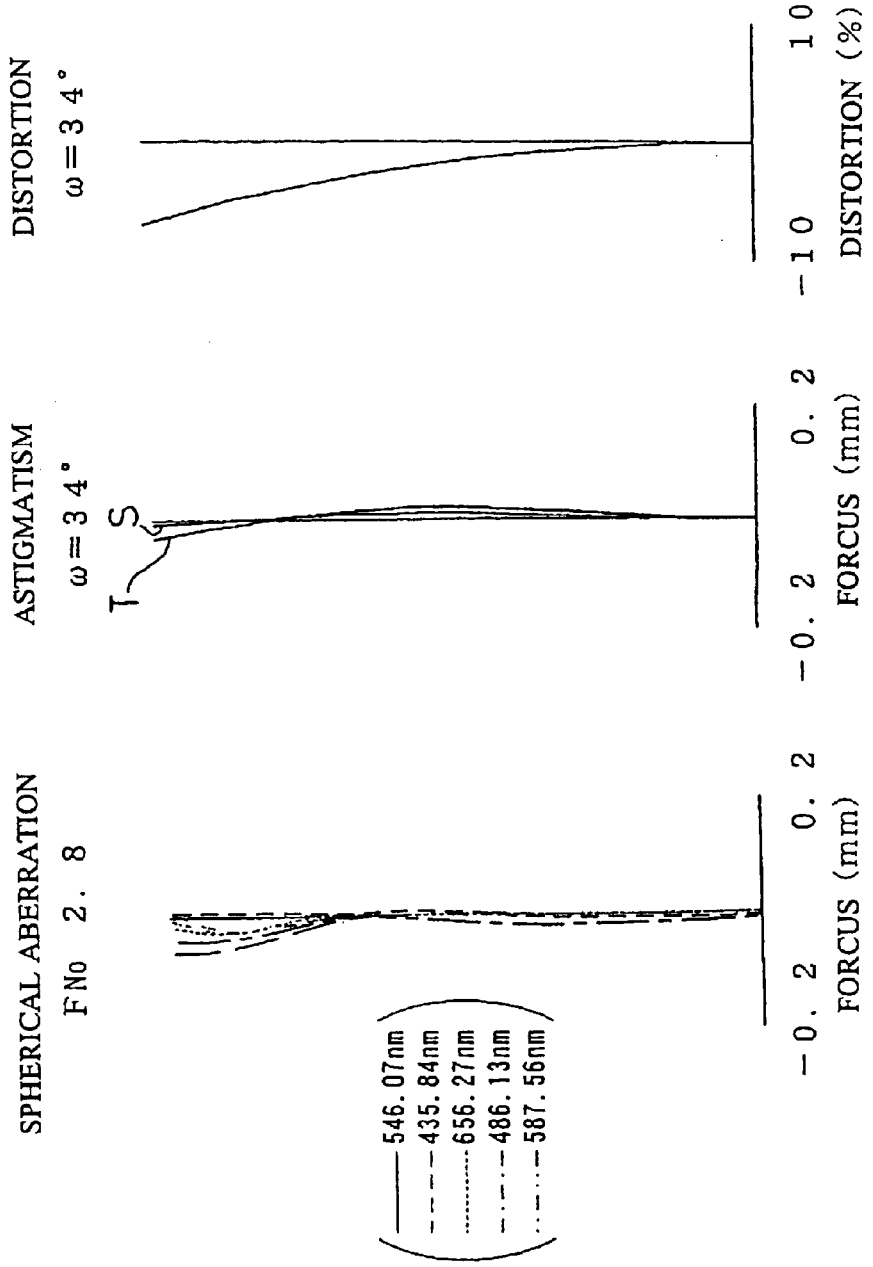
FIG. 26 is an explanatory illustration showing the spherical aberration, the astigmatism, and the distortion aberration of the image pickup lens shown in FIG. 24.

Further, FIG. 26 shows the spherical aberration, the astigmatism, and the distortion aberration in the image pickup lens of Example 6. According to the figure, it is clear that each value of the spherical aberration, the astigmatism and the distortion aberration is almost satisfactory so that a sufficient optical characteristic can be obtained.

Example 7

Figure 27:
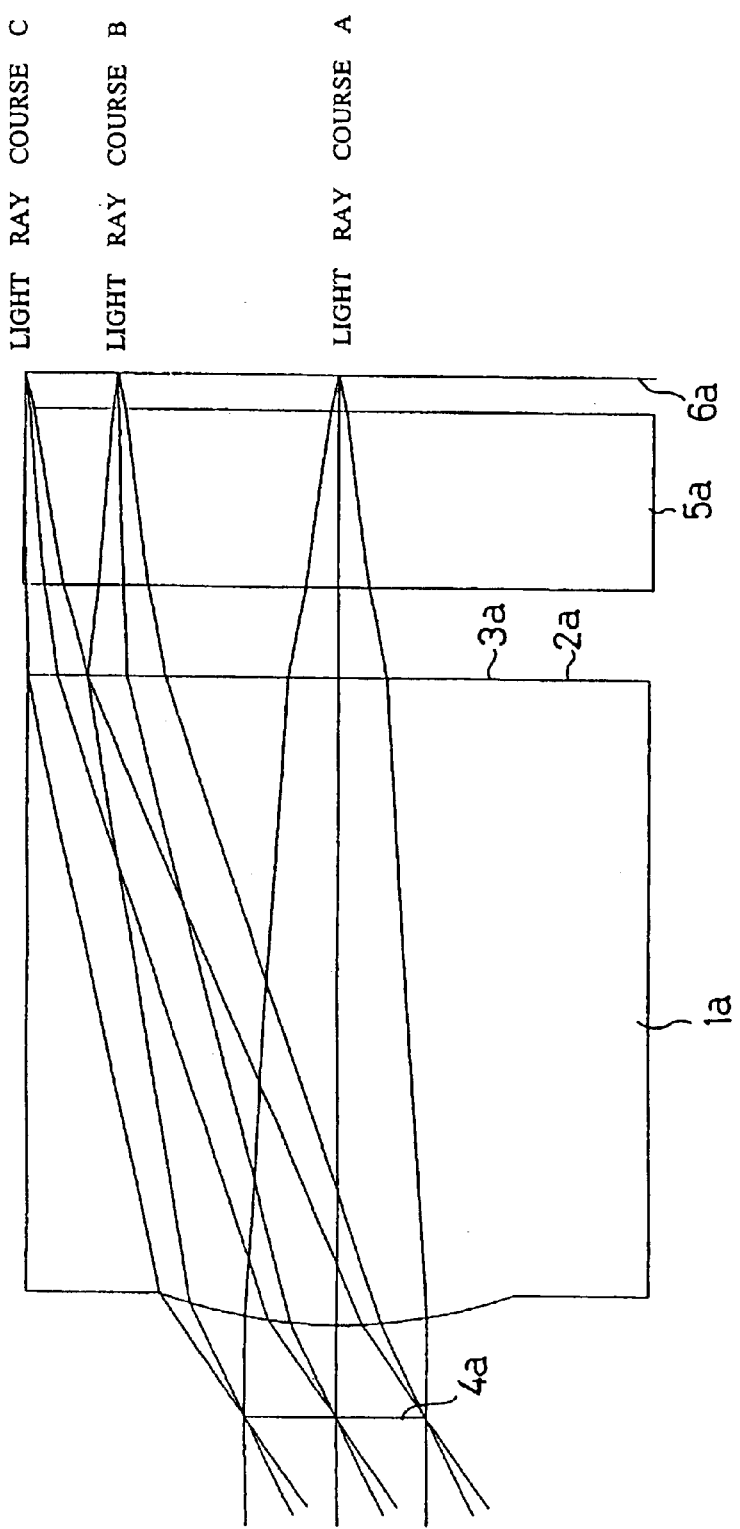
FIG. 27 is a schematic illustration showing Example 7 of the image pickup lens according to the present invention.

FIG. 27 shows Example 7 of the present invention. In Example 7, the second face of the lens body 1a was formed into the Fresnel face 2a while being unified with the diffraction element 3a as in the same manner as that of the second basic embodiment shown in FIG. 6.

The image pickup lens of Example 7 was set under the following condition:

| | f = 2.6 mm, F No = 2.5, 2ω = 68.8, Petzval sum = 0.33 | | | |
|---|---|---|---|---|
| Face | Radius r of Curvature | Distance d | Refractive Index nd | Abbe constant vd |
| (1) Diaphragm | 0.000 | 0.5255 | | |
| (2) First face of lens body | 2.695 | 3.7092 | 1.527 | 56.0 |
| (3) Second face of lens body | −1.796 | 0.0000 | 831.404 | |
| (4) High refractive index layer | −1.796 | 0.7000 | | |
| (5) First face of cover glass | 0.000 | 1.0000 | 1.518 | 64.0 |
| (6) Second face of cover glass | 0.000 | 0.0062 | | |
| (7) Image pickup surface | 0.000 | | | |

| | Aspherical Factor | | |
|---|---|---|---|
| Face | k | $a_4$ | $a_6$ |
| 2 | −8.988205e+00 | 3.322188e−02 | −7.376609e−04 |
| 3 | −5.467891e−01 | 2.617233e−02 | −7.559079e−03 |
| 4 | −5.472168e−01 | 2.617215e−02 | −7.560272e−03 |

| Face | $a_8$ | $a_{10}$ |
|---|---|---|
| 2 | −3.817397e−03 | 5.485112e−04 |
| 3 | 4.930335e−03 | −6.512470e−04 |
| 4 | 4.929550e−03 | −6.511086e−04 |

Under such condition, d/f=1.426 was achieved, thereby satisfying the expression (1).

Further, $|r_2/r_1|$=0.666 was achieved, thereby satisfying the expression (2).

Furthermore, ds/f=0.202 was achieved, thereby satisfying the expression (3).

FIG. 28 shows the chromatic aberration of magnification of ray paths A, B, and C, respectively, in regards to the image pickup lens of Example 7 under such condition. According to the figure, it is clear that the chromatic aberration of magnification in each ray path is decreased.

Figure 29:
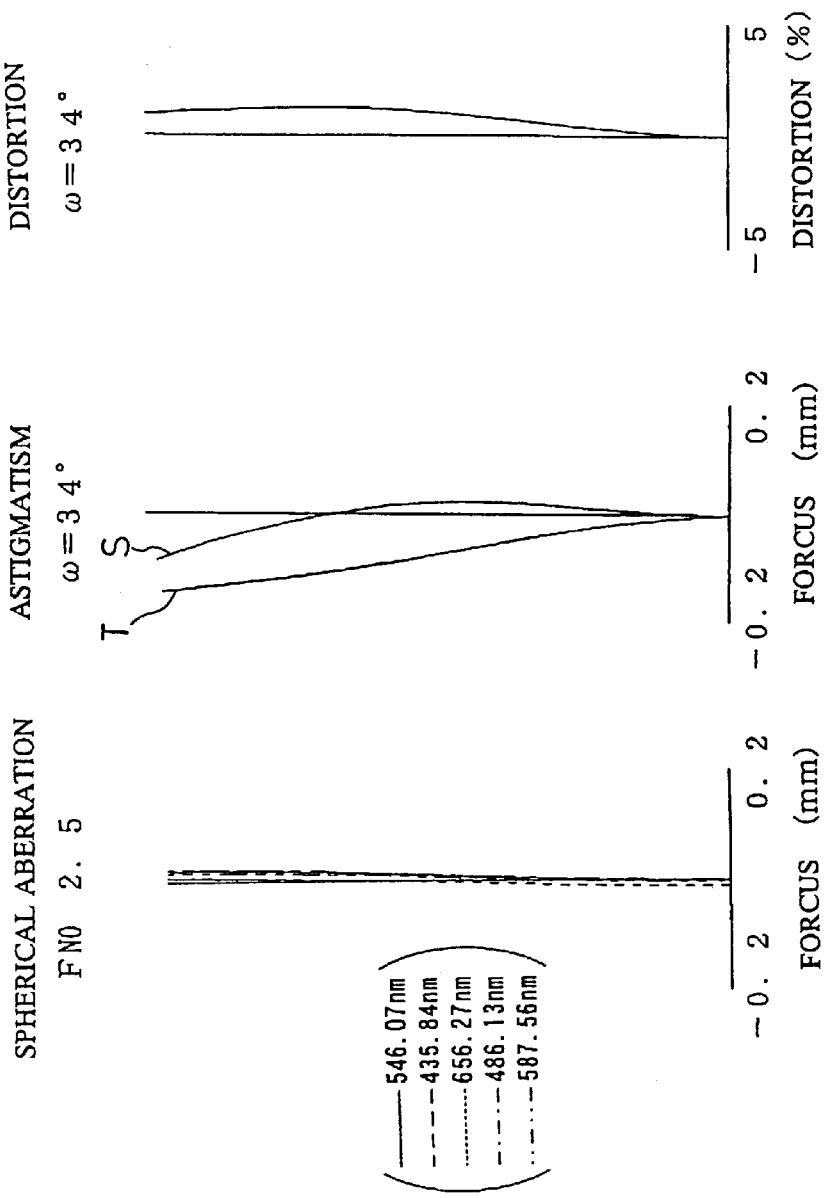
FIG. 29 is an explanatory illustration showing the spherical aberration, the astigmatism, and the distortion aberration of the image pickup lens shown in FIG. 27.

Further, FIG. 29 shows the spherical aberration, the astigmatism, and the distortion aberration in the image pickup lens of Example 7. According to the figure, it is clear that each value of the spherical aberration, the astigmatism and the distortion aberration is almost satisfactory so that a sufficient optical characteristic can be obtained.

Example 8

Figure 30:
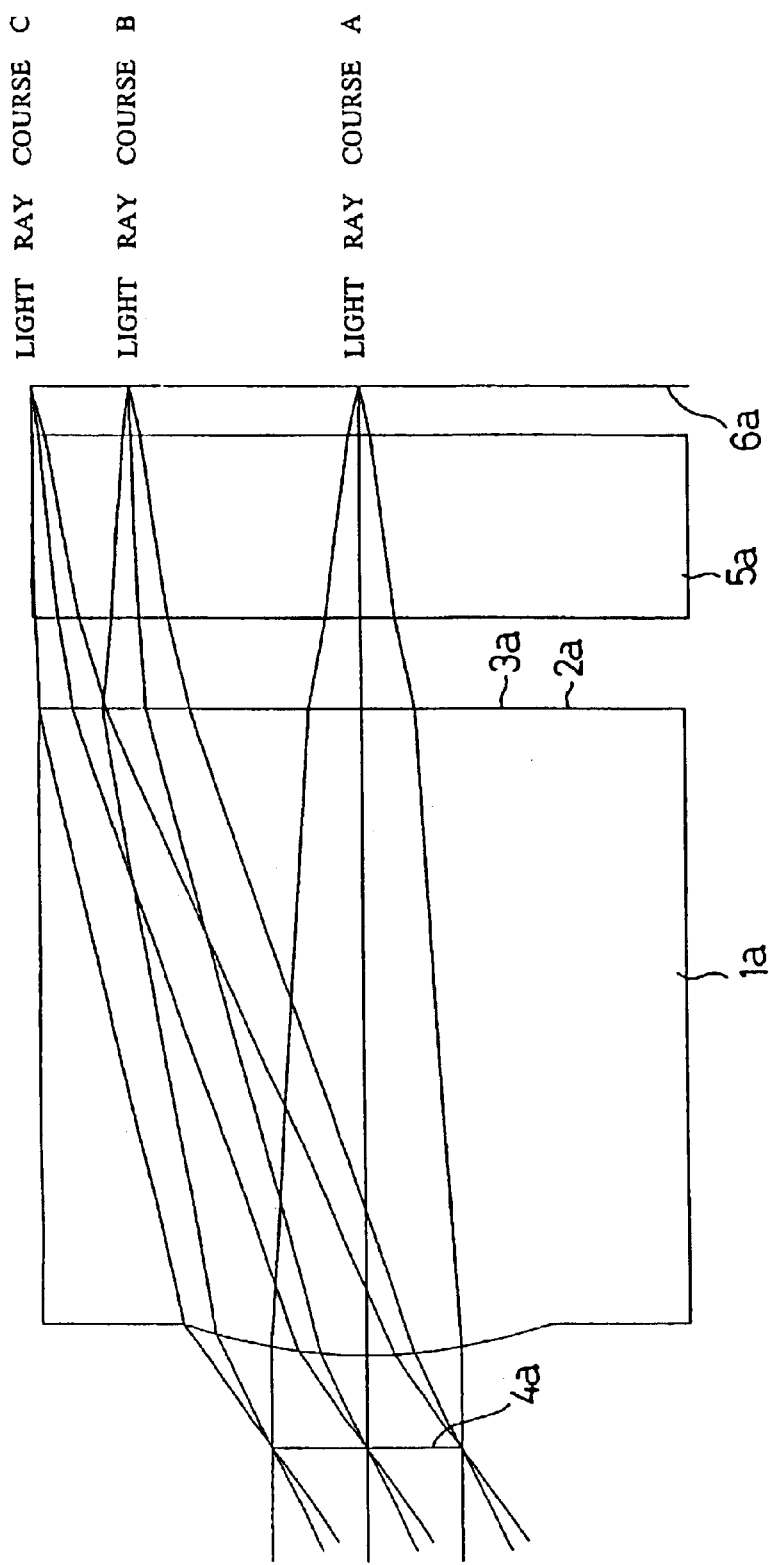
FIG. 30 is a schematic illustration showing Example 8 of the image pickup lens according to the present invention.

FIG. 30 shows Example 8 of the present invention. In Example 8, the second face of the lens body 1a was formed into the Fresnel face 2a while being unified with the diffraction element 3a as in the same manner as that of the second basic embodiment shown in FIG. 6.

The image pickup lens of Example 8 was set under the following condition:

| f = 2.6 mm, F No = 2.5, 2ω = 69.8, Petzval sum = 0.33 | | | | |
|---|---|---|---|---|
| Face | Radius r of Curvature | Distance d | Refractive Index nd | Abbe constant vd |
| (1) Diaphragm | 0.000 | 0.5100 | | |
| (2) First face of lens body | 2.747 | 3.5900 | 1.527 | 56.0 |
| (3) Second face of lens body | −1.794 | 0.0000 | 831.404 | |
| (4) High refractive index layer | −1.794 | 0.5000 | | |
| (5) First face of cover glass | 0.000 | 1.0000 | 1.518 | 64.0 |
| (6) Second face of cover glass | 0.000 | 0.2683 | | |
| (7) Image pickup surface | 0.000 | | | |

| Aspherical Factor | | | |
|---|---|---|---|
| Face | k | $a_4$ | $a_6$ |
| 2 | −9.171413e+00 | 3.435569e−02 | −4.812703e−03 |
| 3 | −5.488248e−01 | 2.604141e−02 | −7.583875e−03 |
| 4 | −5.492227e−01 | 2.603851e−02 | −7.583299e−03 |
| Face | $a_8$ | $a_{10}$ | |
| 2 | 3.170295e−04 | −8.615294e−04 | |
| 3 | 4.925911e−03 | −6.523167e−04 | |
| 4 | 4.924539e−03 | −6.521111e−04 | |

Under such condition, d/f=1.381 was achieved, thereby satisfying the expression (1).

Further, $|r_2/r_1|$=0.653 was achieved, thereby satisfying the expression (2).

Furthermore, ds/f=0.196 was achieved, thereby satisfying the expression (3).

Figure 31:
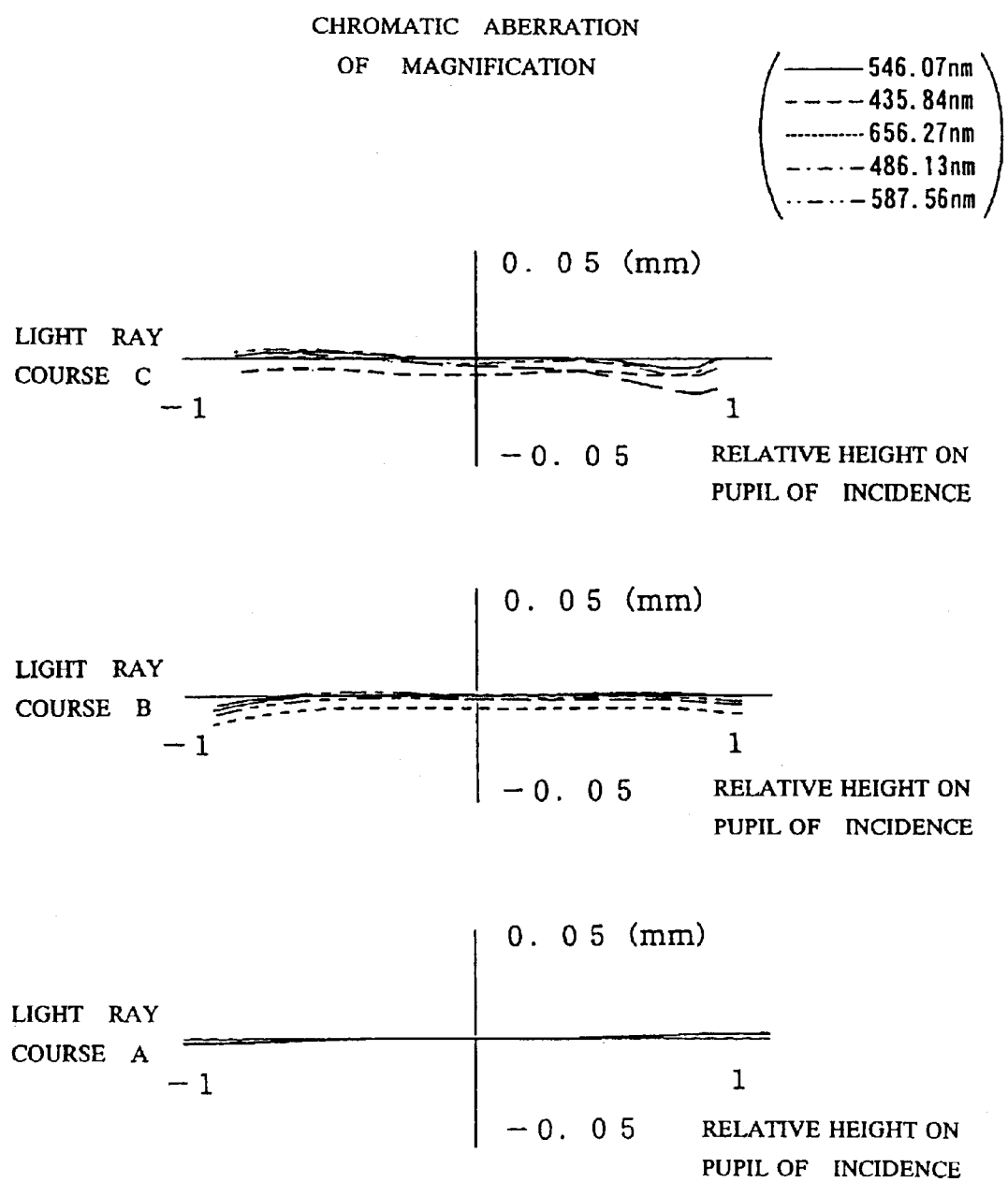
FIG. 31 is an explanatory illustration showing the chromatic aberration of magnification of the image pickup lens shown in FIG. 30.

FIG. 31 shows the chromatic aberration of magnification of ray paths A, B, and C, respectively, in regards to the image pickup lens of Example 8 under such condition. According to the figure, it is clear that the chromatic aberration of magnification in each ray path is decreased.

Figure 32:
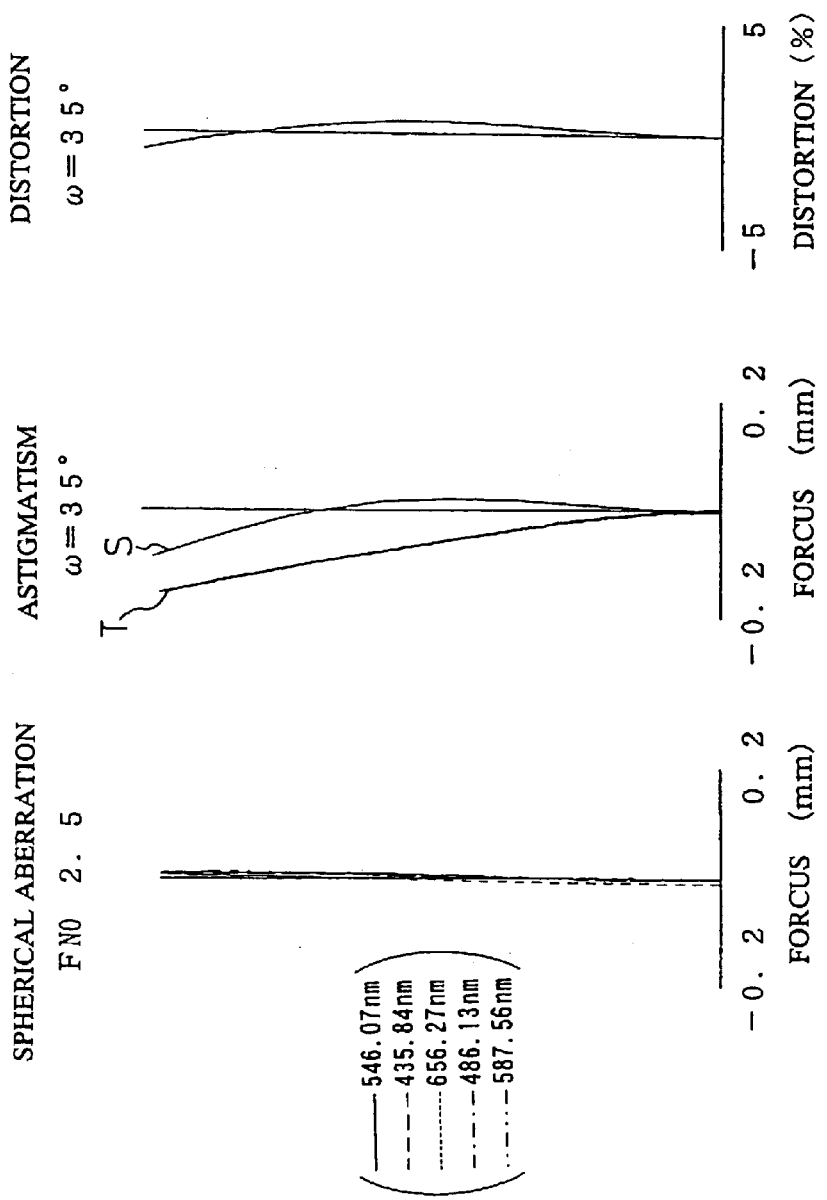
FIG. 32 is an explanatory illustration showing the spherical aberration, the astigmatism, and the distortion aberration of the image pickup lens shown in FIG. 30.

Further, FIG. 32 shows the spherical aberration, the astigmatism, and the distortion aberration in the image pickup lens of Example 8. According to the figure, it is clear that each value of the spherical aberration, the astigmatism and the distortion aberration is almost satisfactory so that a sufficient optical characteristic can be obtained.

Example 9

Figure 33:
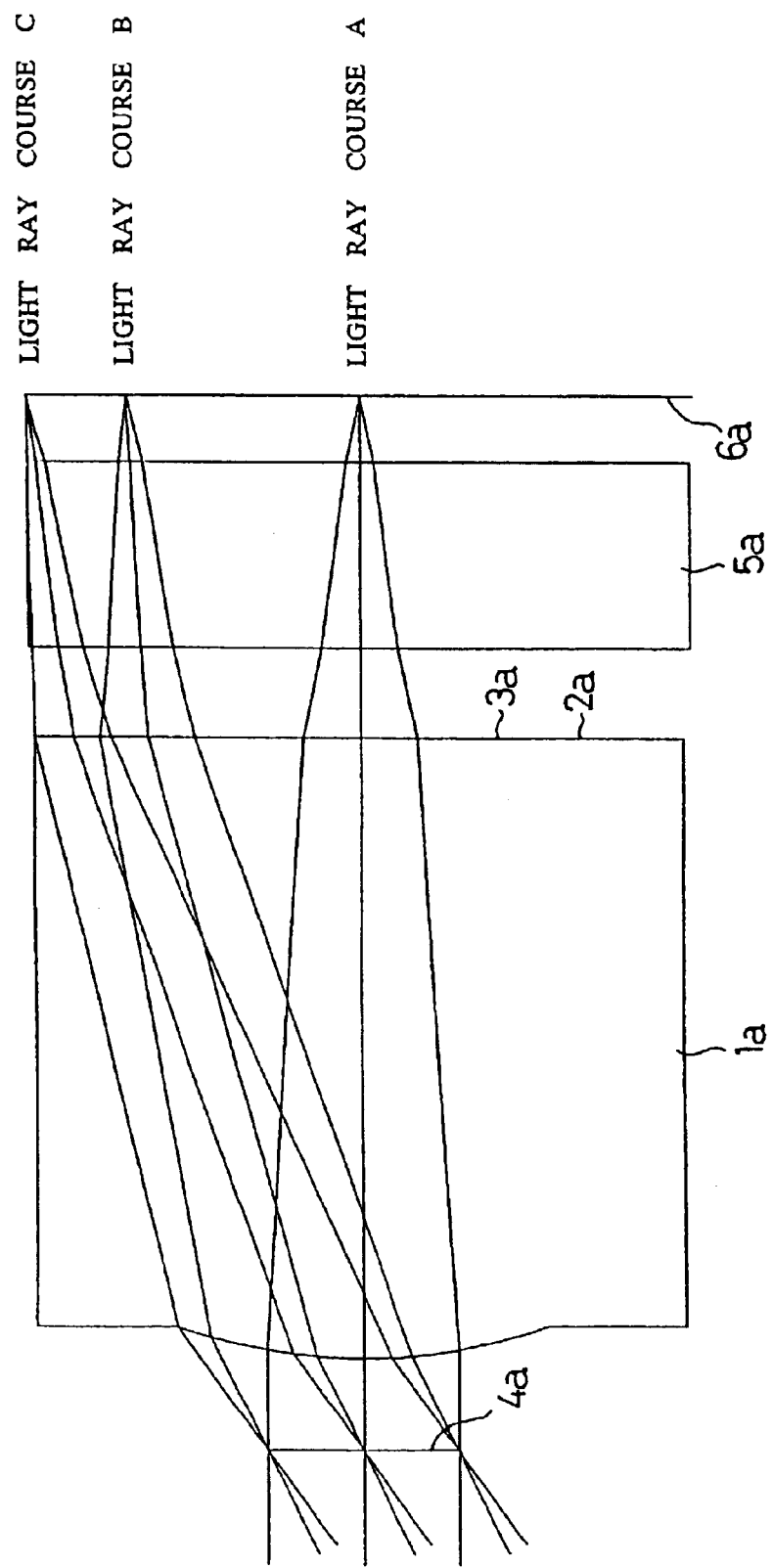
FIG. 33 is a schematic illustration showing Example 9 of the image pickup lens according to the present invention.

FIG. 33 shows Example 9 of the present invention. In Example 9, the second face of the lens body 1a was formed into the Fresnel face 2a while being unified with the diffraction element 3a as in the same manner as that of the second basic embodiment shown in FIG. 6.

The image pickup lens of Example 9 was set under the following condition:

| f = 2.6 mm, F No = 2.5, 2ω = 71.2, Petzval sum = 0.32 | | | | |
|---|---|---|---|---|
| Face | Radius r of Curvature | Distance d | Refractive Index nd | Abbe constant vd |
| (1) Diaphragm | 0.000 | 0.5000 | | |
| (2) First face of lens body | 2.814 | 3.4000 | 1.527 | 56.0 |
| (3) Second face of lens body | −1.792 | 0.0000 | 831.404 | |
| (4) High refractive index layer | −1.791 | 0.5000 | | |
| (5) First face of cover glass | 0.000 | 1.0000 | 1.518 | 64.0 |
| (6) Second face of cover glass | 0.000 | 0.3570 | | |
| (7) Image pickup surface | 0.000 | | | |

| Aspherical Factor | | | |
|---|---|---|---|
| Face | k | $a_4$ | $a_6$ |
| 2 | −1.152514e+01 | 4.268985e−02 | −9.093965e−03 |
| 3 | −5.496560e−01 | 2.598847e−02 | −7.595081e−03 |
| 4 | −5.499979e−01 | 2.598139e−02 | −7.591602e−03 |
| Face | $a_8$ | $a_{10}$ | |
| 2 | −4.017900e−04 | 3.479243e−04 | |
| 3 | 4.924438e−03 | −6.527990e−04 | |
| 4 | 4.922140e−03 | −6.524825e−04 | |

Under such condition, d/f=1.308 was achieved, thereby satisfying the expression (1).

Further, $|r_2/r_1|$=0.637 was achieved, thereby satisfying the expression (2).

Furthermore, ds/f=0.192 was achieved, thereby satisfying the expression (3).

FIG. 34 shows the chromatic aberration of magnification of ray paths A, B, and C, respectively, in regards to the image pickup lens of Example 9 under such condition. According to the figure, it is clear that the chromatic aberration of magnification in each ray path is decreased.

Figure 35:
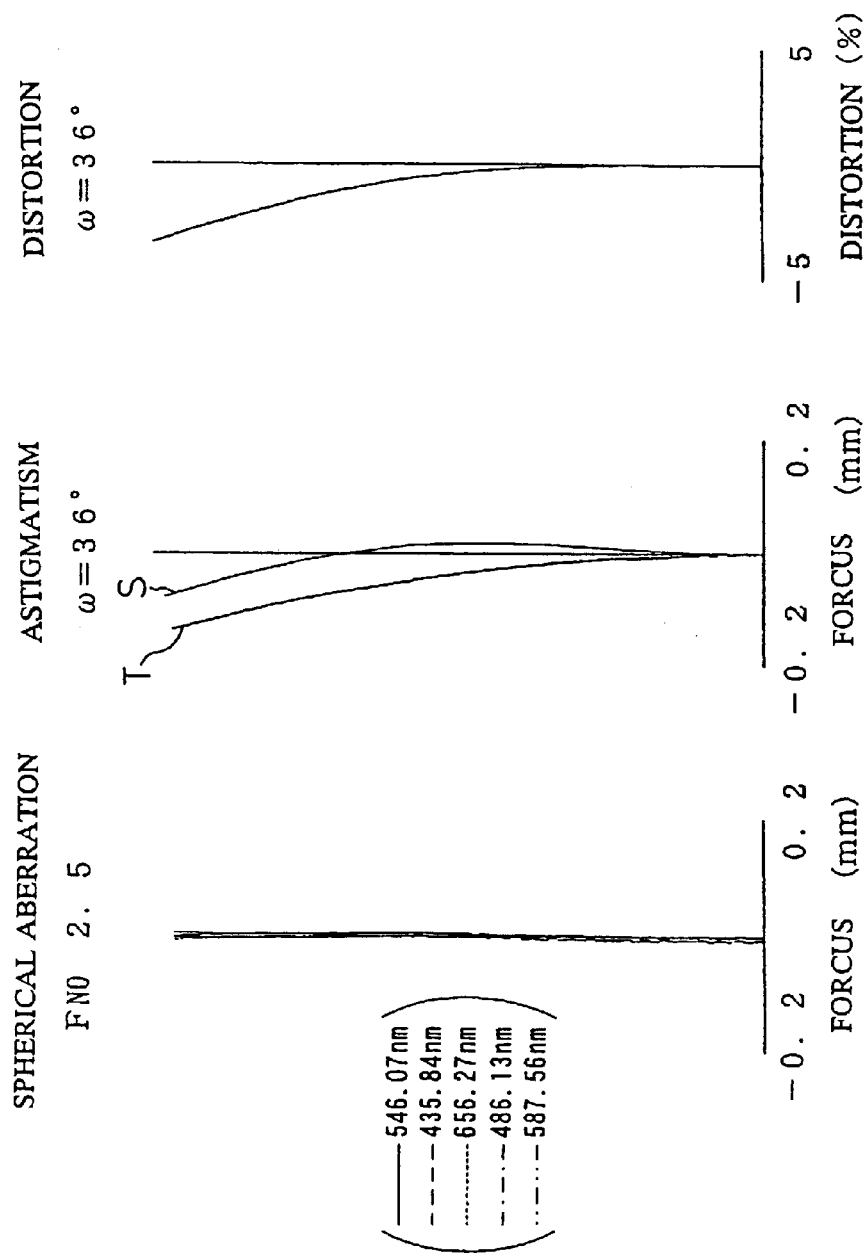
FIG. 35 is an explanatory illustration showing the spherical aberration, the astigmatism, and the distortion aberration of the image pickup lens shown in FIG. 33.

Further, FIG. 35 shows the spherical aberration, the astigmatism, and the distortion aberration in the image pickup lens of Example 9. According to the figure, it is clear that each value of the spherical aberration, the astigmatism and the distortion aberration is almost satisfactory so that a sufficient optical characteristic can be obtained.

Example 10

Figure 36:
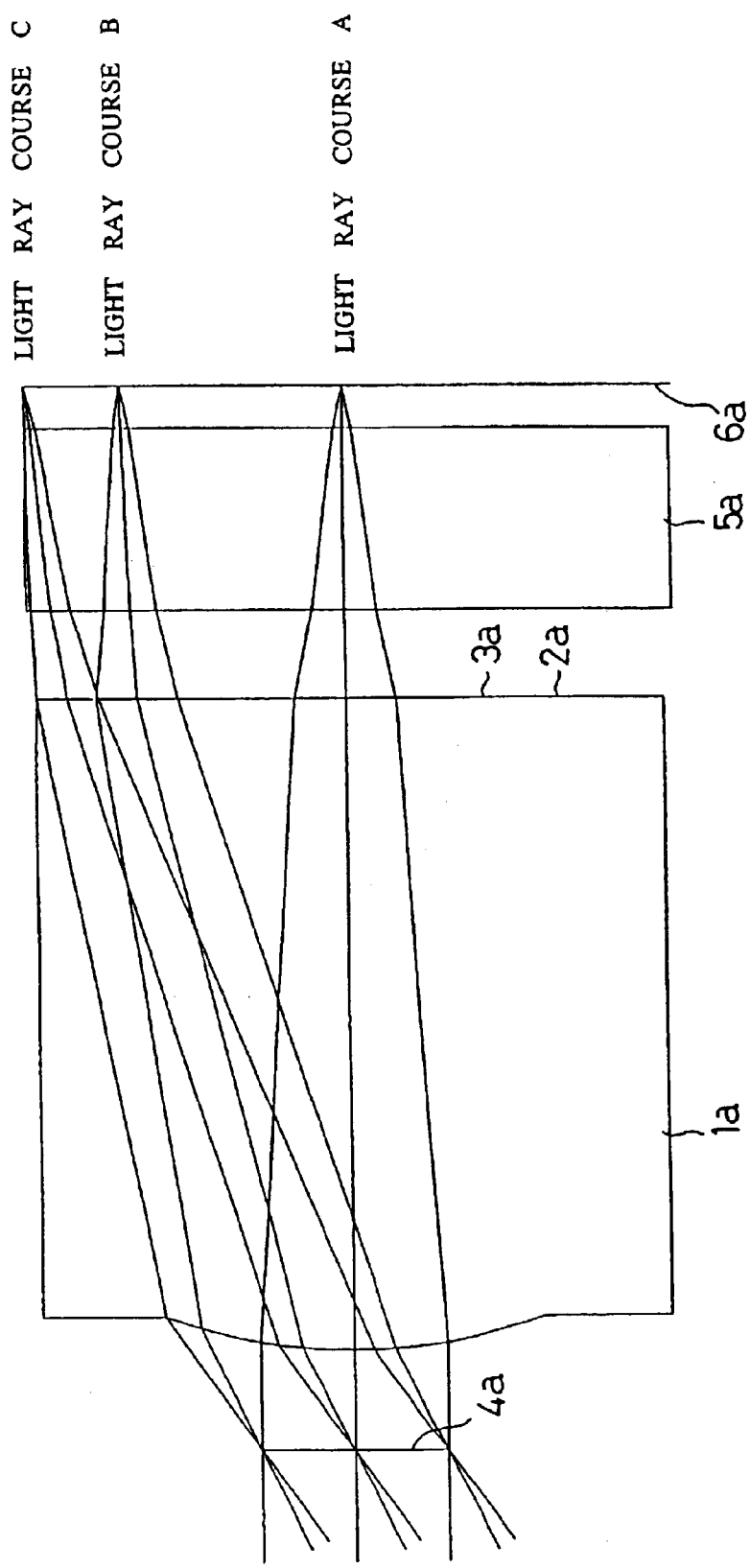
FIG. 36 is a schematic illustration showing Example 10 of the image pickup lens according to the present invention.

FIG. 36 shows Example 10 of the present invention. In Example 10, the second face of the lens body 1a was formed into the Fresnel face 2a while being unified with the diffraction element 3a as in the same manner as that of the second basic embodiment shown in FIG. 6. In Example 10, the lens body 1a was made of a glass material.

The image pickup lens of Example 10 was set under the following condition:

| f = 2.6 mm, F No = 2.5, 2ω = 70.6, Petzval sum = 0.33 | | | | |
|---|---|---|---|---|
| Face | Radius r of Curvature | Distance d | Refractive Index nd | Abbe constant vd |

-continued

| | | | | |
|---|---|---|---|---|
| (1) Diaphragm | 0.000 | 0.5641 | | |
| (2) First face of lens body | 2.903 | 3.6542 | 1.585 | 59.4 |
| (3) Second face of lens body | −1.934 | 0.0000 | 831.404 | |
| (4) High refractive index layer | −1.934 | 1.0000 | | |
| (5) First face of cover glass | 0.0000 | 1.0000 | 1.518 | 64.0 |
| (6) Second face of cover glass | 0.000 | −0.2670 | | |
| (7) Image pickup surface | 0.000 | | | |

Aspherical Factor

| Face | k | $a_4$ | $a_8$ |
|---|---|---|---|
| 2 | −1.053093e+01 | 3.653708e−02 | −5.926449e−03 |
| 3 | −5.487356e−01 | 2.603218e−02 | −7.588997e−03 |
| 4 | −5.491175e−01 | 2.602291e−02 | −7.582574e−03 |

| Face | $a_8$ | $a_{10}$ |
|---|---|---|
| 2 | −1.077630e−03 | 4.702053e−04 |
| 3 | 4.926600e−03 | −6.525410e−04 |
| 4 | 4.923072e−03 | −6.520399e−04 |

Under such condition, d/f=1.405 was achieved, thereby satisfying the expression (1).

Further, $|r_2/r_1|$=0.666 was achieved, thereby satisfying the expression (2).

Furthermore, ds/f=0.217 was achieved, thereby satisfying the expression (3).

Figure 37:
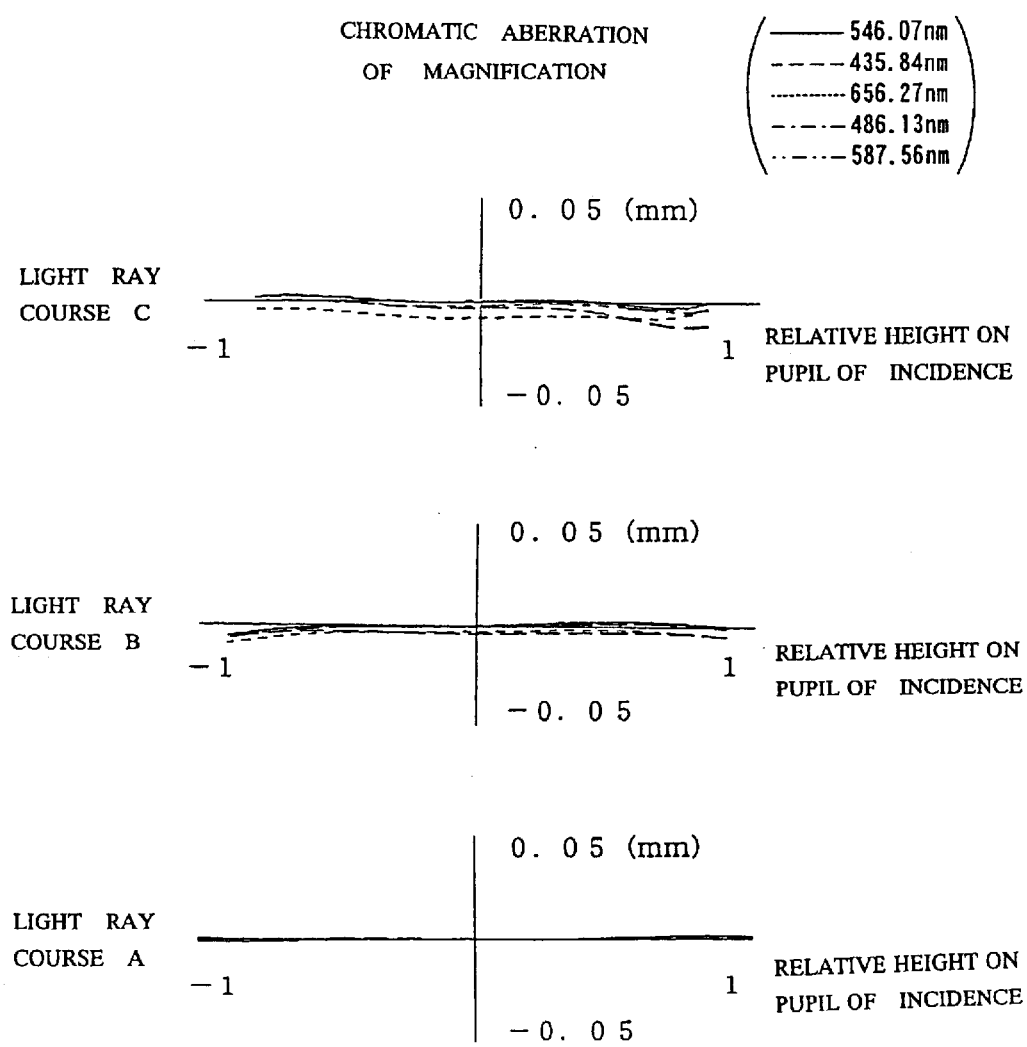
FIG. 37 is an explanatory illustration showing the chromatic aberration of magnification of the image pickup lens shown in FIG. 36.

FIG. 37 shows the chromatic aberration of magnification of ray paths A, B, and C, respectively, in regards to the image pickup lens of Example 10 under such condition. According to the figure, it is clear that the chromatic aberration of magnification in each ray path is decreased.

Figure 38:
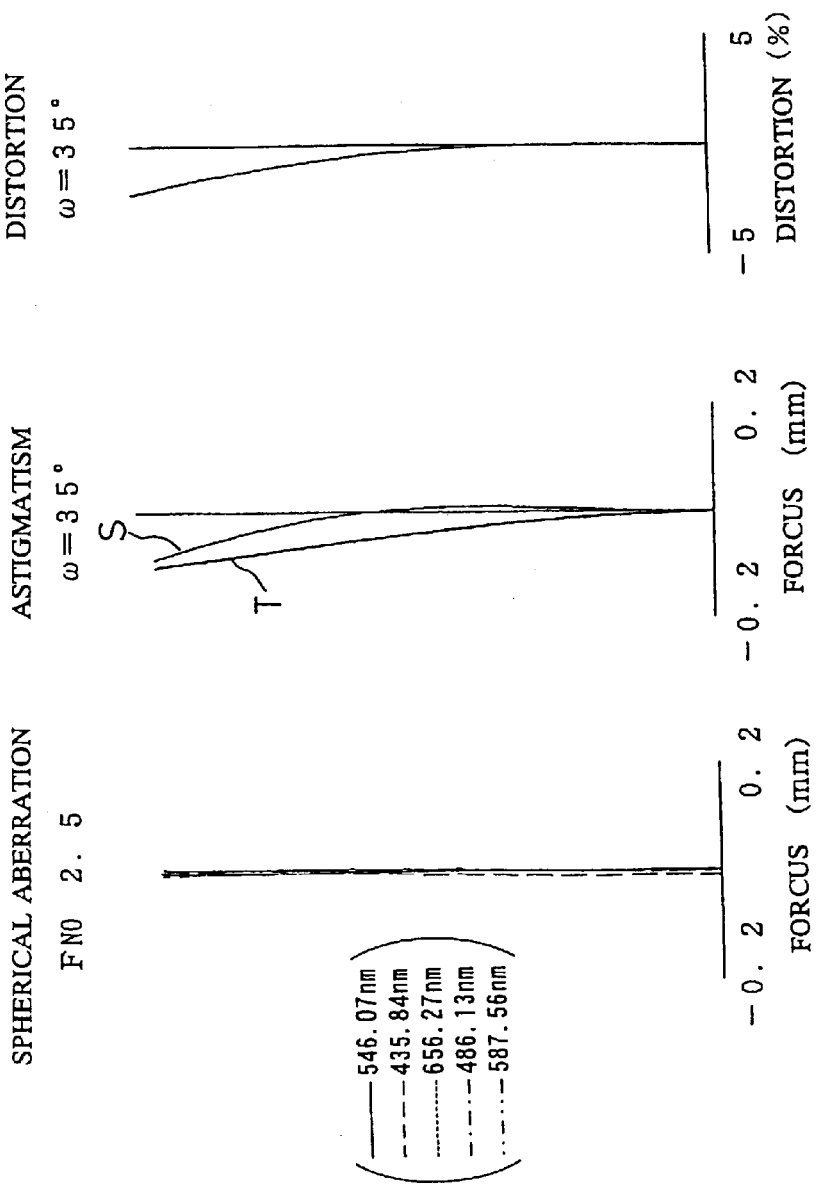
FIG. 38 is an explanatory illustration showing the spherical aberration, the astigmatism, and the distortion aberration of the image pickup lens shown in FIG. 36.

Further, FIG. 38 shows the spherical aberration, the astigmatism, and the distortion aberration in the image pickup lens of Example 10. According to the figure, it is clear that each value of the spherical aberration, the astigmatism and the distortion aberration is almost satisfactory so that a sufficient optical characteristic can be obtained.

Example 11

Figure 39:
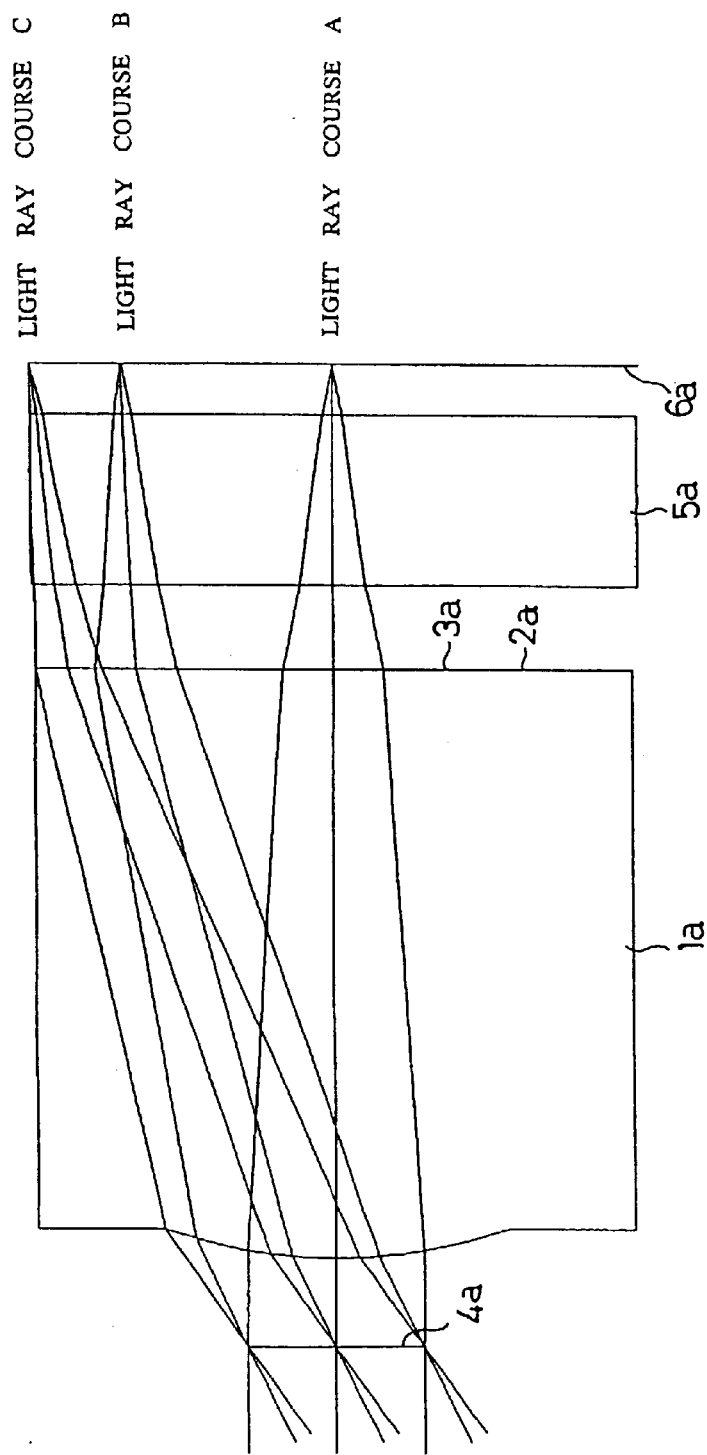
FIG. 39 is a schematic illustration showing Example 11 of the image pickup lens according to the present invention.

FIG. 39 shows Example 11 of the present invention. In Example 11, the second face of the lens body 1a was formed into the Fresnel face 2a while being unified with the diffraction element 3a as in the same manner as that of the second basic embodiment shown in FIG. 6. In Example 11, the lens body 1a was made of a glass material.

The image pickup lens of Example 11 was set under the following condition:

f = 2.6 mm, F No = 2.5, 2ω = 70.6, Petzval sum = 0.32

| Face | Radius r of Curvature | Distance d | Refractive Index nd | Abbe constant vd |
|---|---|---|---|---|
| (1) Diaphragm | 0.000 | 0.5190 | | |
| (2) First face of lens body | 2.852 | 3.5374 | 1.544 | 62.9 |
| (3) Second face of lens body | −1.802 | 0.0000 | 831.404 | |
| (4) High refractive index layer | −1.802 | 0.5000 | | |
| (5) First face of cover glass | 0.0000 | 1.0000 | 1.518 | 64.0 |
| (6) Second face of cover glass | 0.000 | 0.3044 | | |
| (7) Image pickup surface | 0.000 | | | |

Aspherical Factor

| Face | k | $a_4$ | $a_6$ |
|---|---|---|---|
| 2 | −1.017267e+01 | 3.612915e−02 | −5.889963e−03 |
| 3 | −5.488893e−01 | 2.603868e−02 | −7.586976e−03 |
| 4 | −5.492270e−01 | 2.603057e−02 | −7.581993e−03 |

| Face | $a_8$ | $a_{10}$ |
|---|---|---|
| 2 | −8.053710e−04 | 2.435896e−04 |
| 3 | 4.926491e−03 | −6.524366e−04 |
| 4 | 4.923639e−03 | −6.520522e−04 |

Under such condition, d/f=1.361 was achieved, thereby satisfying the expression (1).

Further, $|r_2/r_1|$=0.632 was achieved, thereby satisfying the expression (2).

Furthermore, ds/f=0.200 was achieved, thereby satisfying the expression (3).

Figure 40:
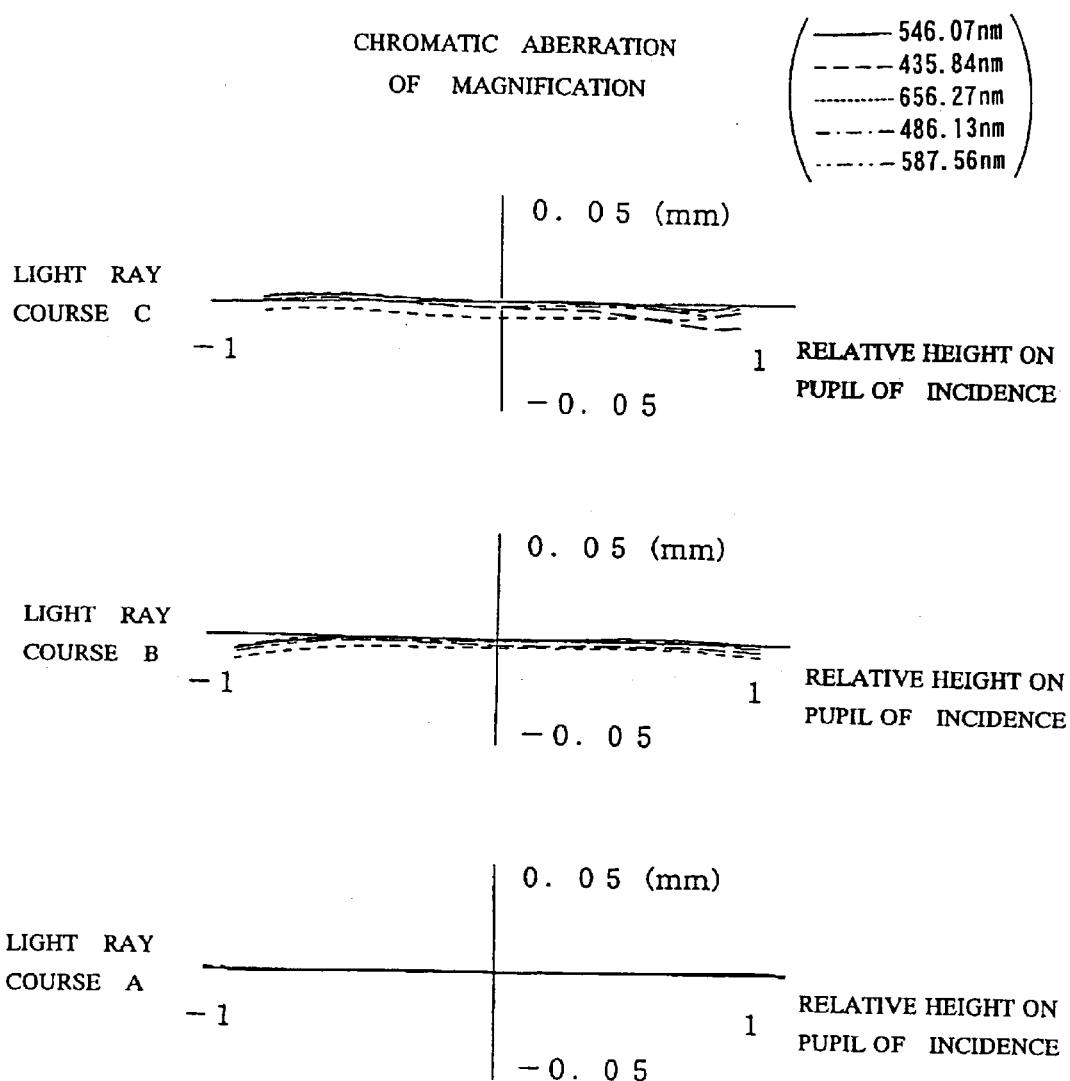
FIG. 40 is an explanatory illustration showing the chromatic aberration of magnification of the image pickup lens shown in FIG. 39.

FIG. 40 shows the chromatic aberration of magnification of ray paths A, B, and C, respectively, in regards to the image pickup lens of Example 11 under such condition. According to the figure, it is clear that the chromatic aberration of magnification in each ray path is decreased.

Figure 41:
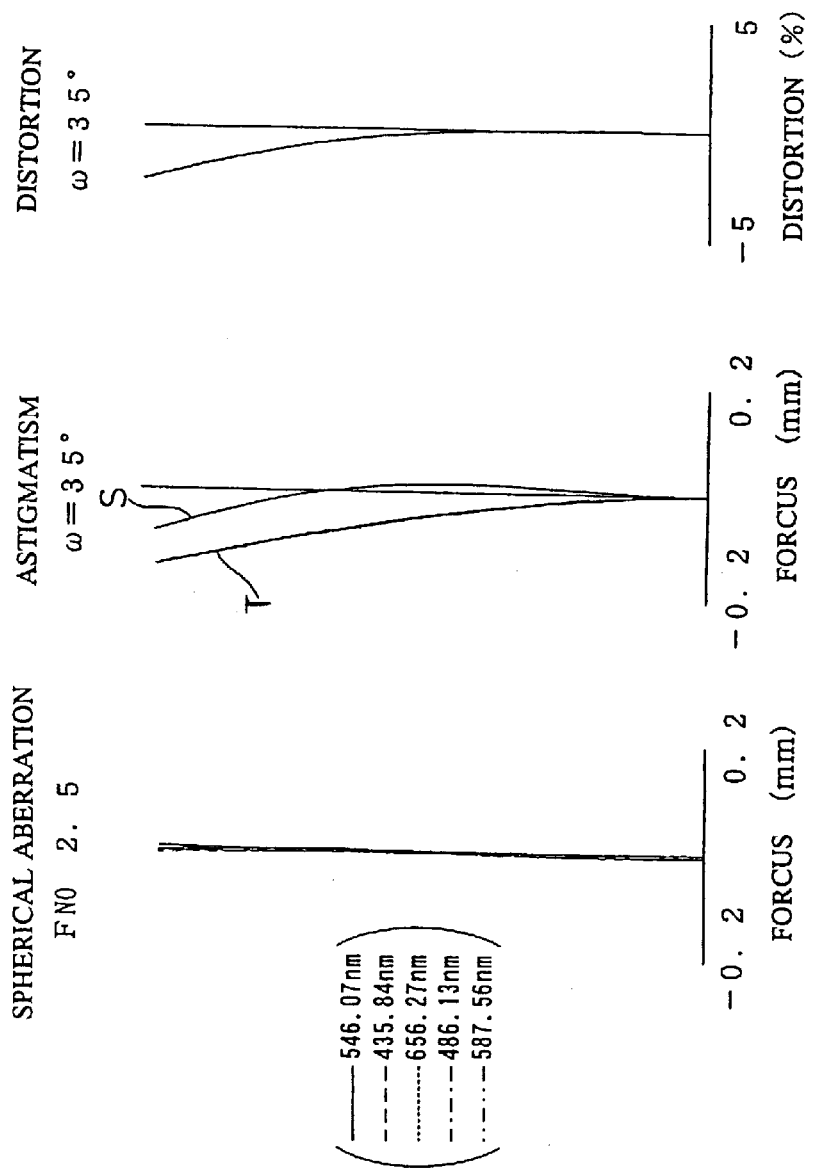
FIG. 41 is an explanatory illustration showing the spherical aberration, the astigmatism, and the distortion aberration of the image pickup lens shown in FIG. 39.

Further, FIG. 41 shows the spherical aberration, the astigmatism, and the distortion aberration in the image pickup lens of Example 11. According to the figure, it is clear that each value of the spherical aberration, the astigmatism and the distortion aberration is almost satisfactory so that a sufficient optical characteristic can be obtained.

Next, still another basic embodiment of the present invention will be described by referring to FIG. 42 to FIG. 44.

Figure 42:
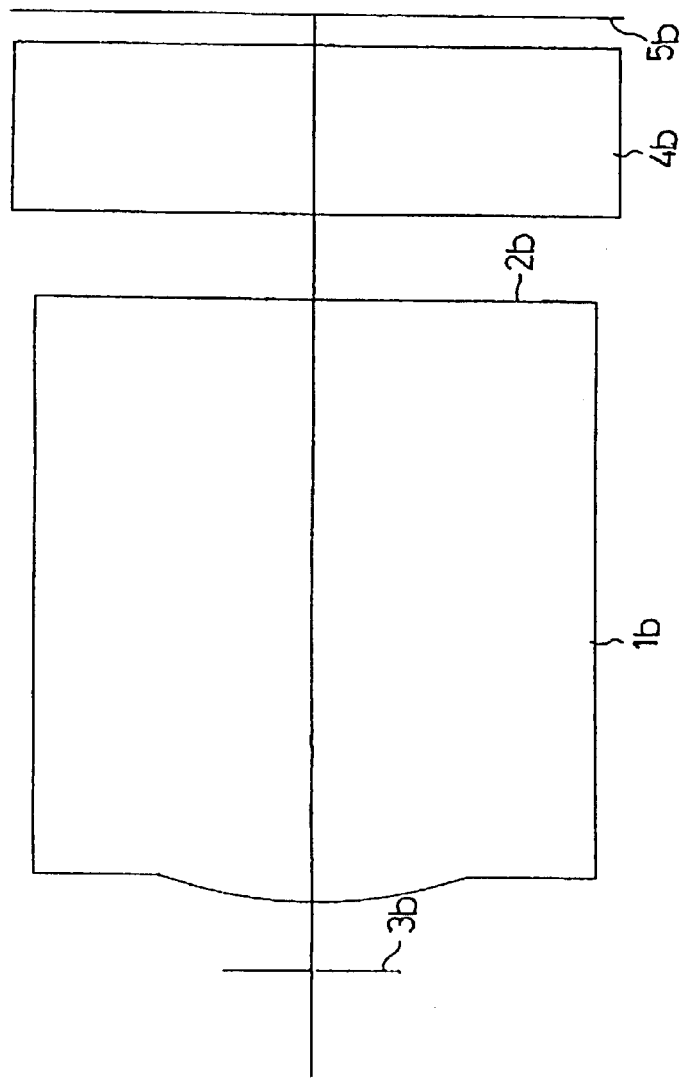
FIG. 42 is a schematic illustration showing still another embodiment of the image pickup lens according to the present invention.

FIG. 42 shows still another basic stricture of an image pickup lens according to the present invention. The image pickup lens comprises a lens body 1b made of, for example, a resin such as plastic or the like. In this basic embodiment, a second face on the image pickup surface side of the lens body 1b is formed into an aspherical Fresnel face 2b. It is preferable that the concave-convex shape of the aspherical Fresnel face 2b be formed fine but not to the extent where there receives bad influence by diffraction. Also, a first face of the lens body 1b may be formed into the Fresnel face 2b. Furthermore, the first face of the lens body 1b is formed into an aspherical face.

A diaphragm 3b is disposed on the object side of the lens body 1b, and a cover glass 4b and an image pickup surface 5b as a light receiving surface of an image pickup element such as a CCD, a CMOS or the like are disposed, respectively, on the second face of the lens body 1b.

Further, in the embodiment, the lens body 1b is to satisfy the condition represented by the following expressions:

$$1.17 < d/f < 1.4 \quad (4)$$

$$0.58 < |r_2/r_1| < 0.73 \quad (5)$$

$$0 \leq ds/f \leq 0.4 \quad (6)$$

where, d denotes the thickness in the center of the lens body 1b, f denotes the focal length of the lens body 1b, $r_1$ denotes the radius of curvature in the center of the first face of the lens body 1*b*, $r_2$ denotes the radius of curvature in the center of the second face of the lens body 1*b*, and ds denotes the distance between the center of the diaphragm and the first face of the lens body 1*b*.

Further, in the present embodiment, when determining the above-described expression (4) at the time of designing the lens body 1*b*, first, ray tracing simulation is performed beforehand on a group of lens bodies with different d/f values under the condition where each aberration except for the distortion aberration is maintained to be excellent. Then, dependency of the distortion aberration on the d/f value is obtained by calculating the distortion aberration of the lens bodies 1*b*. The d/f value as a desired distortion aberration is selected on the basis of the correlation obtained thereby so as to determine the thickness in the center of the lens body based on the selected d/f value.

Figure 43:
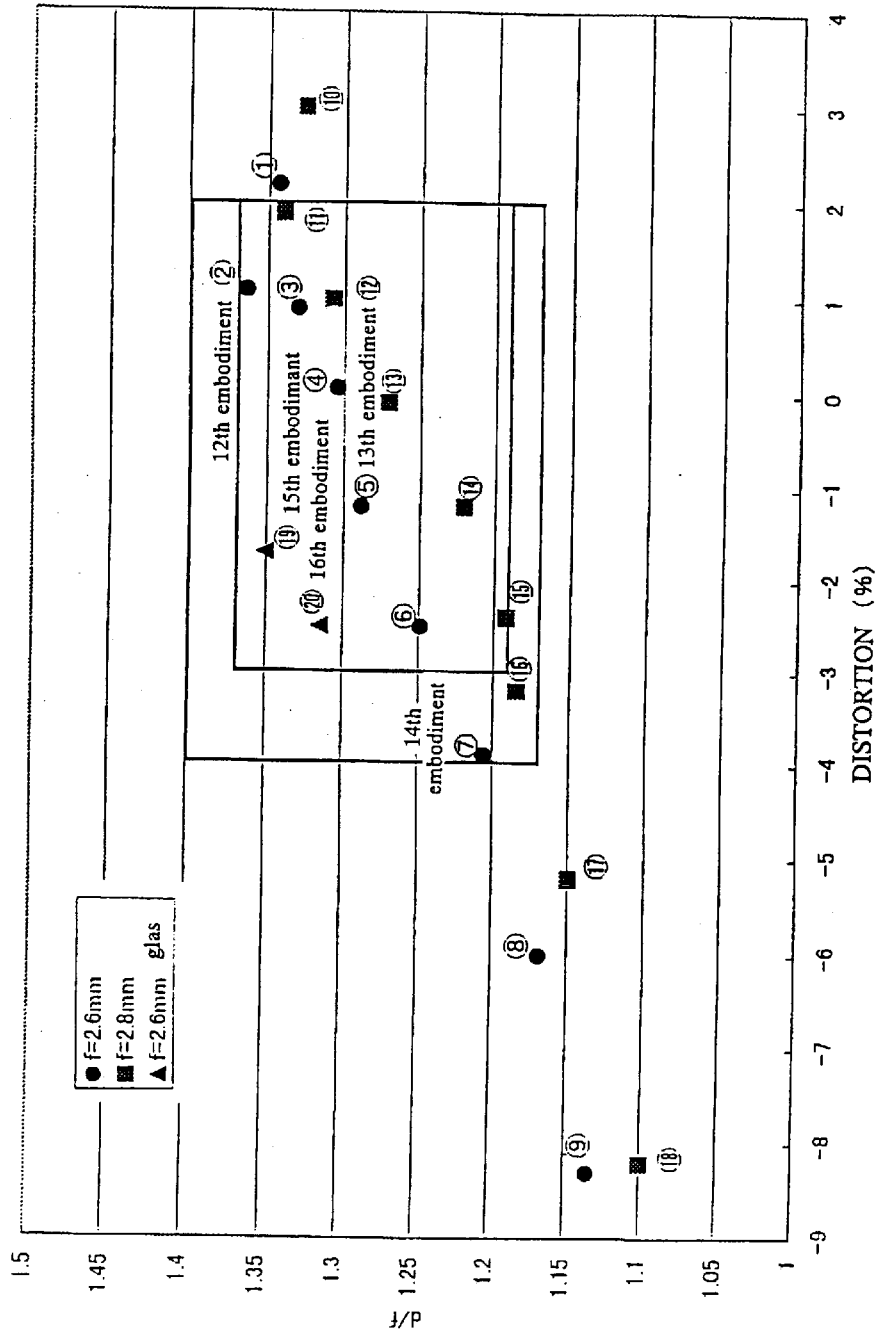
FIG. 43 is a graph showing the correlation between the distortion aberration and the d/f value in the image pickup lens according to the present invention.

FIG. 43 shows the dependency of the distortion aberration on the d/f value. In general, the amount of distortion aberration which is visually comfortable is about −4% to 2% in the field of the present invention. Thus, as shown in FIG. 43, the appropriate d/f value within the range of appropriate distortion aberration amount is set within the large frame shown in the figure. The thickness in the center of the lens body 1*b* is to be determined on the basis of the d/f value within the range.

Preferably, the distortion aberration amount may fall within the range of −3% to 2%. Under the condition, the appropriate d/f value within the range of the appropriate distortion aberration amount is set within the small frame shown in FIG. 43. This can be represented by a following expression:

$$1.19 < d/f < 1.37 \tag{3aa}$$

Also, in the same manner, when determining the expression (5), ray tracing simulation is performed beforehand on the lens bodies 1*b* with different $|r_2/r_1|$ values under the condition where each aberration except for the distortion aberration is maintained to be excellent. Then, dependency of the distortion aberration on the $|r_2/r_1|$ value is obtained by calculating the distortion aberration of each lens body 1*b*. The $|r_2/r_1|$ value as a desired distortion aberration is selected on the basis of the correlation obtained thereby so as to determine the radius of curvature in the center of the lens body 1*b* based on the selected $|r_2/r_1|$ value.

Figure 44:
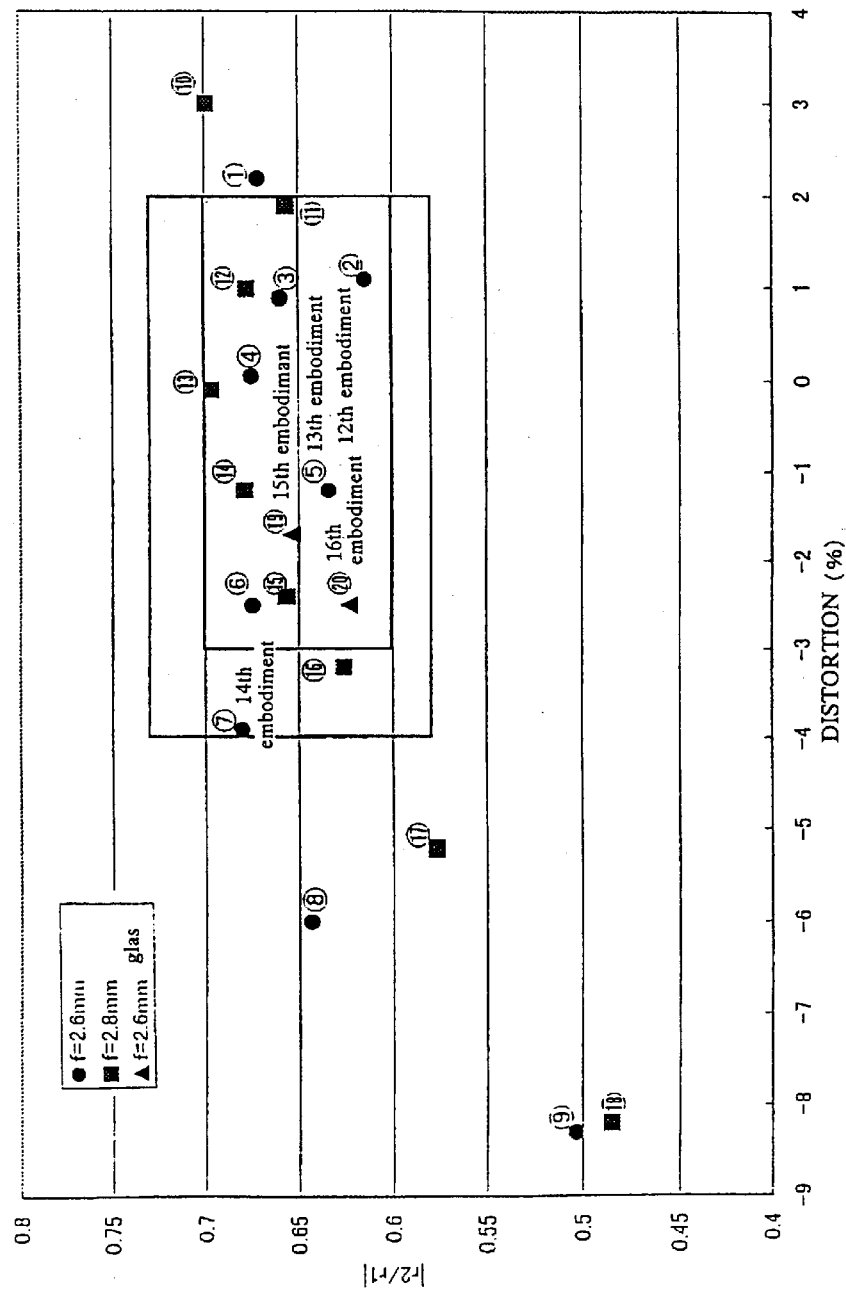
FIG. 44 is a graph showing the correlation between the distortion aberration and the $|r_2/r_1|$ value in the image pickup lens according to the present invention.

FIG. 44 shows the dependence of the distortion aberration on the $|r_2/r_1|$ value. The appropriate $|r_2/r_1|$ value within the range of appropriate distortion aberration amount for achieving −4% to 2% distortion aberration falls within the large frame shown in FIG. 44. The radius of curvature in the center of the lens body 1*b* is to be determined on the basis of the $|r_2/r_1|$ value within the range.

Preferably, the distortion aberration amount may fall within the range of −3% to 2%. Under the condition, the appropriate $|r_2/r_1|$ value within the range of appropriate distortion aberration amount is set within the small frame shown in FIG. 44. This can be represented by a following expression:

$$0.6 < |r_2/r_1| < 0.7 \tag{3ba}$$

The expression (4) is a condition for correcting the distortion aberration amount with a comfortable visual sense while well maintaining the aberration except for the distortion aberration. In the expression (4), if the d/f value is larger than 1.4, the distortion aberration becomes large in the positive direction so that the back focus becomes short. Further, the center of the lens body 1*b* becomes thick so that it becomes difficult to manufacture. If the d/f value is smaller than 1.17, the distortion aberration in the negative direction becomes large. Thus, even though the distortion aberration can be suppressed, the curvature of field, the longitudinal chromatic aberration, the lateral aberration, the spherical aberration and the like cannot be well corrected.

Further, the expression (5) is a condition for achieving an ideal lens shape in which each aberration is well balanced. In the expression (5), if the $|r_2/r_1|$ value is larger than 0.73 or smaller than 0.58, mainly the spherical aberration becomes worsen resulting in deterioration of resolution.

Furthermore, the expression (6) is a condition for correcting the coma aberration while achieving an excellent balance of coma aberration and the distortion aberration. In the expression (6), if the ds/f value is larger than 0.4, the coma aberration cannot be sufficiently corrected and if it is smaller than 0, the diaphragm is to be in the lens body 1*b*. Thus, it is not desirable since it becomes difficult to manufacture.

In the basic embodiment, the second face on the image pickup surface 5 side of the lens body 1*b* is formed into the Fresnel face 2*b*. Therefore, by setting the Petzval sum and the curvature of field small, an excellent image plane can be obtained while decreasing each aberration, particularly, the lateral aberration and the spherical aberration. As a result, the optical characteristic can be remarkably improved.

In the present embodiment, by satisfying the expressions (4) to (6), the distortion aberration can be well corrected.

Now, Examples of the present invention will be described by referring to FIG. 45 to FIG. 59.

In the Examples, f denotes the focal length (mm) of the whole system, F No denotes F number, and 2ω denotes the maximum angle of view. Further, r denotes the radius of curvature (mm) in the center of the lens and the like, d denotes the distance (mm) between each optical surface, nd denotes the refractive index of an optical material (medium) present between with the next optical surface, and ν d denotes the Abbe constant.

Provided the optical axis direction is taken as a Z-axis, the direction perpendicular to the optical axis is taken as an X-axis, and the traveling direction of light is defined to be positive, the shape of the aspheric face of the lens is represented by the above-described expression (Eq 2), where k, $a_4$, $a_6$, $a_8$, and $a_{10}$ are aspherical factors.

Example 12

Figure 45:
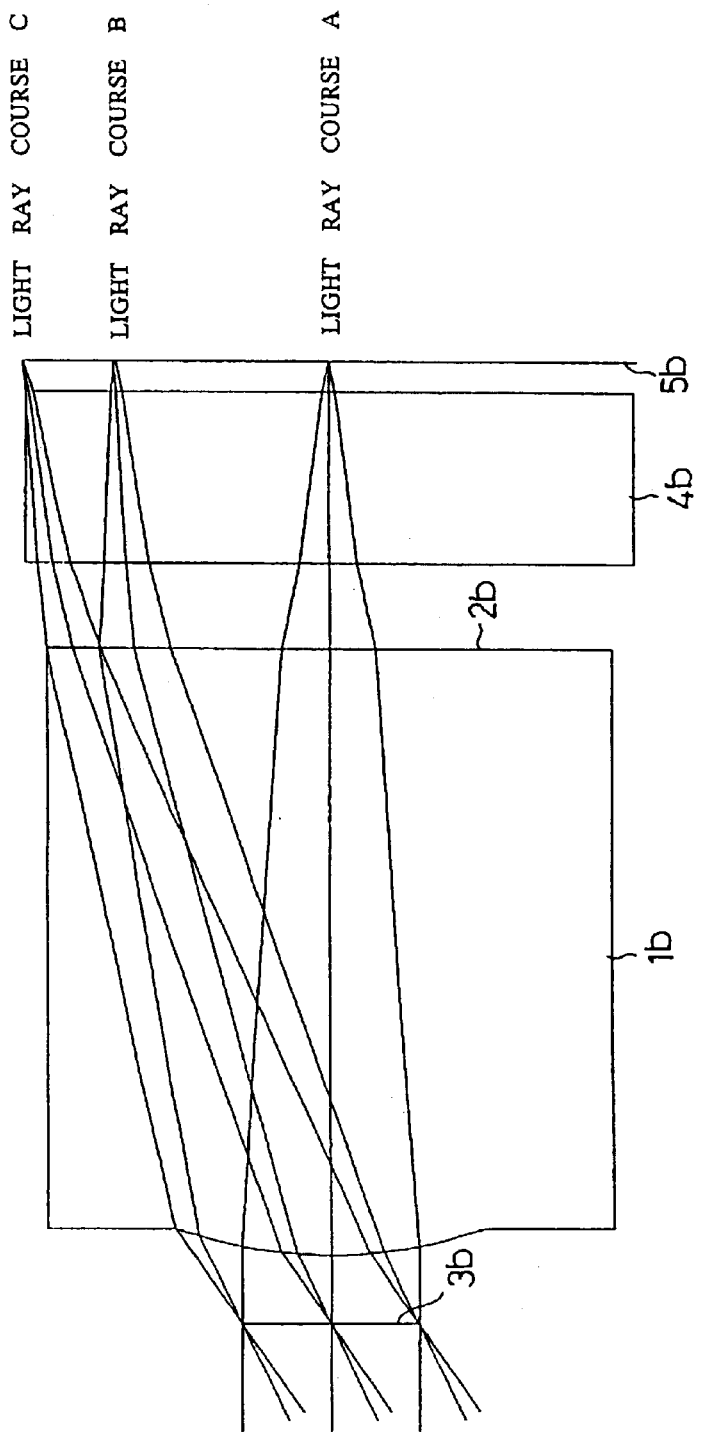
FIG. 45 is a schematic illustration showing Example 12 of the image pickup lens according to the present invention.

FIG. 45 shows Example 12 of the present invention. In Example 12, the second face of the lens body 1*b* was formed into the Fresnel face 2*b* as in the image pickup lens shown in FIG. 42.

The image pickup lens of Example 12 was set under the following condition:

f = 2.6 mm, F No = 2.5, 2ω = 68.8, Petzval sum = 0.36

| Face | Radius r of Curvature | Distance d | Refractive Index nd | Abbe constant νd |
|---|---|---|---|---|
| (1) Diaphragm | 0.000 | 0.4000 | | |
| (2) First face of lens body | 2.518 | 3.5446 | 1.527 | 56.0 |
| (3) Second face of lens body | −1.547 | 0.5000 | | |

-continued

| | | | | |
|---|---|---|---|---|
| (4) First face of cover glass | 0.0000 | 1.0000 | 1.518 | 64.0 |
| (5) Second face of cover glass | 0.000 | 0.1779 | | |
| (6) Image pickup surface | 0.000 | | | |

Aspherical Factor

| Face | k | $a_4$ | $a_6$ |
|---|---|---|---|
| 2 | −6.902735e+00 | 3.315906e−02 | −3.920313e−03 |
| 3 | −1.165110e+00 | −5.293182e−03 | 1.898012e−02 |

| Face | $a_8$ | $a_{10}$ |
|---|---|---|
| 2 | 0.000000e+00 | 0.000000e+00 |
| 3 | −6.143211e−03 | 9.680898e−04 |

Under such condition, d/f=1.363 was achieved, thereby satisfying the expression (4).

Further, $|r_2/r_1|$=0.614 was achieved, thereby satisfying the expression (5).

Furthermore, ds/f=0.154 was achieved, thereby satisfying the expression (6).

Figure 46:
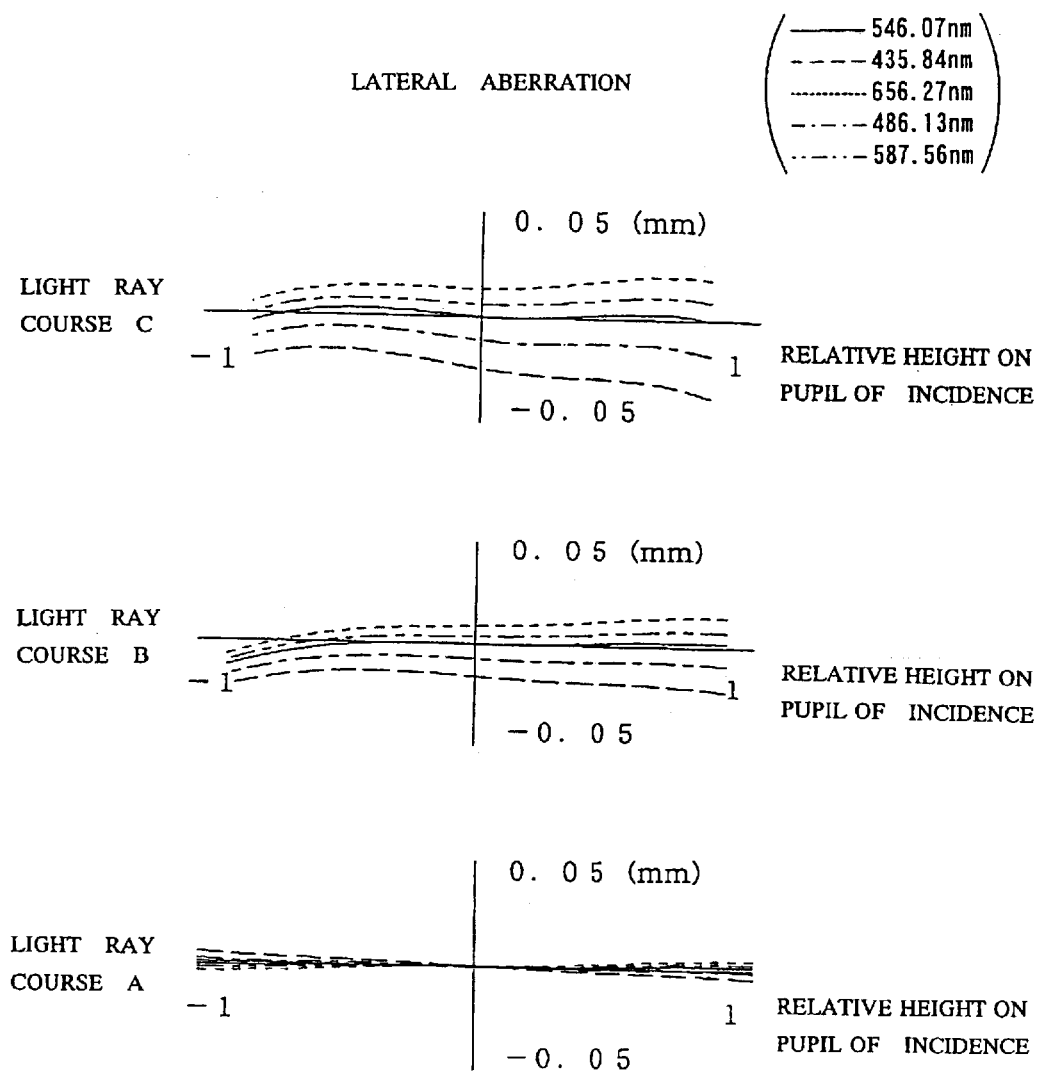
FIG. 46 is an explanatory illustration showing the lateral aberration of the image pickup lens shown in FIG. 45.

FIG. 46 shows the lateral aberration of ray paths A, B, and C, respectively, in regards to the image pickup lens of Example 12 under such condition.

Figure 47:
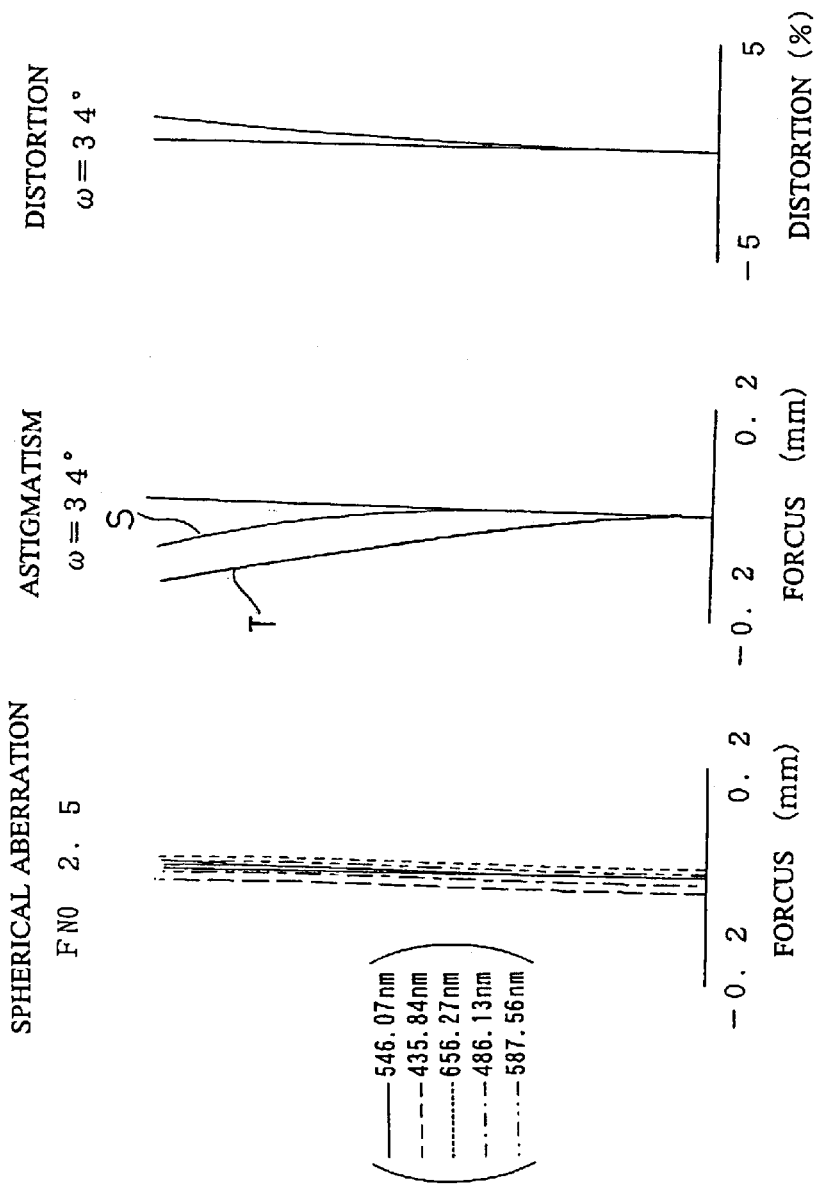
FIG. 47 is an explanatory illustration showing the spherical aberration, the astigmatism, and the distortion aberration of the image pickup lens shown in FIG. 45.

Further, FIG. 47 shows the spherical aberration, the astigmatism, and the distortion aberration in the image pickup lens of Example 12. According to the figure, it is clear that each value of the spherical aberration, the astigmatism and the distortion aberration is almost satisfactory so that a sufficient optical characteristic can be obtained.

Example 13

Figure 48:
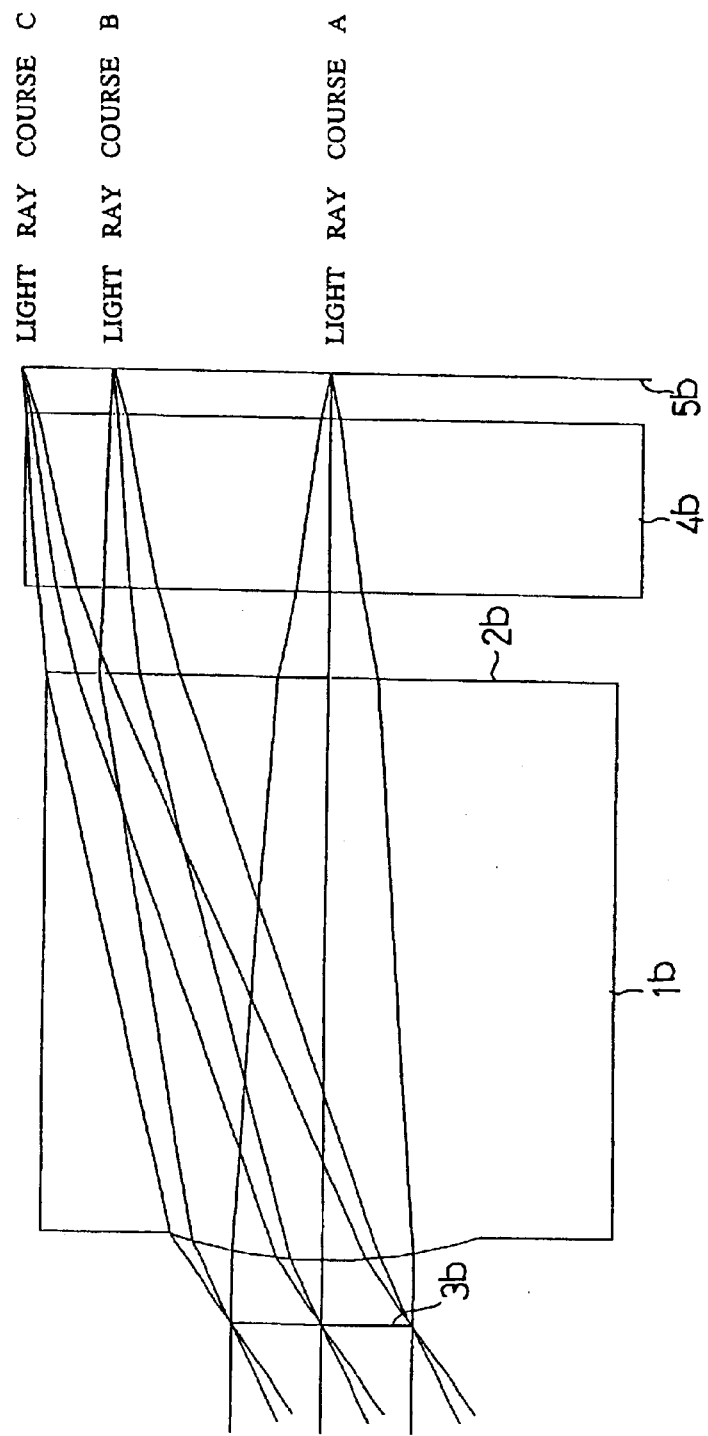
FIG. 48 is a schematic illustration showing Example 13 of the image pickup lens according to the present invention.

FIG. 48 shows Example 13 of the present invention. In Example 13, the second face of the lens body 1b was formed into the Fresnel face 2b as in the image pickup lens shown in FIG. 42.

The image pickup lens of Example 13 was set under the following condition:

f = 2.6 mm, F No = 2.5, 2ω = 70.0, Petzval sum = 0.35

| Face | Radius r of Curvature | Distance d | Refractive Index nd | Abbe constant vd |
|---|---|---|---|---|
| (1) Diaphragm | 0.000 | 0.3600 | | |
| (2) First face of lens body | 2.553 | 3.3500 | 1.527 | 56.0 |
| (3) Second face of lens body | −1.619 | 0.5000 | | |
| (4) First face of cover glass | 0.0000 | 1.0000 | 1.518 | 64.0 |
| (5) Second face of cover glass | 0.000 | 0.2636 | | |
| (6) Image pickup surface | 0.000 | | | |

Aspherical Factor

| Face | k | $a_4$ | $a_6$ |
|---|---|---|---|
| 2 | −9.905958e+00 | 5.208922e−02 | −1.378825e−02 |
| 3 | −2.651238e+00 | −1.631000e−02 | −2.959295e−03 |

| Face | $a_8$ | $a_{10}$ |
|---|---|---|
| 2 | 0.000000e+00 | 0.000000e+00 |
| 3 | 4.853739e−03 | −6.760713e−04 |

Under such condition, d/f=1.288 was achieved, thereby satisfying the expression (4).

Further, $|r_2/r_1|$=0.634 was achieved, thereby satisfying the expression (5).

Furthermore, ds/f=0.138 was achieved, thereby satisfying the expression (6).

Figure 49:
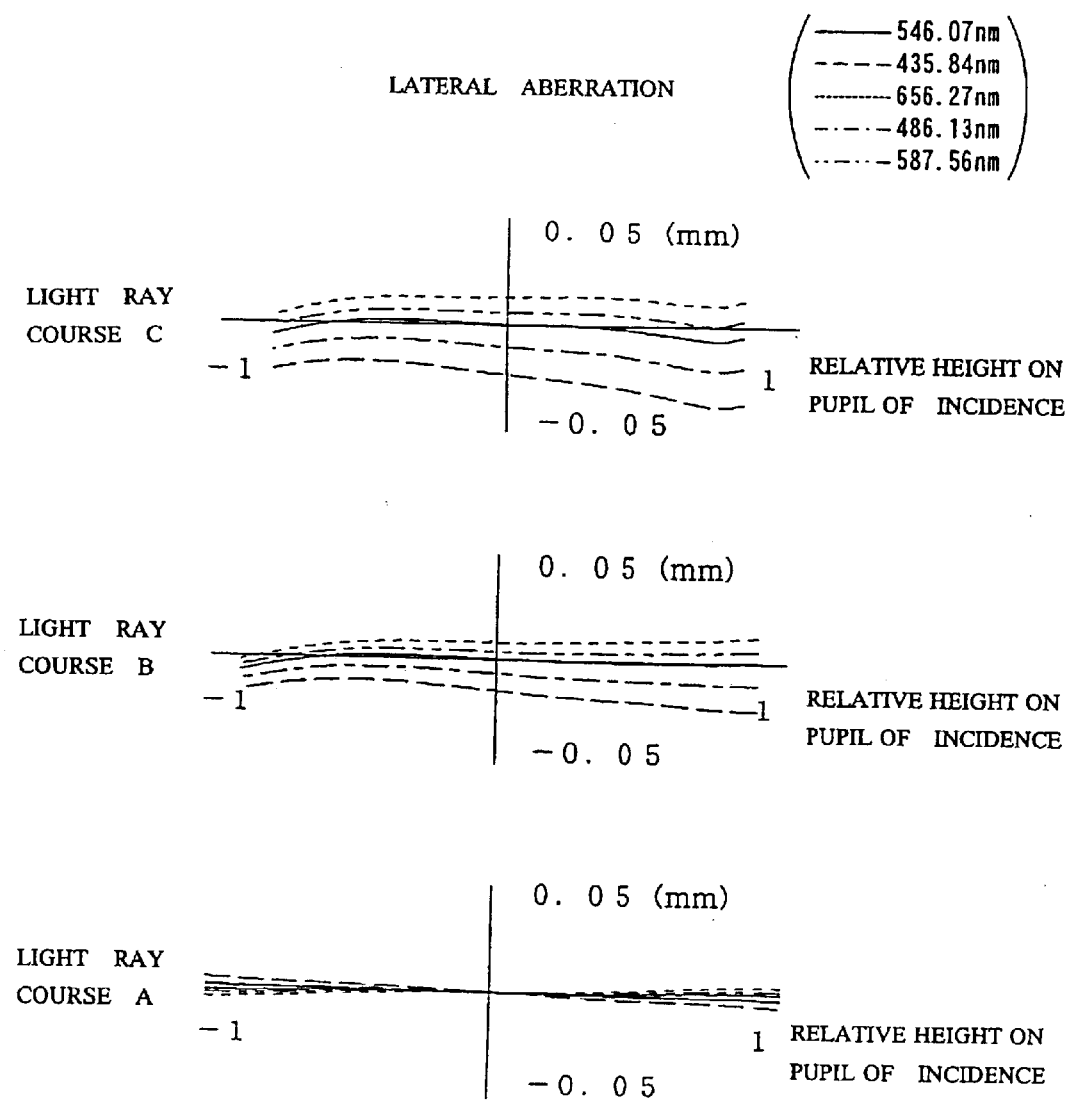
FIG. 49 is an explanatory illustration showing the lateral aberration of the image pickup lens shown in FIG. 48.

FIG. 49 shows the lateral aberration of ray paths A, B, and C, respectively, in regards to the image pickup lens of Example 13 under such condition.

Figure 50:
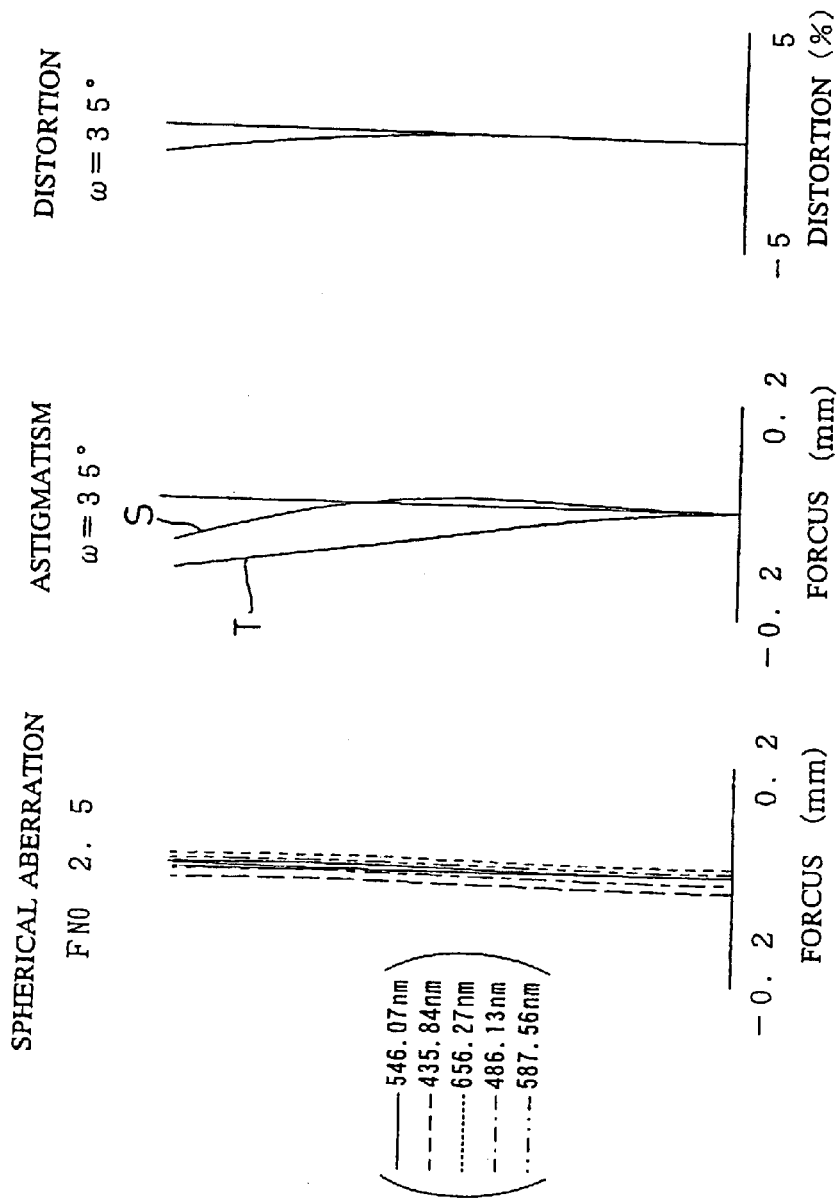
FIG. 50 is an explanatory illustration showing the spherical aberration, the astigmatism, and the distortion aberration of the image pickup lens shown in FIG. 48.

Further, FIG. 50 shows the spherical aberration, the astigmatism, and the distortion aberration in the image pickup lens of Example 13. According to the figure, it is clear that each value of the spherical aberration, the astigmatism and the distortion aberration is almost satisfactory so that a sufficient optical characteristic can be obtained.

Example 14

Figure 51:
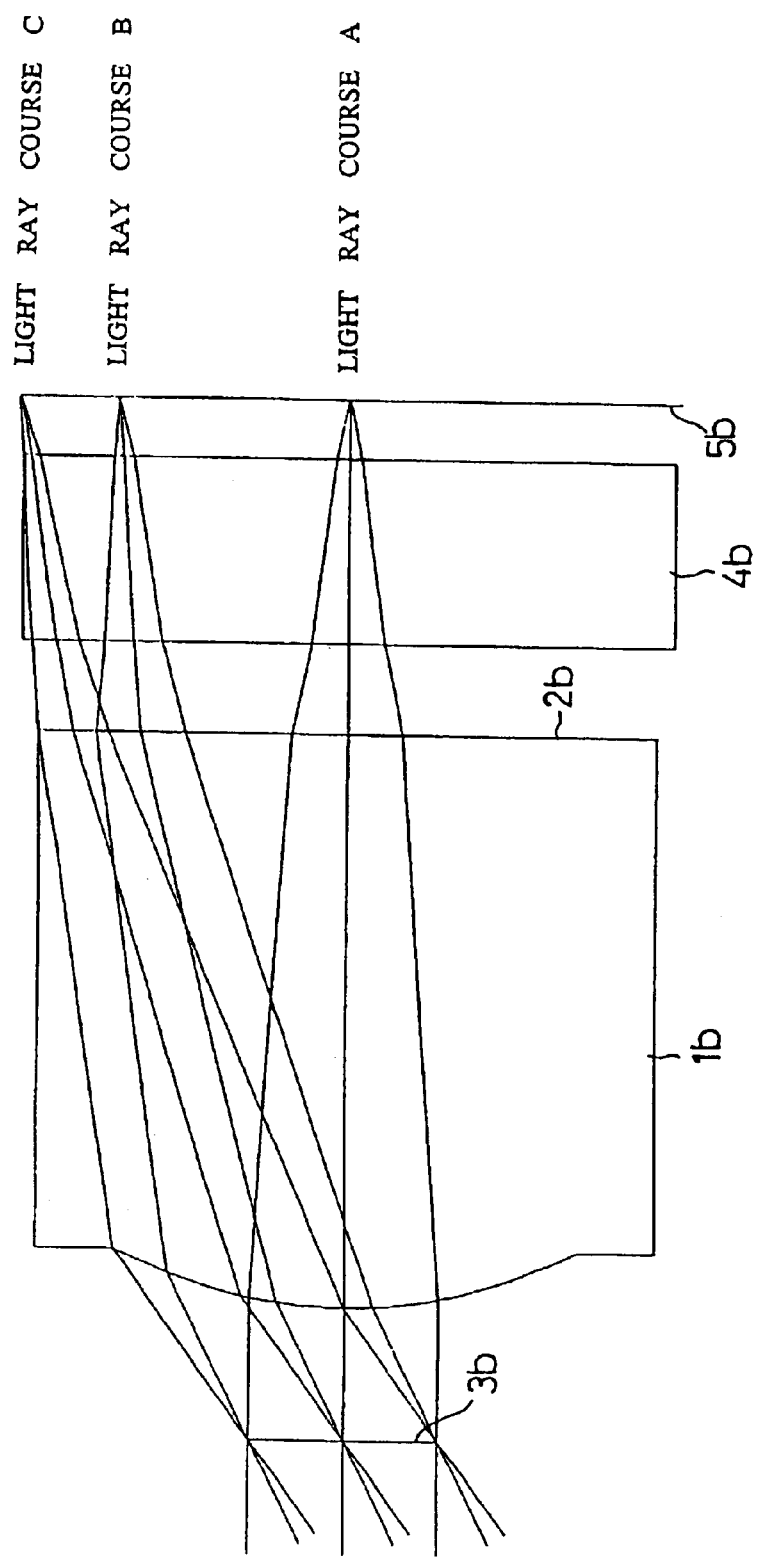
FIG. 51 is a schematic illustration showing Example 14 of the image pickup lens according to the present invention.

FIG. 51 shows Example 14 of the present invention. In Example 14, the second face of the lens body 1b was formed into the Fresnel face 2b as in the image pickup lens shown in FIG. 42.

The image pickup lens of Example 14 was set under the following condition:

f = 2.6 mm, F No = 2.5, 2ω = 71.6, Petzval sum = 0.36

| Face | Radius r of Curvature | Distance d | Refractive Index nd | Abbe constant vd |
|---|---|---|---|---|
| (1) Diaphragm | 0.000 | 0.7191 | | |
| (2) First face of lens body | 2.521 | 3.1344 | 1.527 | 56.0 |
| (3) Second face of lens body | −1.715 | 0.5000 | | |
| (4) First face of cover glass | 0.0000 | 1.0000 | 1.518 | 64.0 |
| (5) Second face of cover glass | 0.000 | 0.3253 | | |
| (6) Image pickup surface | 0.000 | | | |

Aspherical Factor

| Face | k | $a_4$ | $a_6$ |
|---|---|---|---|
| 2 | −8.954858e+00 | 4.296668e−02 | −6.370016e−03 |
| 3 | −7.497561e−01 | 1.345057e−02 | 9.347825e−03 |

| Face | $a_8$ | $a_{10}$ |
|---|---|---|
| 2 | 0.000000e+00 | 0.000000e+00 |
| 3 | −2.552510e−03 | 5.660260e−04 |

Under such condition, d/f=1.206 was achieved, thereby satisfying the expression (4).

Further, $|r_2/r_1|$=0.680 was achieved, thereby satisfying the expression (5).

Furthermore, ds/f=0.277 was achieved, thereby satisfying the expression (6).

Figure 52:
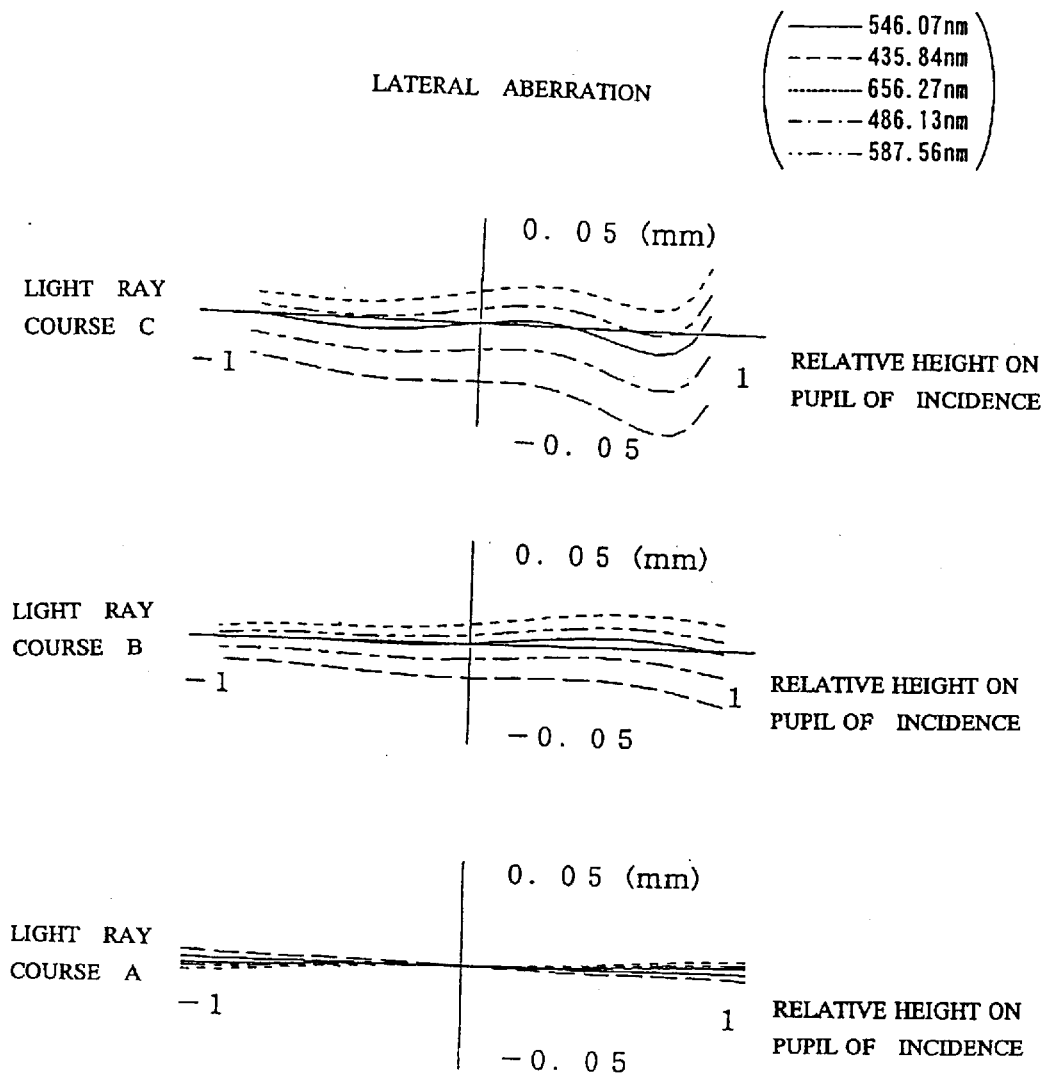
FIG. 52 is an explanatory illustration showing the lateral aberration of the image pickup lens shown in FIG. 51.

FIG. 52 shows the lateral aberration of ray paths A, B, and C, respectively, in regards to the image pickup lens of Example 14 under such condition.

Figure 53:
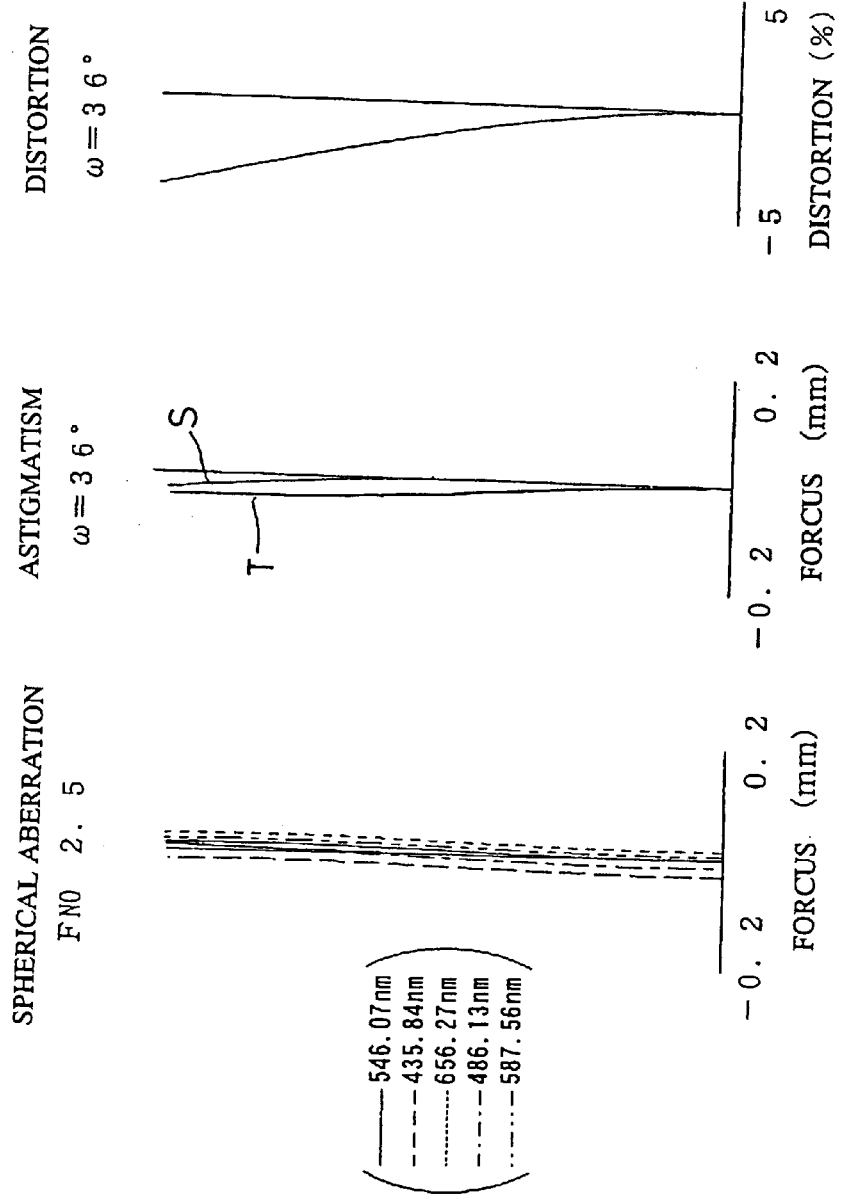
FIG. 53 is an explanatory illustration showing the spherical aberration, the astigmatism, and the distortion aberration of the image pickup lens shown in FIG. 51.

Further, FIG. 53 shows the spherical aberration, the astigmatism, and the distortion aberration in the image pickup lens of Example 14. According to the figure, it is clear that each value of the spherical aberration, the astigmatism and the distortion aberration is almost satisfactory so that a sufficient optical characteristic can be obtained.

Example 15

Figure 54:
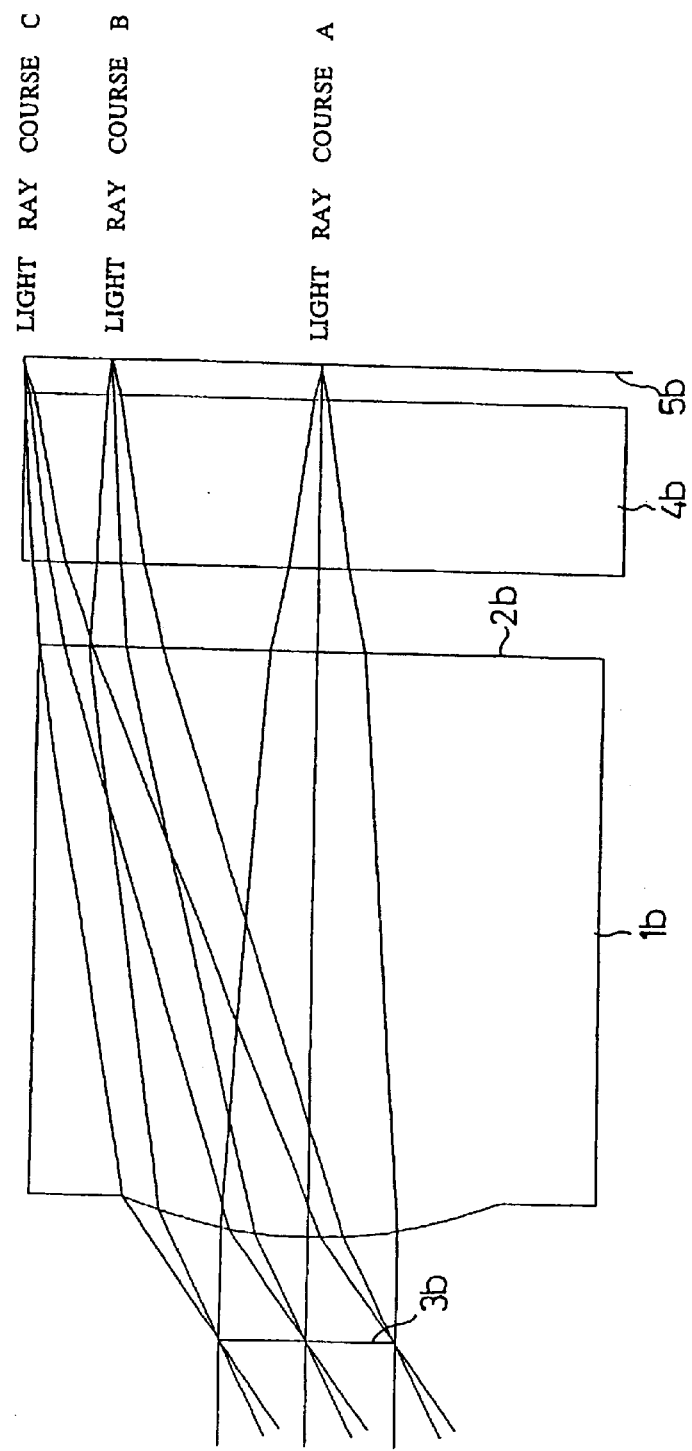
FIG. 54 is a schematic illustration showing Example 15 of the image pickup lens according to the present invention.

FIG. 54 shows Example 15 of the present invention. In Example 15, the second face of the lens body 1b was formed into the Fresnel face 2b as in the image pickup lens shown in FIG. 42. In Example 15, the lens body 1b was made of a glass material.

The image pickup lens of Example 15 was set under the following condition:

| f = 2.6 mm, F No = 2.5, 2ω = 70.4, Petzval sum = 0.35 | | | | |
|---|---|---|---|---|
| Face | Radius r of Curvature | Distance d | Refractive Index nd | Abbe constant νd |
| (1) Diaphragm | 0.000 | 0.6193 | | |
| (2) First face of lens body | 2.755 | 3.5102 | 1.585 | 59.4 |
| (3) Second face of lens body | −1.801 | 0.5000 | | |
| (4) First face of cover glass | 0.0000 | 1.0000 | 1.518 | 64.0 |
| (5) Second face of cover glass | 0.000 | 0.2181 | | |
| (6) Image pickup surface | 0.000 | | | |

| Aspherical Factor | | | |
|---|---|---|---|
| Face | k | $a_4$ | $a_6$ |
| 2 | −1.481685e+00 | −4.980061e−04 | 3.020918e−03 |
| 3 | −6.889858e−01 | 9.497036e−03 | 1.691608e−02 |
| Face | $a_8$ | $a_{10}$ | |
| 2 | 0.000000e+00 | 0.000000e+00 | |
| 3 | −6.140451e−03 | 1.051427e−03 | |

Under such condition, d/f=1.350 was achieved, thereby satisfying the expression (4).

Further, $|r_2/r_1|$=0.654 was achieved, thereby satisfying the expression (5).

Furthermore, ds/f=0.238 was achieved, thereby satisfying the expression (6).

Figure 55:
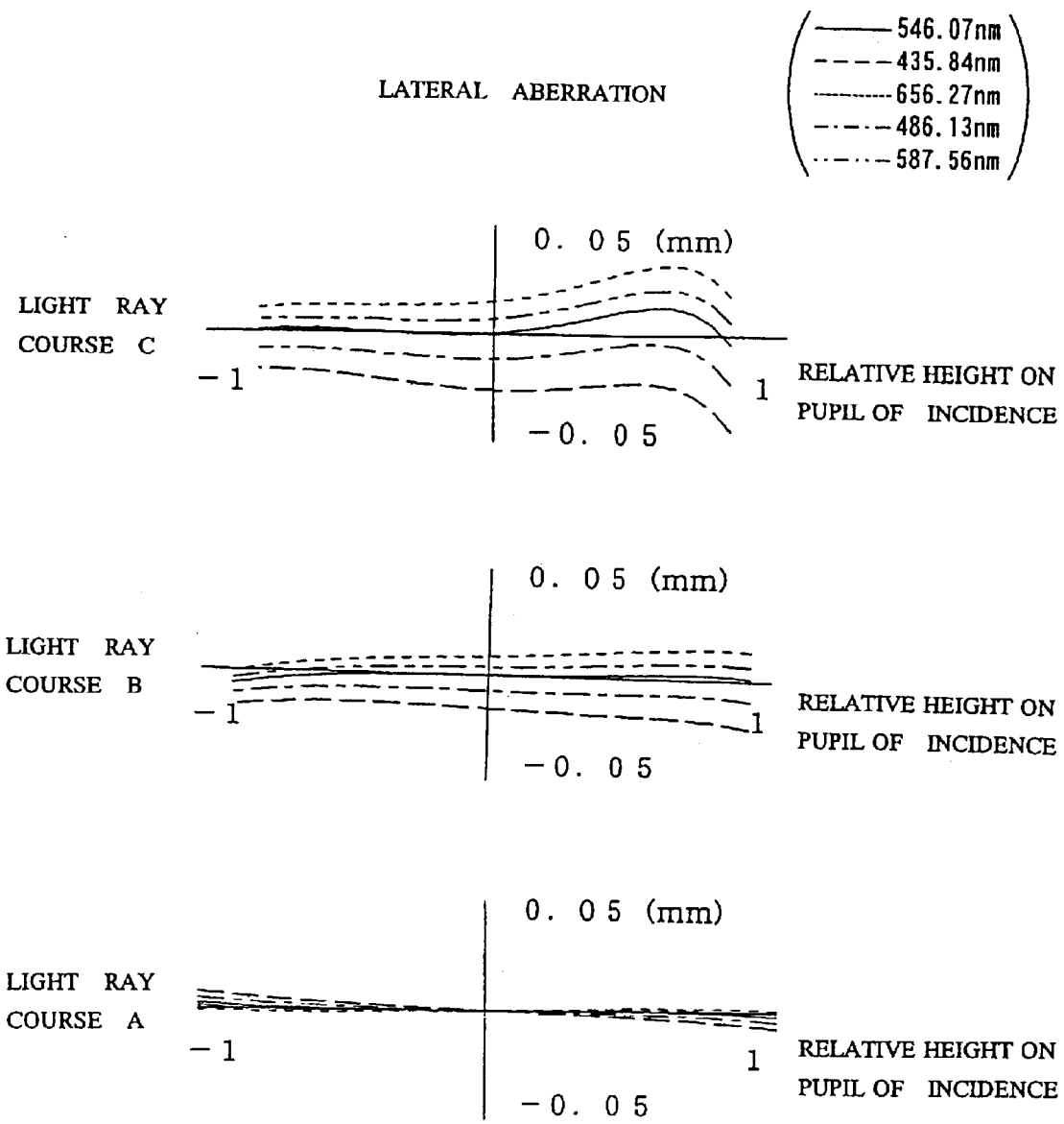
FIG. 55 is an explanatory illustration showing the lateral aberration of the image pickup lens shown in FIG. 54.

FIG. 55 shows the lateral aberration of ray paths A, B, and C, respectively, in regards to the image pickup lens of Example 15 under such condition.

Figure 56:
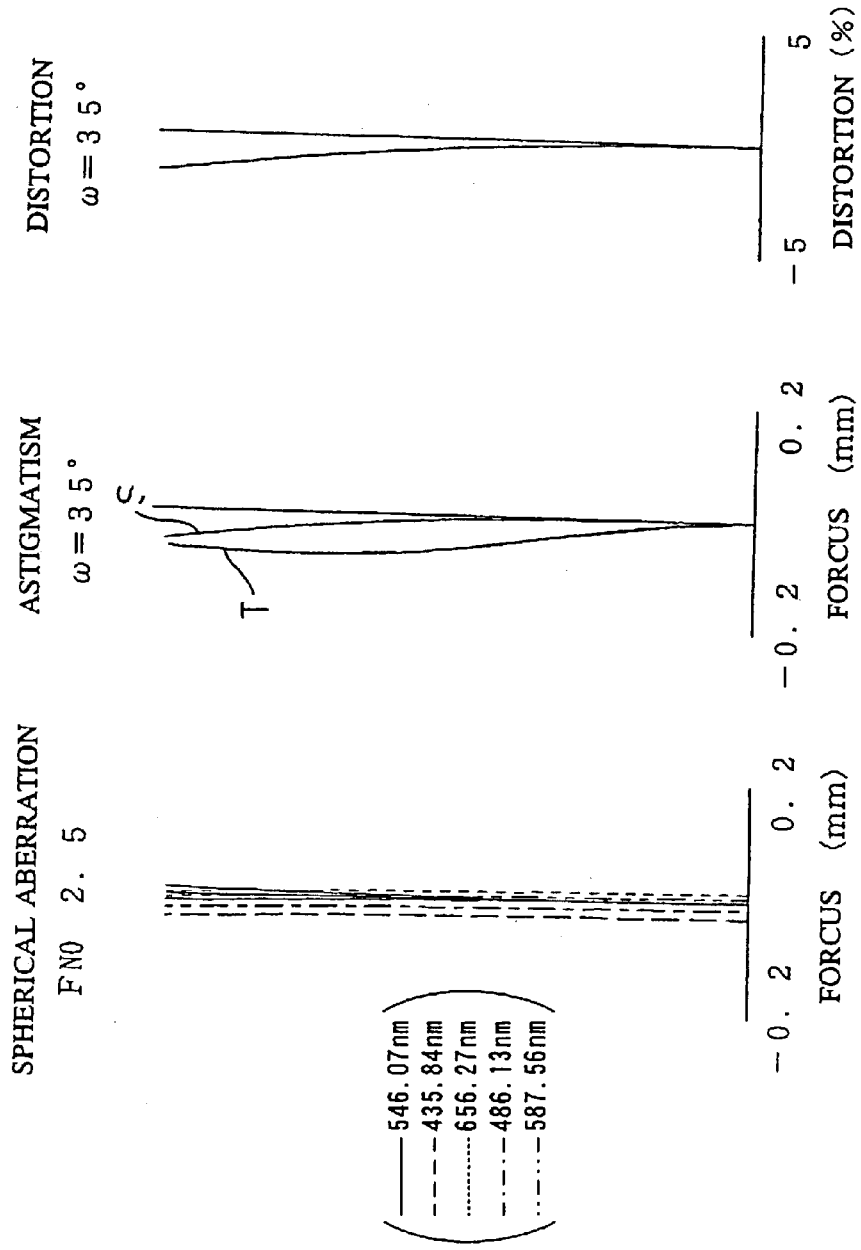
FIG. 56 is an explanatory illustration showing the spherical aberration, the astigmatism, and the distortion aberration of the image pickup lens shown in FIG. 54.

Further, FIG. 56 shows the spherical aberration, the astigmatism, and the distortion aberration in the image pickup lens of Example 15. According to the figure, it is clear that each value of the spherical aberration, the astigmatism and the distortion aberration is almost satisfactory so that a sufficient optical characteristic can be obtained.

Example 16

Figure 57:
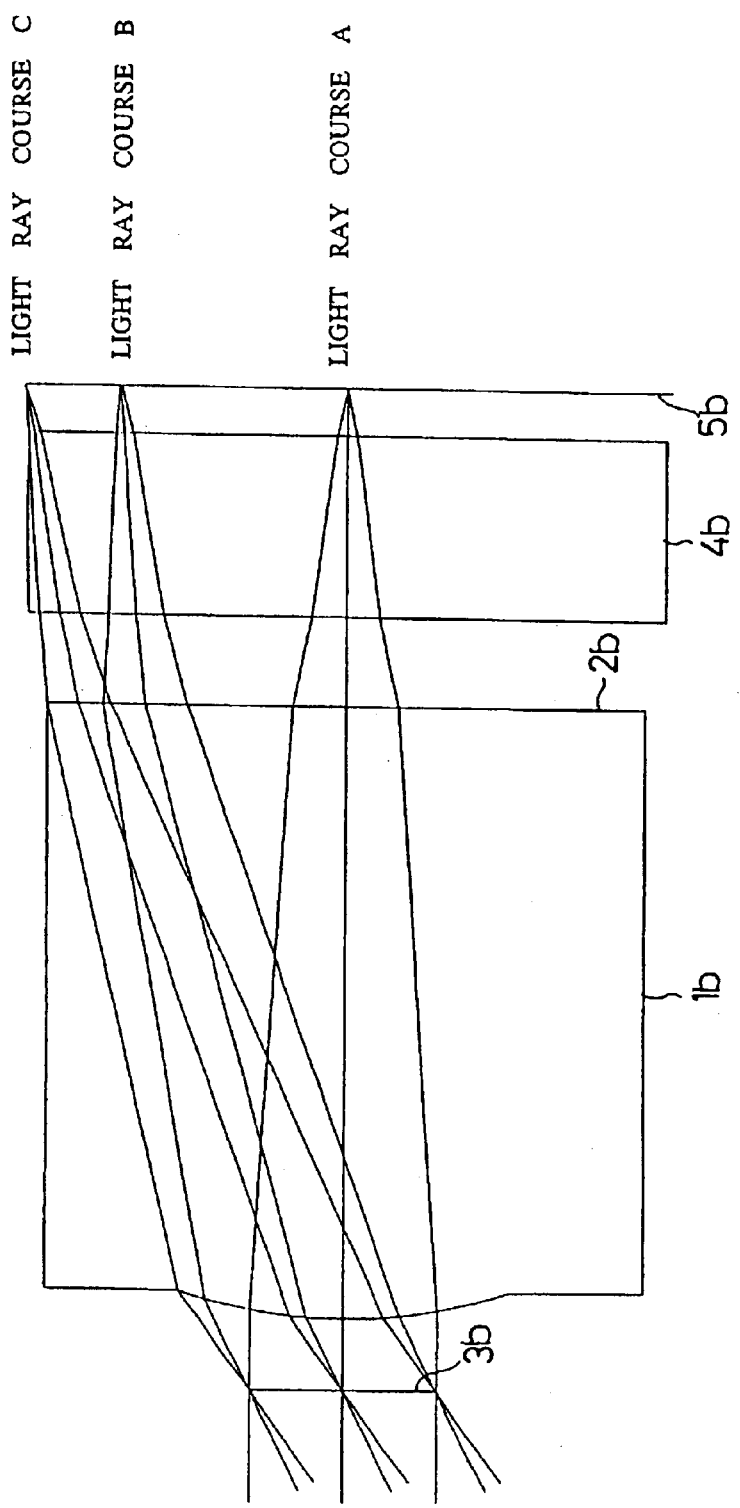
FIG. 57 is a schematic illustration showing Example 16 of the image pickup lens according to the present invention.

FIG. 57 shows Example 16 of the present invention. In Example 16, the second face of the lens body 1b was formed into the Fresnel face 2b as in the image pickup lens shown in FIG. 42. In Example 16, the lens body 1b was made of a glass material.

The image pickup lens of Example 16 was set under the following condition:

| f = 2.6 mm, F No = 2.5, 2ω = 70.8, Petzval sum = 0.34 | | | | |
|---|---|---|---|---|
| Face | Radius r of Curvature | Distance d | Refractive Index nd | Abbe constant νd |
| (1) Diaphragm | 0.000 | 0.4000 | | |
| (2) First face of lens body | 2.659 | 3.4168 | 1.544 | 62.9 |
| (3) Second face of lens body | −1.656 | 0.5000 | | |
| (4) First face of cover glass | 0.0000 | 1.0000 | 1.518 | 64.0 |
| (5) Second face of cover glass | 0.000 | 0.2634 | | |
| (6) Image pickup surface | 0.000 | | | |

| Aspherical Factor | | | |
|---|---|---|---|
| Face | k | $a_4$ | $a_6$ |
| 2 | −9.602284e+00 | 4.139515e−02 | −7.479535e−03 |
| 3 | −9.689892e−01 | 3.136863e−03 | 1.172318e−02 |
| Face | $a_8$ | $a_{10}$ | |
| 2 | 0.000000e+00 | 0.000000e+00 | |
| 3 | −3.317653e−03 | 5.366110e−04 | |

Under such condition, d/f=1.314 was achieved, thereby satisfying the expression (4).

Further, $|r_2/r_1|$=0.623 was achieved, thereby satisfying the expression (5).

Furthermore, ds/f=0.154 was achieved, thereby satisfying the expression (6).

Figure 58:
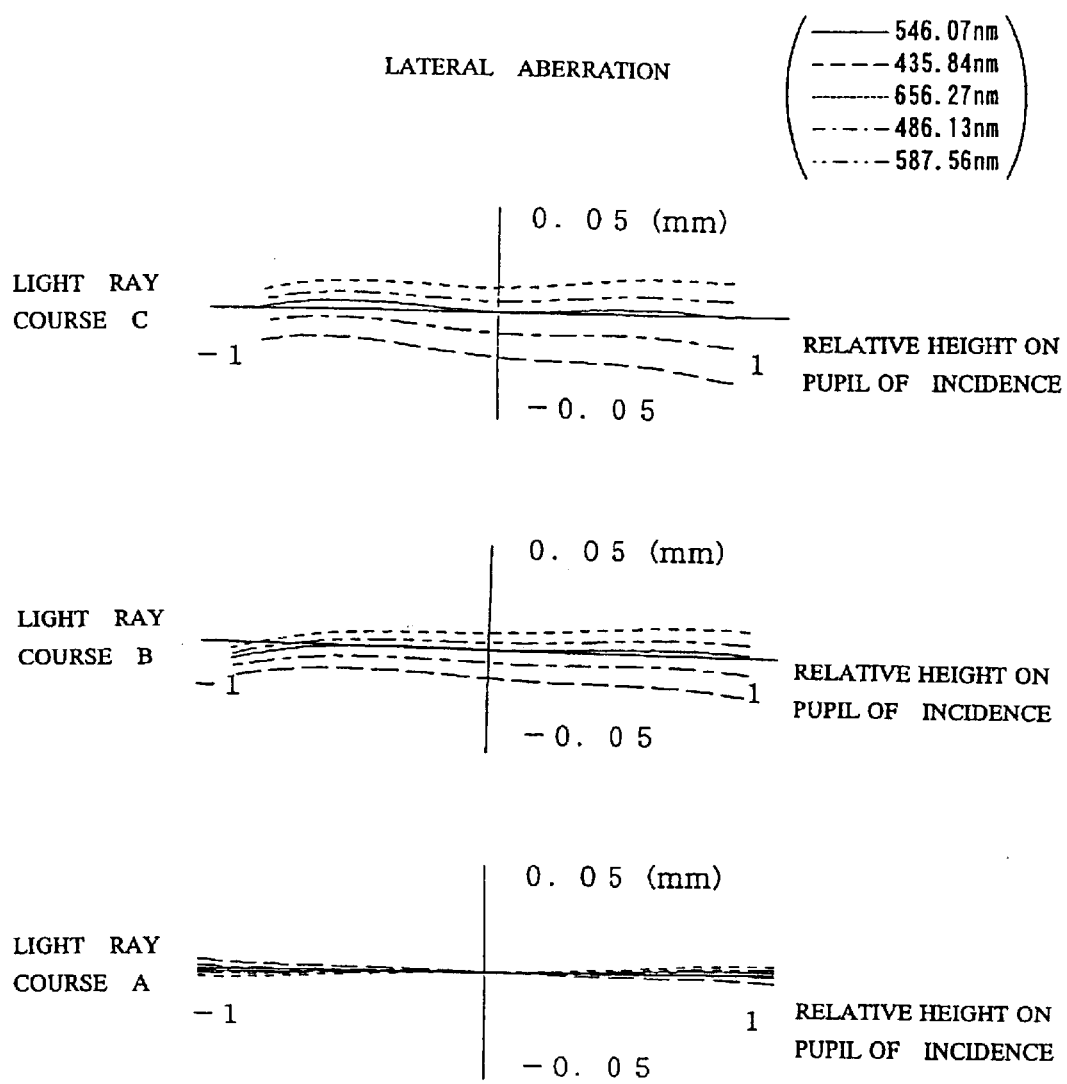
FIG. 58 is an explanatory illustration showing the lateral aberration of the image pickup lens shown in FIG. 57.

Further, FIG. 58 shows the lateral aberration of ray paths A, B, and C, respectively, in regards to the image pickup lens of Example 16 under such condition.

Figure 59:
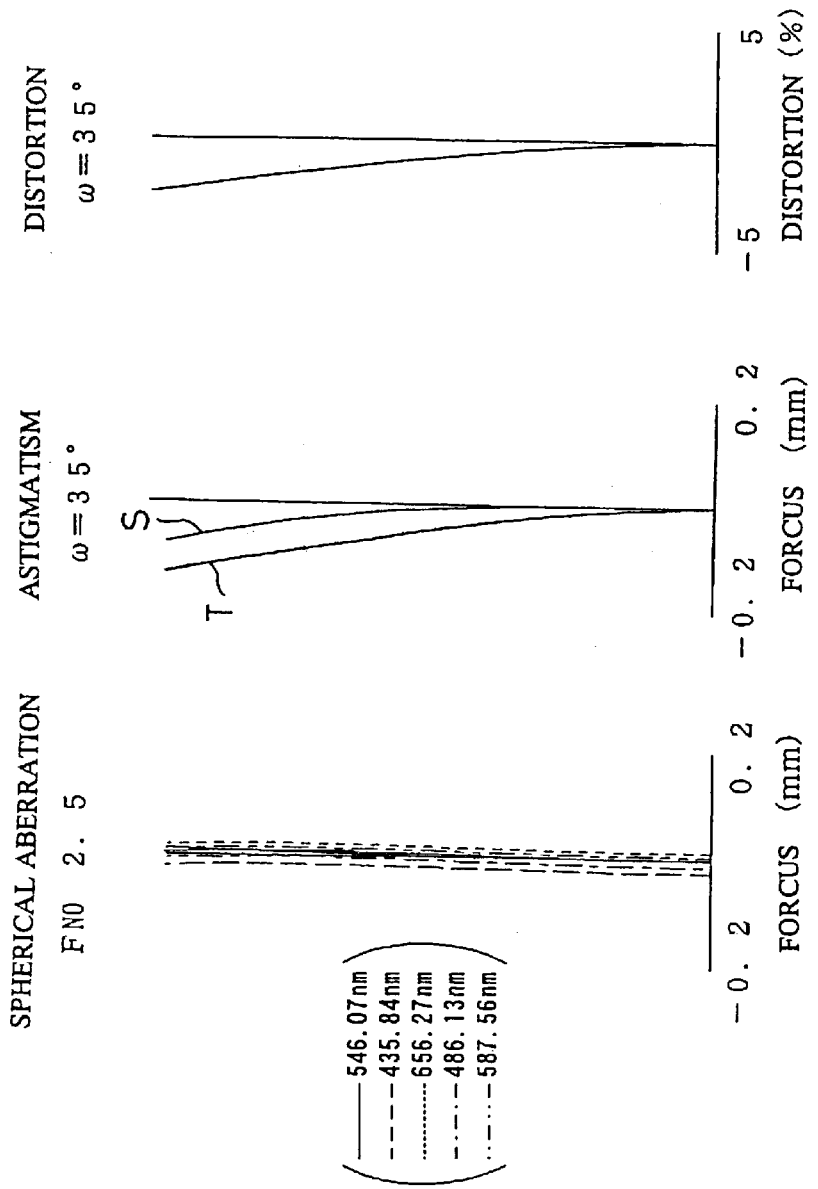
FIG. 59 is an explanatory illustration showing the spherical aberration, the astigmatism, and the distortion aberration of the image pickup lens shown in FIG. 57.

Further, FIG. 59 shows the spherical aberration, the astigmatism, and the distortion aberration in the image pickup lens of Example 16. According to the figure, it is clear that each value of the spherical aberration, the astigmatism and the distortion aberration is almost satisfactory so that a sufficient optical characteristic can be obtained.

The present invention has been described by referring to the basic embodiments. However, it is not limited to the above-described embodiments but various modifications are possible without departing from the spirit within the scope of the present invention.

What is claimed is:

1. An image pickup lens comprising a lens body having a second face on an image pickup surface side of said lens body being formed into a Fresnel face and a diffraction element being unified with at least either a first face on an object side or the second face on the image pickup surface side of said lens body.

2. An image pickup lens according to claim 1, wherein said diffraction element is unified with the second face of said lens body.

3. An image pickup lens according to claim 1 or claim 2, wherein the first face of said lens body is formed into an aspheric face and the second face of said lens body is formed into an aspheric Fresnel face.

4. An image pickup lens according to claim 1 or claim 2, wherein said lens body satisfies a condition represented by a following expression:

$$1.25 < d/f < 1.45 \tag{1}$$

where, d: thickness in the center of said lens body, and f: focal length of said lens body.

5. An image pickup lens according to claim 1 or claim 2, wherein said lens body satisfies a condition represented by a following expression:

$$0.6 < |r_2/r_1| < 0.75 \tag{2}$$

where, $r_1$: radius of curvature in the center of the first face of said lens body, and $r_2$: radius of curvature in the center of the second face of said lens body.

6. An image pickup lens according to claim 1 or claim 2, wherein a diaphragm is positioned on the object side of said lens body and said lens body satisfies a condition represented by a following expression:

$$0 \leq ds/f \leq 0.4 \tag{3}$$

where, ds: distance between the center of said diaphragm and the first face of said lens body, and f: focal length of said lens body.

7. A design method of an image pickup lens for determining thickness and radius of curvature in the center of a lens body having a second face on an image pickup surface side of said lens body being formed into a Fresnel face and a diffraction element being unified with at least either a first face on the object side or the second face on the image pickup surface side of said lens body, comprising the steps of:

under the condition that each aberration is maintained to be excellent except for distortion aberration, performing ray tracing simulation beforehand on a lens body group with a different combination of d/f value (where, d denotes thickness in the center of a lens body and f denotes focal length of a lens body) and $|r_2/r_1|$ value (where, $r_1$ denotes radius of curvature in the center of the first face of said lens body and $r_2$ denotes radius of curvature in the center of the second face of said lens body); calculating the distortion aberration of said lens bodies so as to obtain dependency of the distortion aberration on the d/f value and the $|r_2/r_1|$ value; selecting, according to the correlation, the combination of the d/f value and the $|r_2/r_1|$ value to be a desired distortion aberration; and determining the thickness and the radius of curvature of said lens body on the basis of the d/f value and the $|r_2/r_1|$ value.

8. An image pickup lens comprising a lens body having at least one face being formed into an aspherical face and at least either a first face on an object side or a second face on an image pickup surface side of said lens body being formed into a Fresnel face, wherein said lens body satisfies a condition represented by a following expression:

$$1.17 < d/f < 1.4 \tag{4}$$

where, d: thickness in the center of said lens body; and f: focal length of said lens body.

9. An image pickup lens as claimed in claim 8, wherein said lens body satisfies a condition represented by a following expression:

$$0.58 < |r_2/r_1| < 0.73 \tag{5}$$

where, $r_1$: radius of curvature in the center of the first face of said lens body; and $r_2$: radius of curvature in the center of the second face of said lens body.

10. An image pickup lens according claim 8 or claim 9, wherein a diaphragm is positioned on the object side of said lens body and said lens body satisfies a condition represented by a following expression:

$$0 \leq ds/f \leq 0.4 \tag{6}$$

where, ds: distance between the center of said diaphragm and the first face of said lens body; and f: focal length of said lens body.

11. A design method of an image pickup lens for determining thickness and radius of curvature in the center of a lens body having at least a first face on an object side or a second face on an image pickup surface side of said lens body being formed into a Fresnel face, comprising the steps of:

under the condition that each aberration is maintained to be excellent except for distortion aberration, performing ray tracing simulation beforehand on a lens body group with a different combination of d/f value (where, d denotes thickness in the center of a lens body and f denotes focal length of a lens body) and $|r_2/r_1|$ value (where, $r_1$ denotes radius of curvature in the center of the first face of said lens body and $r_2$ denotes radius of curvature in the center of the second face of said lens body); calculating the distortion aberration of said lens bodies so as to obtain dependency of the distortion aberration on the d/f value and the $|r_2/r_1|$ value; selecting, according to the correlation of the d/f value and the $|r_2/r_1|$ value to be a desired distortion aberration; and determining the thickness and the radius of curvature of said lens body on the basis of the d/f value and $|r_2/r_1|$ value.

12. An image pickup lens according to claim 1 or claim 2, wherein:

the first face of said lens body is formed into an aspheric face and the second face of said lens body is formed into an aspheric Fresnel face; and said lens body satisfies a condition represented by a following expression:

$$1.25 < d/f < 1.45 \tag{1}$$

where, d: thickness in the center of said lens body, and f: focal length of said lens body.

13. An image pickup lens according to claim 1 or claim 2, wherein:

the first face of said lens body is formed into an aspheric face and the second face of said lens body is formed into an aspheric Fresnel face; and said lens body satisfies a condition represented by a following expression:

$$0.6 < |r_2/r_1| < 0.75 \tag{2}$$

where, $r_1$: radius of curvature in the center of the first face of said lens body, and $r_2$: radius of curvature in the center of the second face of said lens body.

14. An image pickup lens according to claim 1 or claim 2, wherein:

the first face of said lens body is formed into an aspheric face and the second face of said lens body is formed into an aspheric Fresnel face;

said lens body satisfies a condition represented by a following expression:

$$1.25 < d/f < 1.45 \tag{1}$$

where, d: thickness in the center of said lens body, and f: focal length of said lens body; and said lens body satisfies a condition represented by a following expression:

$$0.6 < |r_2/r_1| < 0.75 \tag{2}$$

where, $r_1$: radius of curvature in the center of the first face of said lens body, and $r_2$: radius of curvature in the center of the second face of said lens body.

15. An image pickup lens according to claim 1 or claim 2, wherein:

the first face of said lens body is formed into an aspheric face and the second face of said lens body is formed into an aspheric Fresnel face; and a diaphragm is positioned on the object side of said lens body and said lens body satisfies a condition represented by a following expression:

$$0 \leq ds/f \leq 0.4 \tag{3}$$

where, ds: distance between the center of said diaphragm and the first face of said lens body, and f: focal length of said lens body.

16. An image pickup lens according to claim 1 or claim 2, wherein:

the first face of said lens body is formed into an aspheric face and the second face of said lens body is formed into an aspheric Fresnel face;

said lens body satisfies a condition represented by a following expression:

$$1.25 < d/f < 1.45 \tag{1}$$

where, d: thickness in the center of said lens body, and f: focal length of said lens body; and a diaphragm is positioned on the object side of said lens body and said lens body satisfies a condition represented by a following expression:

$$0 \leq ds/f \leq 0.4 \tag{3}$$

where, ds: distance between the center of said diaphragm and the first face of said lens body, and f: focal length of said lens body.

17. An image pickup lens according to claim 1 or claim 2, wherein:

the first face of said lens body is formed into an aspheric face and the second face of said lens body is formed into an aspheric Fresnel face;

said lens body satisfies a condition represented by a following expression:

$$1.25 < d/f < 1.45 \tag{1}$$

where, d: thickness in the center of said lens body, and f: focal length of said lens body;

said lens body satisfies a condition represented by a following expression:

$$0.6 < |r_2/r_1| < 0.75 \tag{2}$$

where, $r_1$: radius of curvature in the center of the first face of said lens body, and $r_2$: radius of curvature in the center of the second face of said lens body; and a diaphragm is positioned on the object side of said lens body and said lens body satisfies a condition represented by a following expression:

$$0 \leq ds/f \leq 0.4 \tag{3}$$

where, ds: distance between the center of said diaphragm and the first face of said lens body, and f: focal length of said lens body.

* * * * *